United States Patent
Powers et al.

(10) Patent No.: US 8,347,659 B2
(45) Date of Patent: Jan. 8, 2013

(54) LOCK MECHANISM USING ONE-WAY VALVE TO LOCK PISTON

(75) Inventors: David R. Powers, San Diego, CA (US); Daniel Bertuna, Fairfax Station, VA (US); David K. Aberizk, San Diego, CA (US); Keith L. Frankie, San Diego, CA (US); Stuart J. Waddell, El Cajon, CA (US)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 12/825,191

(22) Filed: Jun. 28, 2010

(65) Prior Publication Data

US 2010/0326147 A1    Dec. 30, 2010

Related U.S. Application Data

(60) Provisional application No. 61/221,000, filed on Jun. 26, 2009, provisional application No. 61/221,001, filed on Jun. 26, 2009, provisional application No. 61/221,003, filed on Jun. 26, 2009, provisional application No. 61/287,018, filed on Dec. 16, 2009, provisional application No. 61/287,029, filed on Dec. 16, 2009, provisional application No. 61/287,034, filed on Dec. 16, 2009.

(51) Int. Cl.
 *E05B 73/00* (2006.01)
(52) U.S. Cl. ........... 70/14; 70/256; 70/275; 70/DIG. 48; 292/259 R; 292/289; 292/DIG. 32
(58) Field of Classification Search .............. 70/14, 256, 70/257, 263, 264, 275, 278.1, DIG. 48, DIG. 50; 292/259 R, 288, 289, DIG. 32
See application file for complete search history.

(56) References Cited

U.S. PATENT DOCUMENTS 2,709,610 A * 5/1955 Chandler ................. 292/1
(Continued)

FOREIGN PATENT DOCUMENTS

DE      102005016382 A1    10/2006
(Continued)

OTHER PUBLICATIONS

PCT International Search Report and Written Opinion mailed Oct. 29, 2010; International Application No. PCT/US2010/040262; 17 pages.

(Continued)

*Primary Examiner* — Christopher Boswell
(74) *Attorney, Agent, or Firm* — Kilpatrick Townsend & Stockton LLP

(57) ABSTRACT

A lock mechanism for locking at least one door of a container in a closed position includes a housing, at least one lock member at least partially enclosed within the housing, the at least one lock member comprising a first lock member configured to engage a first portion of a container to lock at least one container door in a closed position, and a latching mechanism coupled to the at least one lock member. The latching mechanism includes a fluid chamber configured to hold a fluid, a piston slidably housed within the fluid chamber, and a valve coupled to the fluid chamber and configured to be in one of two states, the two states including an open state where fluid can flow through the valve in two directions to allow the piston to be moved in two directions, and a closed state where fluid is inhibited from flowing through the valve in at least one direction to prevent the piston from moving in at least one direction. The lock mechanism further includes a lock circuit at least partially enclosed within the housing, the lock circuit including memory, and a lock controller coupled to the memory and the latching mechanism and configured to receive commands related to the operation of the lock mechanism, wherein the lock controller is configured to cause the latching mechanism to be in one of the two states in response to the received commands.

19 Claims, 32 Drawing Sheets

U.S. PATENT DOCUMENTS

| | | | |
|---|---|---|---|
| 3,580,623 A * | 5/1971 | Peters | 70/175 |
| 3,950,018 A | 4/1976 | Pickering | |
| 4,021,066 A * | 5/1977 | McShane | 292/144 |
| 4,169,616 A * | 10/1979 | Peterson | 292/144 |
| 4,253,319 A * | 3/1981 | Feichtiger et al. | 70/264 |
| 4,354,699 A | 10/1982 | Logan | |
| 4,562,710 A * | 1/1986 | Lipschutz | 70/252 |
| 4,815,773 A | 3/1989 | Merrell | |
| 4,866,963 A | 9/1989 | Leininger et al. | |
| 5,685,578 A | 11/1997 | Schneider | |
| 5,799,514 A * | 9/1998 | Tobin et al. | 70/16 |
| 6,050,116 A * | 4/2000 | Cole | 70/256 |
| 6,106,032 A * | 8/2000 | Och | 292/207 |
| 6,705,136 B2 | 3/2004 | Porter | |
| 6,834,896 B2 * | 12/2004 | Smith | 70/14 |
| 6,843,084 B2 | 1/2005 | Porter | |
| 6,851,290 B1 * | 2/2005 | Meier et al. | 70/257 |
| 6,870,476 B2 | 3/2005 | Cockburn et al. | |
| 6,975,224 B2 | 12/2005 | Galley, III et al. | |
| 7,002,472 B2 | 2/2006 | Stratmoen et al. | |
| 7,098,784 B2 | 8/2006 | Easley et al. | |
| 7,116,798 B1 | 10/2006 | Chawla | |
| 7,154,390 B2 | 12/2006 | Giermanski et al. | |
| 7,158,028 B1 | 1/2007 | Ghahramani | |
| 7,278,663 B2 * | 10/2007 | Witchey | 70/14 |
| 7,375,619 B2 | 5/2008 | Auerbach et al. | |
| 7,417,543 B2 | 8/2008 | Bergman et al. | |
| 7,436,298 B2 | 10/2008 | Rajapakse et al. | |
| 7,623,029 B2 | 11/2009 | Meyers | |
| 7,649,455 B2 | 1/2010 | Easley et al. | |
| 7,702,358 B2 | 4/2010 | Meyers | |
| 7,950,748 B2 * | 5/2011 | Coutermarsh et al. | 70/256 |
| 8,069,693 B2 * | 12/2011 | Powers et al. | 70/14 |
| 2004/0055345 A1 | 3/2004 | Moore | |
| 2004/0056767 A1 | 3/2004 | Porter | |
| 2005/0081581 A1 | 4/2005 | Caldwell et al. | |
| 2005/0247085 A1 | 11/2005 | Porter | |
| 2006/0158326 A1 | 7/2006 | Easley | |
| 2006/0255934 A1 | 11/2006 | Easley et al. | |
| 2007/0080802 A1 | 4/2007 | Cockburn et al. | |
| 2007/0113882 A1 | 5/2007 | Meyers | |
| 2007/0118332 A1 | 5/2007 | Meyers et al. | |
| 2007/0133980 A1 | 6/2007 | Meyers et al. | |
| 2007/0152815 A1 | 7/2007 | Meyers et al. | |
| 2007/0200765 A1 | 8/2007 | Meyers et al. | |
| 2008/0230606 A1 | 9/2008 | Thompson et al. | |
| 2009/0134999 A1 | 5/2009 | Dobson et al. | |
| 2009/0135015 A1 * | 5/2009 | Dobson et al. | 70/158 |
| 2009/0174989 A1 | 7/2009 | Nagel et al. | |

FOREIGN PATENT DOCUMENTS

| | | |
|---|---|---|
| WO | WO 2005103422 A1 | 11/2005 |

OTHER PUBLICATIONS

TrakLok Corporation, The GeoLok, obtained online at http://traklok.net/traklok.html on May 22, 2009, 2008, 3 pages.

TrakLok Corporation, Worldwide Tracking—World Class Security, obtained online at http://traklok.net/aboutus.html on May 22, 2009, 2008, 1 page.

PRLog Press Release, "TrakLok Corporation Selected to Present at Innoventure Southeast 2009", dated Apr. 17, 2009, 2 pages.

PRLog Press Release, "TrakLok Corporation Wins at Five Ventures Competition", dated Apr. 17, 2009, 2 pages.

"Geolock: Secure & Efficient Tracking", Nashville Technology Council Events, found online May 22, 2009 at http://www.technologycouncil.com/category/events/page/2/, 1 page.

PRLog Press Release, "TrakLok Corporation's technology secures cargo while increasing efficiency", dated Apr. 17, 2009, 2 pages.

* cited by examiner

LOCK MECHANISM USING ONE-WAY VALVE TO LOCK PISTON

This application claims priority to all of U.S. Provisional Patent Application No. 61/221,000, filed on Jun. 26, 2009, entitled "GLOBAL ASSET TRACKING ENTERPRISE SYSTEM", U.S. Provisional Patent Application No. 61/221,001, filed on Jun. 26, 2009, entitled "SHIPPING CONTAINER ACTIVE LOCK RELEASE FAILSAFE", U.S. Provisional Patent Application No. 61/221,003, filed on Jun. 26, 2009, entitled "ACTIVE CONTAINER MANAGEMENT SYSTEM", U.S. Provisional Patent Application No. 61/287,018, filed on Dec. 16, 2009, entitled "LOCK MECHANISM USING ONE-WAY VALVE TO LOCK PISTON", U.S. Provisional Patent Application No. 61/287,029 filed on Dec. 16, 2009, entitled "SENSING A SIGNAL TO SENSE SECURITY OF A CONTAINER", and U.S. Provisional Patent Application No. 61/287,034 filed on Dec. 16, 2009, entitled "FLOATING J-HOOKS BETWEEN TWO BUSHINGS IN HOUSING WITH A SINGLE PISTON", each of which are hereby expressly incorporated by reference in their entirety for all purposes.

This application is related to all of U.S. patent application Ser. No. 12/825,177 filed on Jun. 28, 2010, which issued as U.S. Pat. No. 8,026,792 on Sep. 27, 2011, entitled "GLOBAL ASSET TRACKING ENTERPRISE SYSTEM", U.S. patent application Ser. No. 12/825,195 filed on Jun. 28, 2010, which issued as U.S. Pat. No. 8,022,573 on Sep. 20, 2011, entitled "SHIPPING CONTAINER ACTIVE LOCK RELEASE FAILSAFE", U.S. patent application Ser. No. 12/825,205 filed Jun. 28, 2010, entitled "ACTIVE CONTAINER MANAGEMENT SYSTEM", U.S. patent application Ser. No. 12/825,123 filed Jun. 28, 2010, entitled "SENSING A SIGNAL TO SENSE SECURITY OF A CONTAINER", and U.S. patent application Ser. No. 12/825,173 filed Jun. 28, 2010, which issued as U.S. Pat. No. 8,069,693 on Dec. 6, 2011, entitled "FLOATING J-HOOKS BETWEEN TWO BUSHINGS IN HOUSING WITH A SINGLE PISTON", each of which are hereby expressly incorporated by reference in their entirety for all purposes.

BACKGROUND

Global trade is one of the fastest growing portions of the global economy. More countries than ever are importing and exporting more products than ever before. The vast majority of products are shipped in one or more types of cargo containers. About 90% of the world's trade is transported in cargo containers. Containers include ISO (International Organization of Standardization) containers, shipped by ship or train, and truck containers.

Cargo containers can contain valuable products that are easy targets for thieves. Cargo containers can also contain dangerous products that could be used for evil purposes if allowed to fall into the wrong hands. Terrorists, for example, could use a cargo container to transport explosives, or radiological material in order to attempt to disrupt the economic infrastructure of developed countries. The vulnerability of international shipping has been the focus of a program known as the Container Security Initiative (CSI) that was launched in 2002 by the U.S. Bureau of Customs and Border Protection (CBP).

CSI addresses the security concerns of shipping by focusing on four main areas. The four main areas addressed by CSI include:

Using intelligence and automated information to identify and target containers that pose a risk for terrorism.

Pre-screening those containers that pose a risk at the port of departure before they arrive at U.S. ports.

Using detection technology to quickly pre-screen containers that pose a risk.

Using smarter, tamper-evident containers.

SUMMARY

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

An embodiment in accordance with the disclosure provides a lock mechanism including a one-way valve that is connected to a feed line coupling fluid chambers on both sides of a piston. When the valve is closed, the piston is held in place such that it can be moved only in one direction. This is accomplished by using a one-way valve that allows fluid to travel through the feed line in one direction only. The bars of the lock can be pressed closer together and the one-way valve will allow fluid to travel through the feed line only in one direction. When the valve is opened the fluid is free to travel through the feed line in both directions. Power is saved if a user activates the lock manually and the only power needed is to close the one-way valve. In an idle lock state, the locking mechanism is securely locked to one of the bars of the container without locking the container doors.

Another embodiment in accordance with the disclosure provides a lock mechanism for locking at least one door of a container in a closed position. The lock mechanism includes a housing, at least one lock member at least partially enclosed within the housing, the at least one lock member comprising a first lock member configured to engage a first portion of a container to lock at least one container door in a closed position, and a latching mechanism coupled to the at least one lock member. The latching mechanism includes a fluid chamber configured to hold a fluid, a piston slidably housed within the fluid chamber, and a valve coupled to the fluid chamber and configured to be in one of two states, the two states including an open state where fluid can flow through the valve in two directions to allow the piston to be moved in two directions, and a closed state where fluid is inhibited from flowing through the valve in at least one direction to prevent the piston from moving in at least one direction. The lock mechanism further includes a lock circuit at least partially enclosed within the housing, the lock circuit including memory, and a lock controller coupled to the memory and the latching mechanism and configured to receive commands related to the operation of the lock mechanism, wherein the lock controller is configured to cause the latching mechanism to be in one of the two states in response to the received commands.

Another embodiment in accordance with the disclosure provides a lock mechanism for locking at least one door of a container in a closed position. The lock mechanism includes lock member means including at least one lock member for engaging a first portion of a container to lock at least one container door in a closed position, means for slidably coupling the at least one lock member of the lock member means to a portion of the lock mechanism, latching means coupled to the slidably coupling means and configured to be in one of two states, the two states including an open state and a closed state, the latching means for allowing the at least one lock member of the lock member means to be moved in two directions when in the open state, and for preventing the at least one lock member of the lock member means from moving in at least one direction when in the closed state, means for receiving commands related to the operation of the lock mechanism, and means for controlling the latching means to be in one of the two states in response to the received commands.

Figure 1A:
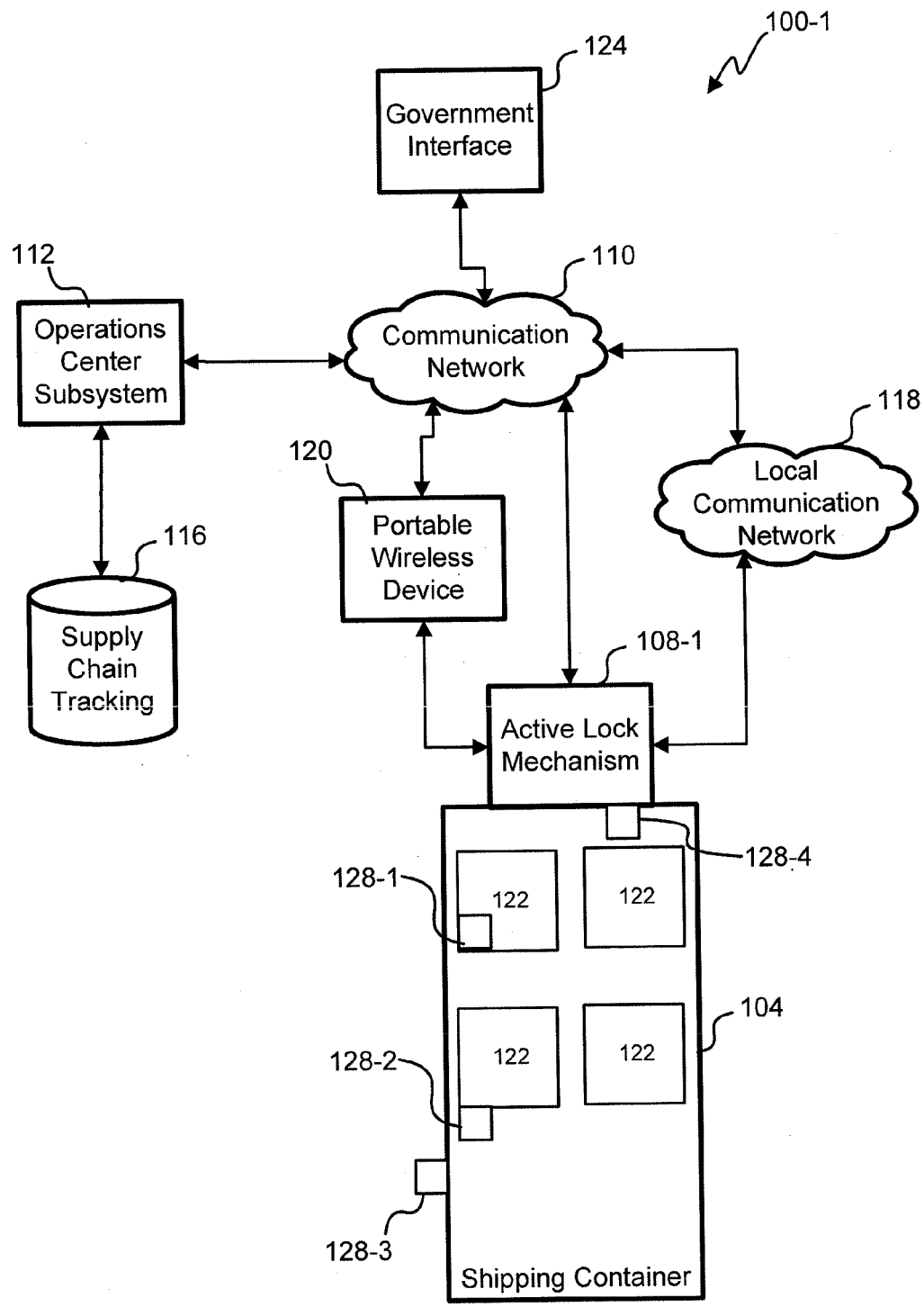
FIG. 1A depicts a example of an active container management system in which lock mechanisms in accordance with the disclosure are utilized.

The features, objects, and advantages of embodiments of the disclosure will become more apparent from the detailed description set forth below when taken in conjunction with the drawings. In the drawings, like elements bear like reference labels. Various components of the same type may be distinguished by following the reference label with a dash and a second label that distinguishes among the similar components. If only the first reference label is used in the specification, the description is applicable to any one of the similar components having the same first reference label irrespective of the second reference label.

DESCRIPTION

Referring initially to FIG. 1A, an active container management system 100-1 includes a shipping container 104, an active lock mechanism 108-1 and a communication network 110. The lock mechanism 108-1 is attached to the shipping container 104 such that doors of the shipping container are secured shut to prevent access inside the shipping container 104. For example, the lock mechanism can be secured to two door latch assembly bars in a locked state.

The lock mechanism 108-1 includes a wireless module (not shown) that is configured to communicate over the communication network 110. The wireless module can include one or more of WiFi (IEEE 802.11 standards), Bluetooth, Zigbee (802.15.4), cellular (e.g., CDMA, TDMA, GSM, etc.), RFID, satellite (e.g., Comsat), and/or infrared transceivers.

The wireless module can additionally communicate with sensor modules 128 located internal or external to the shipping container 104. Some embodiments could have wired connections to some or all of the sensor modules 128. The sensor modules 128 include a sensor module 128-1 located inside a shipping crate 122, a sensor module 128-2 attached externally to another crate 122, a sensor module 128-3 attached externally to the shipping container 104 and a sensor module 128-4 attached inside the shipping container 104 near the lock mechanism 108-1. In one embodiment, the wireless module comprises a wireless power system (e.g., RFID, ISO/IEC 14443 and WiFi active tags) that is powered inductively through the doors of the shipping container 104 by a wireless signal from the sensor module 128-4. Alternatively, other embodiments of the wireless module could use a RFID system to power the sensor modules 128 from outside the shipping container 104.

The sensor modules 128 can include one or more of CBRNE (chemical, biological, radiation, nuclear and explosives), temperature, pressure, humidity, weight, acceleration, sound, video, image, infrared, radiation (e.g., light or RF) and/or other types of sensors. The sensor modules 128 include a communication subsystem that can communicate directly with the locking mechanism 108-1 or indirectly through other sensor modules 128, a hub and/or a router. The communication subsystem can provide one or more wired and/or wireless communication capabilities. For example, the sensor module 128-4 could serve as a hub sensor and the sensor modules 128-1, 128-2 and 128-3 could communicate information to the hub sensor module 128-4 and the hub sensor module 128-4 could forward the information to the lock mechanism 108-1.

The sensor modules 128 could be attached magnetically, with adhesives or coupled in other ways so as to be anywhere internal or external to the container 104 and/or the crates 122. In one embodiment, the sensor modules 128 can include wall mounted sensors (mounted on the interior or exterior walls of the shipping container 104), and/or cargo mounted sensors (e.g., mounted on the shipping crates 122). The sensor modules 128 can be formed on or in a flexible material that includes an adhesive backing in order to attach the sensors to the container 104.

In one embodiment, the sensor modules 128 use a polymer sensor technology, such as but not limited to, fluorescent quenching or molecularly imprinted polymer (MIP) technology that can register detection of a substance that has come in contact with the sensor modules 128 when in an powered or non-powered state. These technologies interact with an additional conductive polymer and/or nanotechnology layer(s). The detection polymer and the conductive polymer or nanotechnology may be amalgamated or conjunctively combined. When the detection polymer is contaminated with CBRNE or another item of interest, the detection polymer interacts with the other polymer materials to store the detection information and/or a signal is generated and relayed to a microprocessor. The interaction can cause a chemical, physical and/or electronic change that is recorded. The change signifies that a detection of a target substance or substances has occurred. The detection event triggers changes in an electrical or data characteristic of the sensor that corresponds to the specific sensors targeted triggering substance. Each sensor can have one or many detection sensor inputs and can be configurable to accept combinations of any CBRNE substances.

The sensor modules 128 can include different power configurations including, an integral power source, a wireless power source which is powered when it is placed within an electromagnetic field generated by a RFID reader or other wireless power source, or a power source that is integrated with the container (e.g., a generator, a refrigeration unit, light circuits, etc.). Some sensor modules 128 have the ability to detect trace materials (vapors, emanations or particles) associated with a known compound that is or may be representative of an item of interest. Some sensor modules 128 detect the trace material(s) and report it wirelessly to an RFID reader to deter, prevent or contain the potential threat should it be validated. In addition to being able to detect the item of interest, some embodiments also provide an indication of the volume or strength of trace materials detected.

Discussion of smart cards and systems incorporating polymer sensor technology can be found in U.S. patent application Ser. No. 12/123,387 filed on May 19, 2008 and entitled "SMARTCARD CHEMICAL, BIOLOGICAL, RADIATION AND EXPLOSIVE DETECTOR," and in U.S. patent application Ser. No. 12/189,705 filed on Aug. 11, 2008 and entitled "TRANSIT SECURITY DETECTION SYSTEM," both of which are incorporated by reference in their entirety for all purposes. For the present embodiment, there can be one, two, three, four, or more sensors on a given smart card sensing package. The form factor of the smart card sensing module could be any size and use adhesive or magnetism to attach to the interior of the shipping container.

The sensor modules 128 and the lock mechanism 108-1 can also contain a unique authentication code such as, for example, a serial number, for identification purposes, or a cryptographic key or public/private cryptographic key pair. The authentication code of a certain sensor module 128 and/or lock mechanism 108-1 can be used to identify which sensor module 128 and which lock mechanism 108 a respective sensor signal is being received by. In addition, the container can have a unique serial number. By linking the lock serial number, the sensor serial numbers and the container serial numbers, in a memory module of the lock mechanism 108 for example, the unique serial numbers could be used to maintain a chain of custody of the sensor information for each of the sensor modules 128 associated with a given lock mechanism 108-1 and associated with a given shipping container 104.

The wireless module of the lock mechanism 108-1 can also communicate information with an operations center subsystem 112 via the communication network 110. Some embodiments could use different wireless media in the wireless module for communication with the sensor modules 128 than is used for the communication network 110, while others use the same wireless media. The information can include manifest data of contents of the shipping container 104, sensor data received from sensor modules 128 associated with the shipping container 104. Tracking data received by the operations center 112 from the locking mechanism 108-1 is stored in a supply chain tracking database 116.

The lock mechanism 108-1 can also communicate information over the communication network 110 to a government interface 124. The government interface 124 can be, for example customs, boarder patrol, etc. The government interface 124 allows the relevant governmental officials to access manifest, sensor, chain of custody, tracking information, etc. There can be different information that is made available to different governmental agencies. Some non-governmental organizations may also have access to certain information, for example, tracking information for a shipper or recipient of cargo. Some embodiments allow the government interface to lock-down access to authorized personnel for a particular storage container.

The lock mechanism 108-1 can also communicate with a portable wireless device 120 and/or a local communication network 118. The portable wireless device 120 and/or the local communication network 118 can serve as an intermediary link to the communication network 110 in order for the lock mechanism 108-1 to communicate with the operations center 112 or the government interface 124.

In one embodiment, the local communication network 118 is a mesh/adhoc network (e.g., Zigbee). A mesh network is made up of multiple wireless devices that are not situated in permanent and/or well defined locations. Other lock mechanisms 108-1 can be the wireless devices, also known as nodes, of the mesh network. Other wireless devices can also make up nodes of the mesh network. Lock mechanisms 108-1 will continue to forward a message to other lock mechanisms 108, or other nodes, until the message reaches a node that can communicate with the communication network 110. By having multiple lock mechanisms 108 able to communicate with each other via the mesh network, lock mechanisms 108 that are located deep in the hold of a ship, in a warehouse or buried under other shipping containers 104 in a port or depot can be able to communicate with remote locations such as the operations center subsystem 112 or the government interface 124 via the communication network 110.

The wireless device 120 can be a PDA, a cellular telephone, a satellite telephone or a laptop computer. The wireless device 120 can use a short range wireless system such as Bluetooth, Zigbee (IEEE 802.15.4), infrared, UWB, and/or WiFi to communicate with the lock mechanism 108-1. In one embodiment, the wireless device 120 is an RFID (e.g., ISO/IEC 14443) reader that powers the lock mechanism 108-1 with an inductive power signal. The wireless device 120 or other device communicating with the active lock mechanism 108-1 uses public and/or private keys to authorize and authenticate a communication channel. Once a cryptographically-secure communication channel is configured, communication of commands and data through the communication channel can be performed. In this way, locking, unlocking, data query, etc. can only be performed by authorized devices and/or individuals.

Figure 1B:
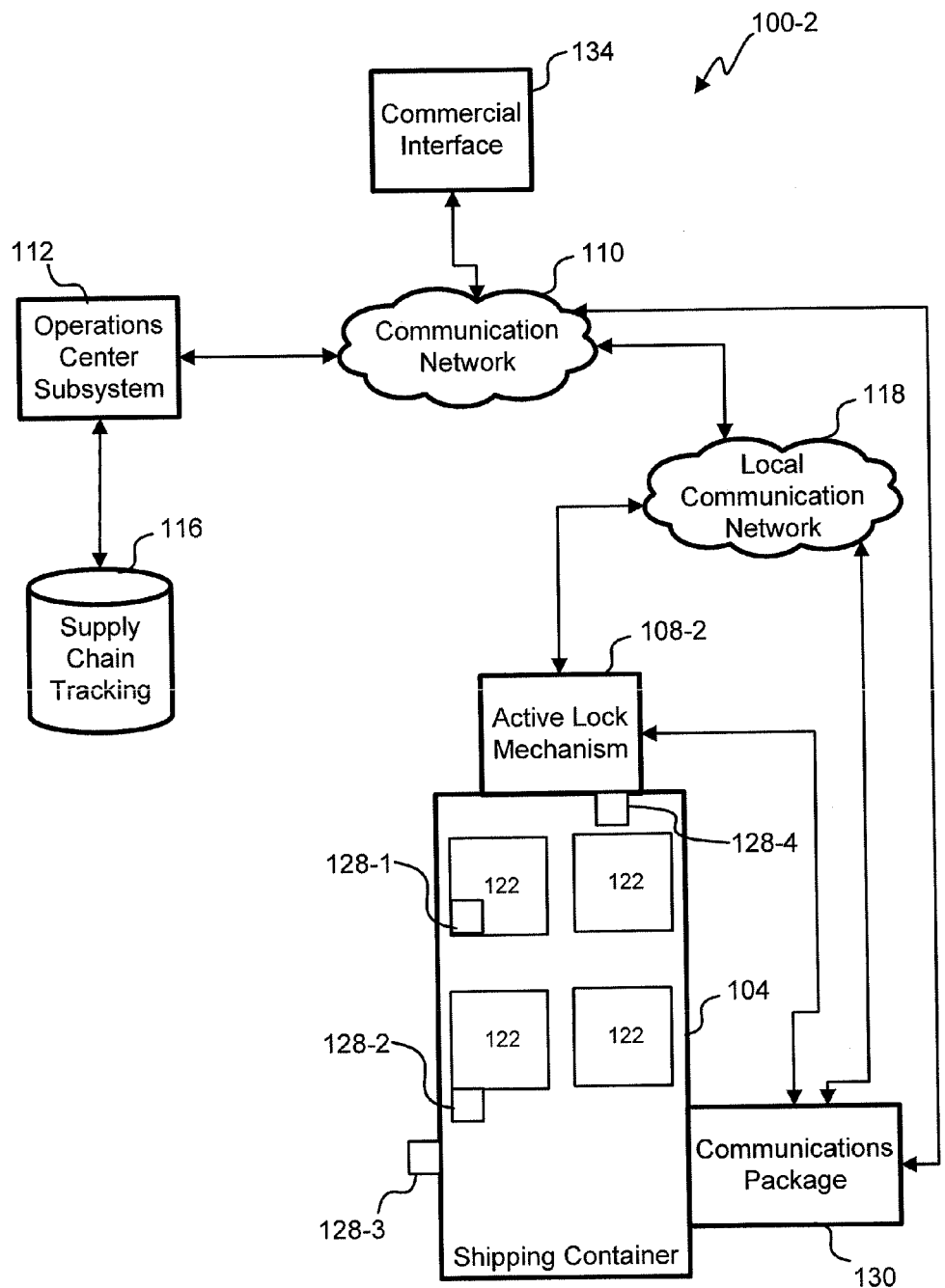
FIG. 1B depicts another example of an active container management system in which lock mechanisms in accordance with the disclosure are utilized.

Referring next to FIG. 1B, another embodiment of an active container management system 100-2 is shown. The container management system 100-2 differs from the container management system 100-1 by including a lock mechanism 108-2 than includes only short range wireless communications capability such as Bluetooth, WiFi, Zigbee, etc. The lock mechanism 108-2 can use the short range wireless to communicate with a communications package 130 coupled to the container 104 or with the local communication network 118.

The communication package 130 can be located outside of the container or inside the container with an external antenna. The communications package 130 can include an integrated power source such as a solar cell and/or battery. The communications package 130 could also be powered by electrical systems of the container 104. The communications package 130 can communicate with the local communications network 118 and the communications network 110 using short range and/or long range wireless systems.

The container management system 100-2 also includes a commercial interface 134. The commercial interface 134 can run by a business entity that tracks the transport of the container 104. The business entity could be the entity in charge of the distribution of the contents of the container 104 or could be a third party that is responsible for tracking the container 104 during transport. The commercial interface 134 can communicate with the communications package 130 to retrieve information that the lock mechanism 108-2 has forwarded to the communications package 130. Similarly, the commercial interface 134 can communicate with the local communication network 118 to retrieve such information. The retrieved information can include manifest, sensor, chain of custody, tracking information, etc. The commercial interface 134 can also communicate information to the lock mechanism 108-2 via the local communication network 118 or the communications package 130. The information communicated to the lock mechanism 108-2 can include updated manifest information, identification and authentication code information of new sensors to be added to the container 104, or updated operational parameters for reprogramming the operational procedures of the lock mechanism 108-2.

Figure 2:
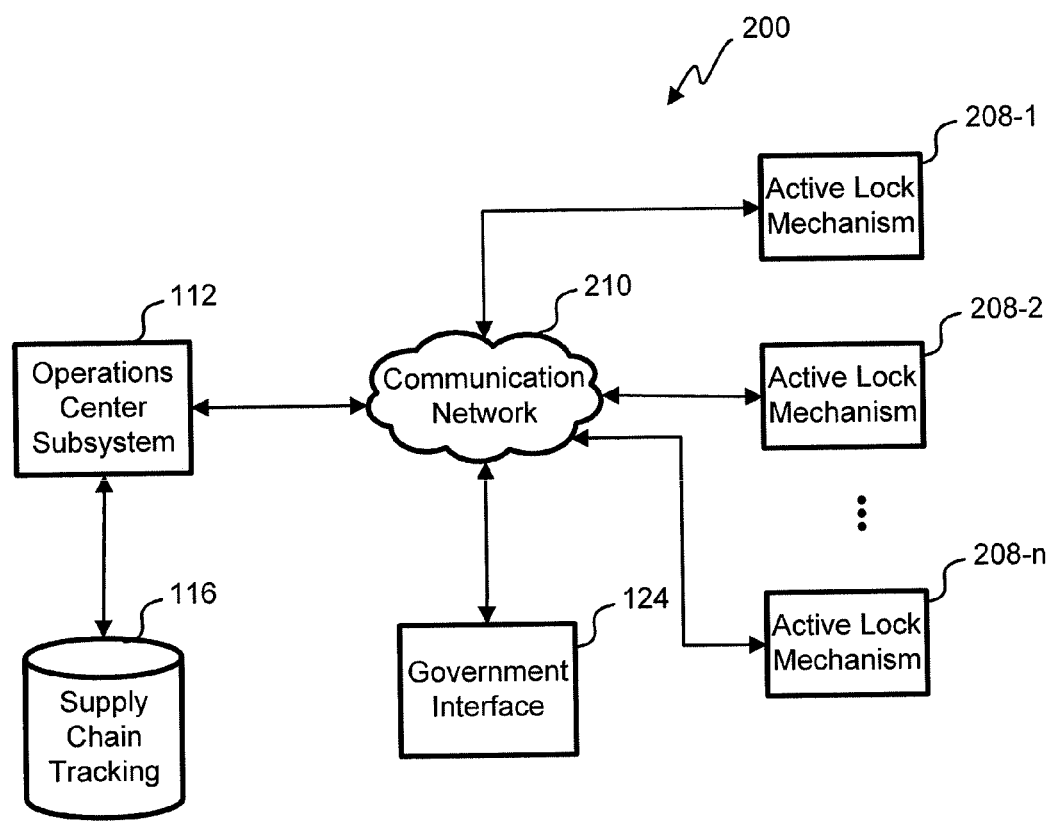
FIG. 2 depicts another example of an active container management system in which lock mechanisms in accordance with the disclosure are utilized.

Referring next to FIG. 2, another active container management system 200 includes multiple active lock mechanism 208-1 through 208-n. The lock mechanisms 208 can be removably or fixedly attached to one or more doors of shipping containers such as the shipping container 104 of FIG. 1. The lock mechanisms 208 can be collocated with the shipping container in a hold of a ship, on a train, in a depot, etc. In addition, the lock mechanisms 208 can be located in different geographic locations throughout the world.

The lock mechanisms 208 are configured to communicate over a communication network 210 to the operations center 112, the government interface 124 and/or the commercial interface 130. The communication network 210 can include one or more wired and/or wireless networks such as the communication network 110 and/or the local communication network 118 of FIG. 1. As discussed above, the lock mechanisms 208 can communicate with each other using a wireless adhoc or mesh network instead of a hub and spoke communication topology. Lock mechanisms 208 in a mesh configuration can pass information from other lock mechanisms 208, or communications packages 130, until reaching part of the communication network 210 that can pass information to the government interface 124 or operations center subsystem 112.

Figure 3:
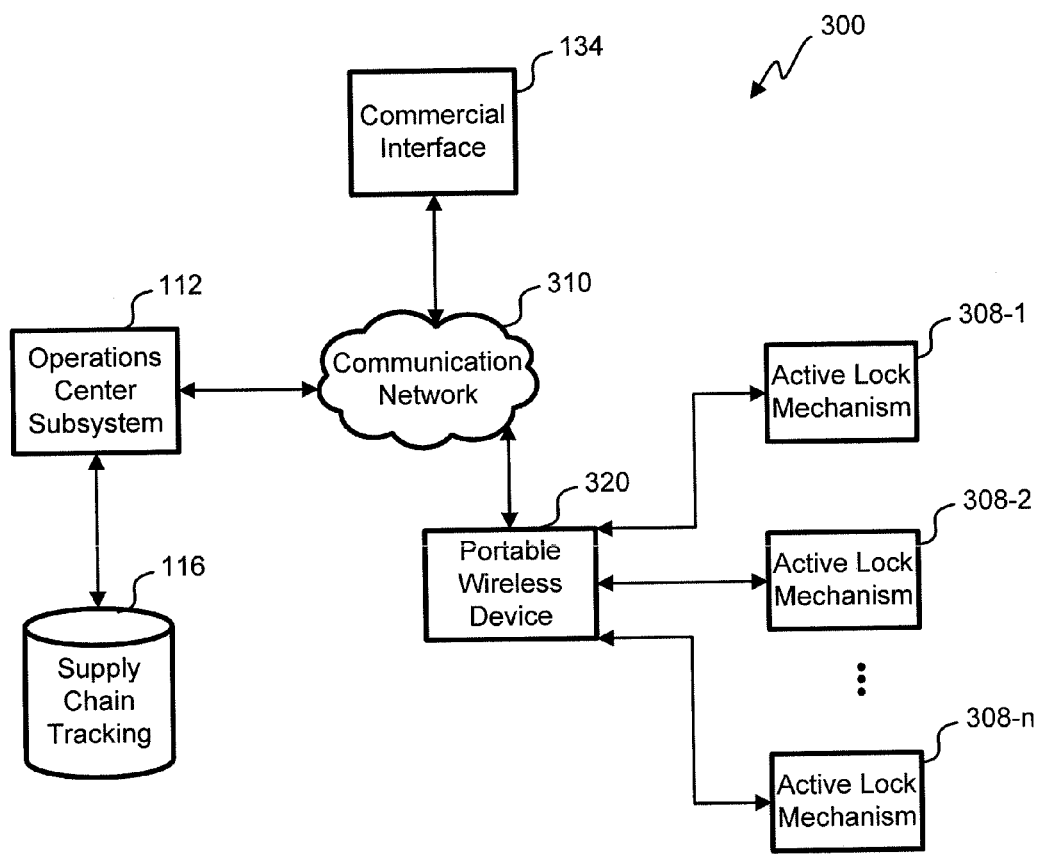
FIG. 3 depicts yet another example of an active container management system in which lock mechanisms in accordance with the disclosure are utilized.

Referring next to FIG. 3, another active container management subsystem 300 includes multiple lock mechanism 308-1 through 308-n. Unlike the lock mechanisms 208 in FIG. 2, the lock mechanisms 308 communicate wirelessly with a portable wireless device 320. The wireless device 320 can be similar to the wireless device 120 discussed above in reference to FIG. 1. The wireless device 320 can serve as an intermediate link between the lock mechanisms 308 and a communication network 310 in one embodiment. Other embodiments could optionally use the wireless device 320 as an intermediate link or could communicate directly with the communication network 310 should it be available.

The wireless device 320 can communicate with the lock mechanisms 308 one at a time or as a group. In this embodiment, the wireless device 320 establishes secure communications links with the lock mechanisms 308 in order to issue commands (e.g., lock and unlock commands), and to communicate data to and from the lock mechanisms 308. A secure communication link with the communication network 310 could alternatively be used. For example, the portable wireless device 320 could communicate with active lock mechanisms 308 indirectly though the communication network 310.

Data communicated to the lock mechanisms 308 can include programming parameters affecting how the lock mechanisms 308 function, or manifest information regarding contents of a shipping container 104 that a particular lock mechanism 308 is securing. Data retrieved from the lock mechanism 308 can include log data including times, locations and sequence of events such as sensor readings. The data retrieved from the lock mechanisms 308 can also include manifest information regarding the contents of a container that the lock mechanism is securing.

The wireless device 320 can forward information received from the lock mechanism 308 to the operations center 112 and/or the commercial interface 134 via the communication network 310. The information is tied to an authentication information such as an address, serial number, or cryptographic key, of an active lock mechanism 308, a shipping container 104, and/or individual sensors. By knowing the address, serial number, or cryptographic key, the shipping container can be verifiably tied to specific active lock mechanisms and sensors. By verifying that the correct authentication information is associated with the correct shipping container, chain-of-custody can be established. For example, if a sensor were switched out with a faulty one after securing the shipping container, the sensor would report an incorrect address or serial number such that authentication would fail.

Figure 4:
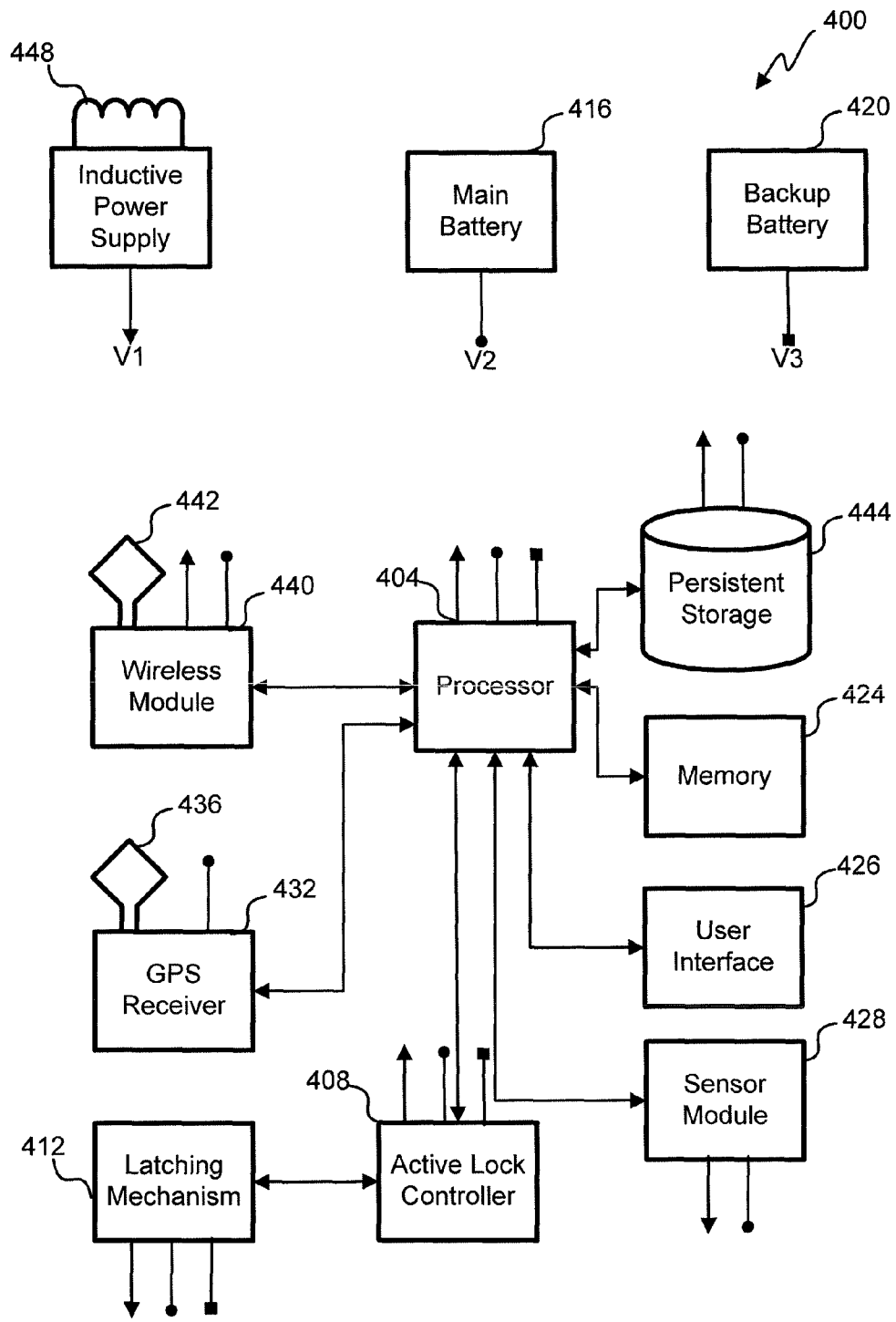
FIG. 4 is a functional block diagram of an embodiment of a lock mechanism in accordance with the disclosure.

Referring next to FIG. 4, a block diagram of an embodiment of an active lock circuit 400 is shown. The lock circuit 400 can be part of any of the lock mechanisms 108, 208 or 308 discussed above. The lock circuit 400 includes a processor 404, a lock controller 408, a latching mechanism 412, a main battery 416, a backup batter 420, a memory 424, a user interface 426, a sensor module 428, a GPS receiver 432, a wireless module 440, persistent storage (e.g., Flash, ROM or some other non-volatile memory) 444 and an inductive power supply 448.

The processor 404 (or a microcontroller) runs software using the memory 424 and/or the persistent storage 444. The persistent storage 444 can be used to store sensor data received from sensor modules associated with a shipping container that the lock mechanism is securing. The persistent storage 444 can also store parameters that determine how the processor 404 causes other modules of the lock circuit 400 to perform various functions (e.g., periodic wakeup times, alarm trigger thresholds, etc.).

The lock controller 408 is coupled to the processor 404. The lock controller 408 can be a microcontroller or a state machine, depending on the complexity of the functions being performed by the lock controller 408. The lock controller 408 is configured to control the latching mechanism 412 of a lock mechanism to lock and unlock doors of a shipping container, or other container, to prevent access inside the shipping container. The lock mechanism can be securely attached to a single bar of a shipping container, in a state referred to as an idle lock state, where the shipping container is not locked, but the lock mechanism cannot be easily removed from the single bar without incurring significant damage to the lock mechanism and/or the container. In the idle lock state, the lock mechanism is secured to the single container bar in such a way that the lock mechanism does not slide down the container bar under its own weight. The latching mechanism 412 can include an active drive mechanism such as a hydraulic mechanism, a solenoid, or a screw drive, for example, to actuate locking members of the lock mechanism to be in the locked state. The latching mechanism 412 can also include a passive mechanism that does not move locking members that attach to the shipping container. Passive latching mechanisms can utilize hydraulic means, magnetic means, or mechanical means for engaging the locking members when they are in a position to secure the shipping container. For example, a person could hand-move the locking members to engage the latch assembly bars of a shipping container and then the passive latching member could be activated, thereby engaging the locking members.

During normal operating conditions, power is supplied, directly or indirectly (e.g., via the processor 404) to the various modules of the lock circuit 400 via the main battery 416, as indicated by the voltage symbol V2 coupled to the main battery 416 and the other components. Prior to being associated with the shipping container, the lock circuit 400 can be in a lower power mode and consumes little or no power from the main battery 416. The backup battery 420 is provided in order to power the lock circuit 400 if and when the main battery is low on power. The backup battery may supply power to a subset of the modules of the lock circuit 400, as indicated by the V3 symbol coupled to the backup batter 420 and the associated components. Details of the use of the backup battery 420 are discussed below in reference to FIG. 12.

The user interface 426 can include one or more input devices and/or one or more output devices. Input devices can include one or more buttons, toggle switches, dials, etc. Output devices can include lights (e.g., LEDs, LCDs, OLEDs, etc.), a display panel and/or an audio output. In some embodiments, the user interface 426 is only available during manufacture and test. In the field, the lock circuit 400 is sealed within the enclosure of the lock mechanism. In one embodiment, the enclosure is sealed such that there are no wired interfaces to any portions of the lock circuit 400. A PDA is used to wirelessly communicate with the user interface and provide a soft interface to the lock circuit 400.

The sensor module 428 can include passive sensors or active sensors. Passive sensors require no power to sense and record a change in a condition and can be analyzed/queried at a later date to determine if the condition has changed. The passive and active sensors could be located inside the lock mechanism, on the outside of the shipping container, on the inside of the shipping container, and/or attached to the cargo. Active sensors require a power source and detect changes continually or intermittently. Active sensors can be battery powered, powered from the container, powered with a wire from the lock mechanism, and/or wirelessly powered using RF fields supplied by a wireless power signal.

The sensors subsystem 428 can include sensors configured to detect the presence of the shipping container. For example, sensors could include bar sensors associated with hooks of the lock mechanism, where the bar sensors are configured to detect that one or more bars of a shipping container are in contact with the hooks. In addition, the sensor module 428 can include a sensor to detect the door(s) of the shipping container and/or verify that the doors are closed.

The sensor module 428 could also include sensors for detecting temperature, pressure, humidity, radiation (e.g., light or RF) or any CBRNE measurements. Accelerometers and/or strain gauges could also be included in the sensor module 428 in order to detect an attempt to forcibly remove the lock mechanism from the shipping container (e.g., with a crowbar) or excessive movement that could damage the cargo.

The GPS receiver 432 is configured to receive signals, via a GPS antenna 436, from a plurality of GPS satellites in order to determine the global location of the lock mechanism. Instead of, or in addition to GPS, other types of navigation systems such as GLONASS (Russia), Galileo, Beidou (China), WiFi assisted location systems, and/or cellular based location systems can also be used.

The wireless module 440 includes one or more wireless communication systems including WiFi (IEEE 802.11 standards), Bluetooth, Zigbee, cellular (e.g., CDMA, TDMA, GSM, etc.), WiMax (802.16), RFID (e.g., ISO/IEC 14443), satellite (e.g., Comsat), or infrared. The wireless module 440 includes one or more wireless antenna 442. In one mode, the wireless module 440 can use short range wireless (e.g., Bluetooth, Zigbee or WiFi) to communicate with sensor modules on/in the shipping container or to communicate with a local network. In another mode, the wireless module 440 can use longer range communication links such as cellular, satellite, WiMax, etc., to communicate with the communication network 310 and/or portable wireless device 320. In some embodiments, the wireless antenna 442 (or the GPS antenna 436) is part of the lock mechanism that is used for other purposes (e.g., the housing, or one or more locking members that engage the container).

The inductive power supply 448 is configured to receive a wireless power signal from an external source, such as an RFID reader device, or another device associated with the container. The external source could be one of the sensor modules 128, the communications package 130 or one of the portable wireless devices 120 or 320, for example. The power signal can be received from wireless power sources installed at weigh stations, ports, depots, and other areas where shipping containers are located for extended periods of time. The external source supplies a wireless power signal that is received by an inductive antenna of the inductive power supply 448 and inductively converted into electrical power.

The power from the inductive power supply can be used to wakeup and/or power any of the components of the lock circuit 400. In the embodiment shown, voltage V1 of the inductive power supple 448 is coupled to the processor 404, the active lock controller 408, the latching mechanism 412, the sensor module 428, the wireless module 440 and the persistent storage 444. Depending on the function being performed, the voltage V1 of inductive power supply 448 can be selectively supplied to any of these components. For example, the inductive power supply 448 can used instead of the backup battery 420 to provide power to the active lock controller 408 and the latching mechanism 412 to provide a failsafe unlocking function. The inductive power supply 448 can also be used to power the persistent storage 444 to retrieve previously stored sensor data The persistent storage 444 could include a low power microcontroller that is powered by the inductive power supply 448. In some embodiments, the sensor module(s) or other systems of the shipping container wirelessly power the lock circuit 400.

In one embodiment, the inductive power supply 448 includes a communication subsystem that can communicate wirelessly with sensor modules and or portable wireless devices. After being powered by the power signal, the communication subsystem of the inductive power supply 448 receives a data signal from one of the sensor modules and/or a portable wireless device. The data signal may or may not be received from the same device that the power signal was received from. After receiving the data signal, the communication subsystem can save the data in a memory associated with the communication subsystem of the inductive power supply 448, the persistent storage 444, or wakeup the processor 404 and communicate the data to the processor 404.

The lock circuit 400 is exemplary only and other lock circuits can include more or fewer components, depending on the way in which functions are distributed among the other components of the container management system in which the lock circuit is being employed. In any given system, functions can be provided by various subsystems including, a lock subsystem, a sensor subsystem associated with the container or contents within the container, or a communication subsystem coupled to or integrated with the container.

Figure 5A:
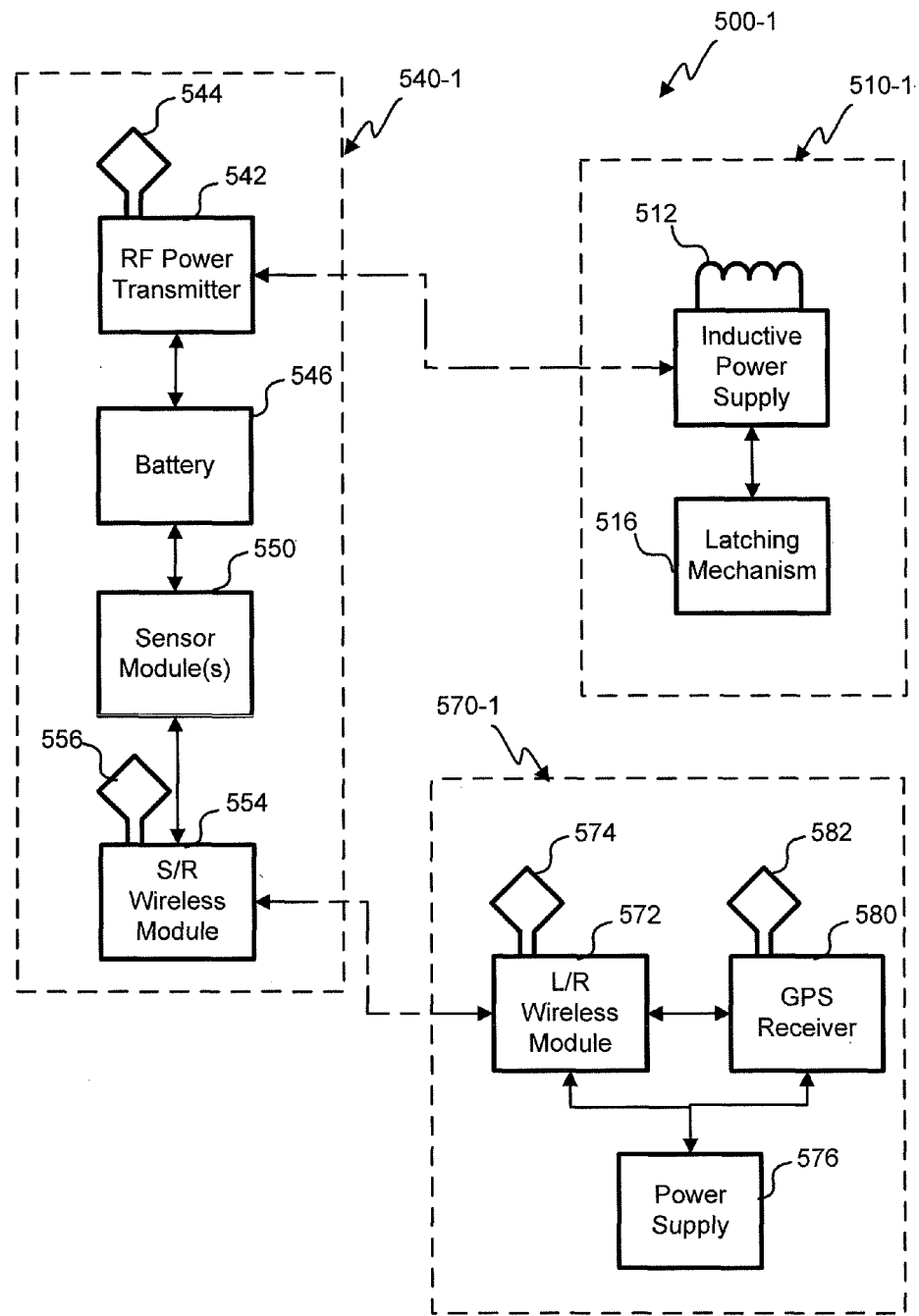
FIGS. 5A, 5B, 5C and 5D are functional block diagrams of container systems used for monitoring and communicating events at a container in a container management system in accordance with the disclosure.

Referring next to FIG. 5A, a container management system 500-1 includes a lock subsystem 510-1, a sensor subsystem 540-1 and a communication subsystem 570-1. In the container management system 500-1, the lock mechanism is a simple (dumb) lock mechanism with the only components of the lock subsystem 510-1 being an inductive power supply 512 and a latching mechanism 516. The inductive power supply 512 receives a power signal (indicated by a dashed line) being transmitted via an antenna 544 coupled to a RF power transmitter 542 of the sensor subsystem 540. The antenna 544 can be located in proximity to the lock subsystem 510-1 such that the received power signal is at a sufficient power level to power the latching mechanism 516. For example, the sensor subsystem 540-1 could be just inside the container doors that the lock subsystem 510-1 is securing.

The sensor subsystem 540-1 also includes a battery 546, sensor module(s) 550 and a short range wireless module 554 with a short range antenna 556. The sensor subsystem 540-1 can be removably mounted inside the container doors that are being secured by the lock mechanism. For example, the sensor subsystem 540-1 could be magnetically mounted to one of the container doors or stowed in a bag that is hanging inside the container door. By being removable, the sensor subsystem 540-1 can be moved from container to container to be re-associated with different lock mechanisms and different containers.

Since there is a large amount of space in a container, the battery 546 can be a rather large battery, e.g., shoebox size. Such a battery can provide wired power to multiple sensor modules 550 integrated with the sensor subsystem, and/or provide power wirelessly to other sensor modules located away from the sensor subsystem 540-1.

The latching mechanism 516 can be a state machine. When the inductive power supply 512 is powered up by the RF power transmitter 542, an encrypted command can be issued from the inductive power supply 512 to the latching mechanism to lock, or unlock the lock mechanism. In some embodiments, the inductive power supply 512 provides enough power on its own to unlatch or latch the lock mechanism. In other embodiments, the inductive power supply is coupled to a battery (not shown) and the power signal from the RF power transmitter is used to charge the battery of the lock subsystem and the battery power is then used to latch or unlatch the lock mechanism.

The short range wireless module 554 communicates with a long range wireless module 572 of the communications subsystem 570-1 (via a signal between the short range antenna 556 and an antenna 574 coupled to the long range wireless module 572. The long range wireless module 512 includes both short range wireless systems (e.g., one or more of WiFi, Bluetooth and/or Zigbee) as well as long range wireless systems (e.g., a cellular network (WiMax, CDMA, GSM), or a satellite network)). The short range wireless module 554 communicates information indicative of states of the sensor modules 550 and the lock subsystem 510-1 to the long range wireless module 572 which then forwards such information to remote centers such as the operations center 112, the government interface 124 or the commercial interface 134.

The communications subsystem 570-1 also includes a GPS receiver 580 with a GPS antenna 582, and a power supply 576. The GPS receiver 580 is used to gather location information. The location information is included with the sensor and lock mechanism data that is communicated to the remote data centers. The power supply 576 can be a solar array, a battery, or a connection to a power supply of the container.

Figure 5B:
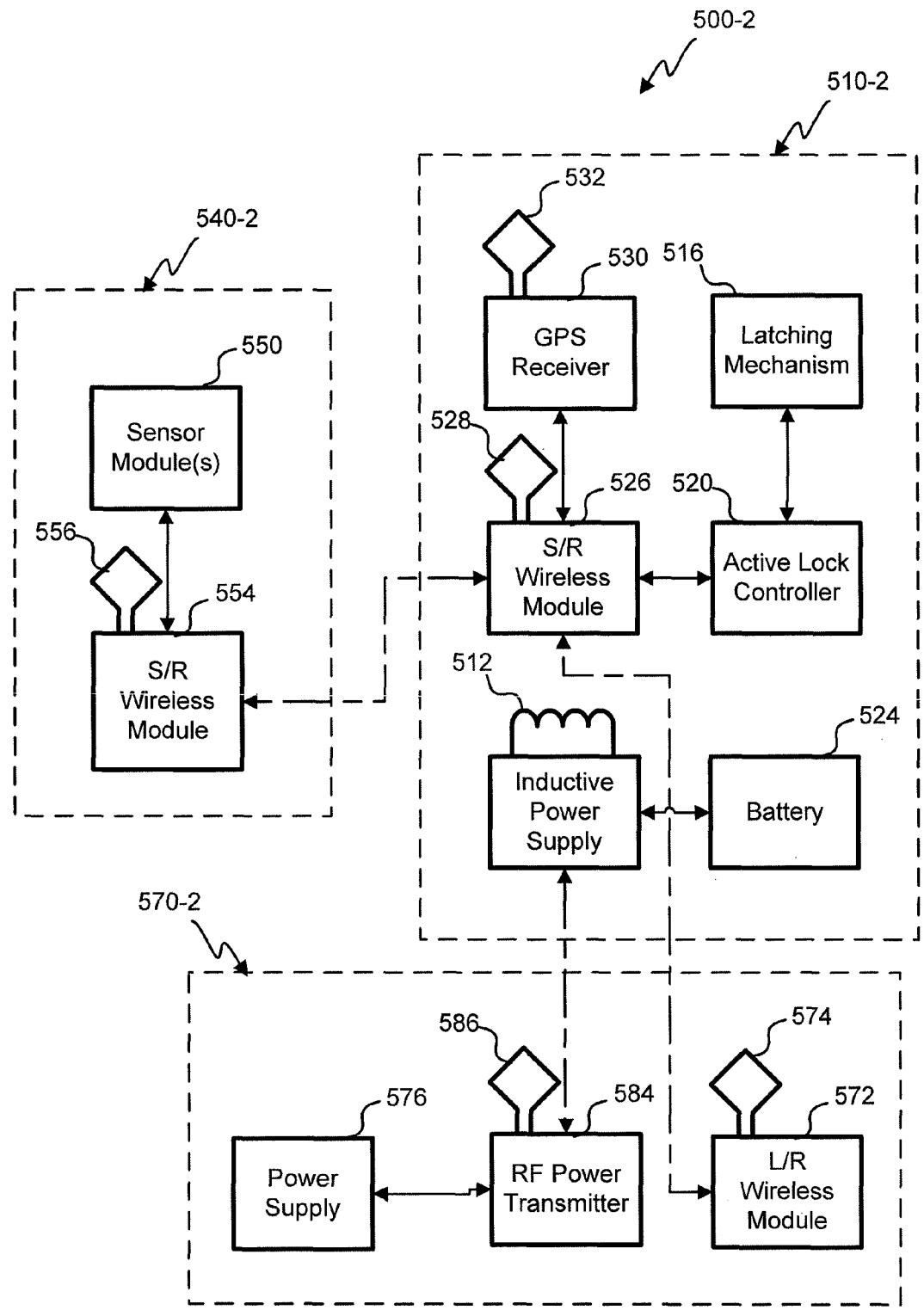

Referring next to FIG. 5B, another container management system 500-2 includes a lock subsystem 510-2, a sensor subsystem 540-2 and a communications subsystem 570-2. The container management system 500-2 differs from the container managements subsystem 510-1 in that the sensor subsystem 540-2 is simpler than the sensor subsystem 540-1 while the lock subsystem 510-2 is more complicated than the lock subsystem 510-1. In addition, the communication subsystem 570-2 includes an RF power transmitter 584 and an RF power antenna 586 that transmits a power signal to an inductive power supply 512 of the lock subsystem 510-2. A power supply 576 (e.g., a solar array, a battery or a power supply of the container) is large enough to provide wireless power to the lock subsystem 510-2.

The lock subsystem 510-2 also includes an active lock controller 520, a latching mechanism 516, a battery 524, a short range wireless module 526 and a GPS receiver 530. The inductive power supply 512 is coupled to the battery 524 to charge the battery 524. The battery 524 then supplies power to the other components of the lock subsystem 510-2.

In contrast to the dumb lock subsystem 510-1, the active lock controller 520 includes a micro-controller that performs monitoring and locking/unlocking functions associated with the lock mechanism. A short range wireless module 526 is configured to communicate with another short range wireless module 554 of the sensor subsystem 540-2. The simple sensor subsystem 540-2 also includes a sensor module 550 including one or more sensors associated with the container or contents of the container. The sensor subsystem 540-2 can be powered by a battery (not shown) or a power source of the container (e.g., from a light circuit or a refrigeration system).

The lock subsystem 510-2 also includes a GPS receiver 530 with a GPS antenna 532. The short range wireless module 526 communicates sensor data, lock security data, and GPS location data to a long range wireless module 572 (via a long range antenna 574). The long range wireless module 572 communicates this data to one of the remote data centers.

Figure 5C:
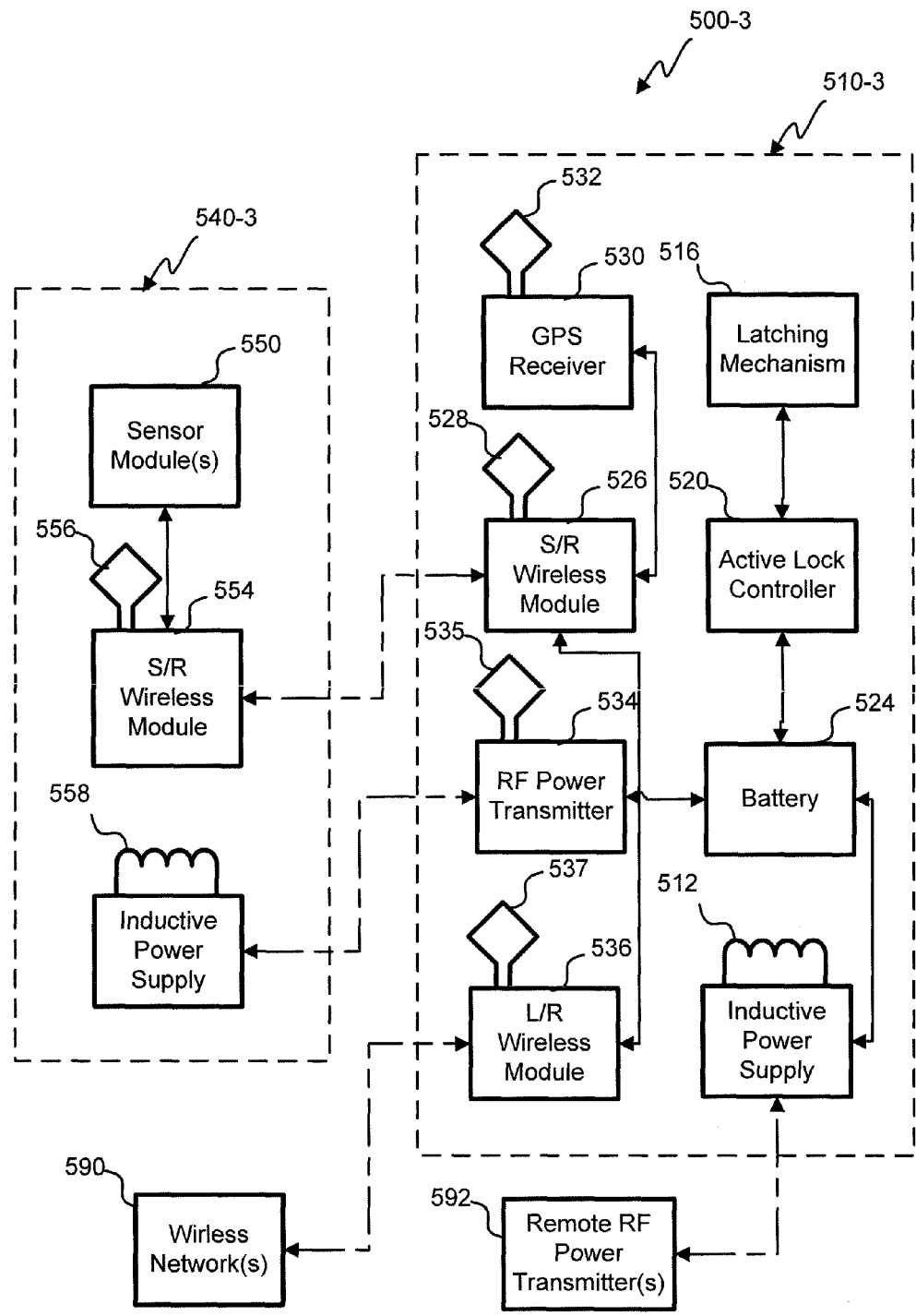

Referring next to FIG. 5C, another container management 510-3 includes a lock subsystem 510-3 and a sensor subsystem 540-3, but does not include a communications subsystem. The lock subsystem 510-3 includes all the components of the lock subsystem 510-2, and also includes a long range wireless module 536 with a long range antenna 537 and a RF power transmitter 534.

The RF power transmitter 534 is used to provide power to the sensor subsystem 540-3 by transmitting a power signal to an inductive power supply 558. This is the opposite of the power arrangement of the container management system 510-1 where the sensor subsystem 540-1 supplied wireless power to the lock mechanism 510-1. The battery 524 of the lock mechanism 510-3 is large enough to be able to periodically, or upon receipt of a trigger event (e.g., detection of tampering with the container) to provide power to the sensor subsystem 540-3.

Instead of receiving a wireless power signal from a communication subsystem, as in the container management system 510-2, the inductive power supply 512 receives power signals from remote power transmitters 592. Such remote power transmitters can be located at container depots, ports, loading docks, weigh stations or other points where the container is located for an extended period of time.

The long range wireless module 536 receives sensor data from the short range wireless module 526 (sensor data retrieved from the sensor modules 550) and receives lock data from the active lock controller 520. The sensor and lock data is transmitted by the long range wireless module 536 to wireless networks 590. The wireless networks 590 can include any wireless networks discussed above.

Figure 5D:
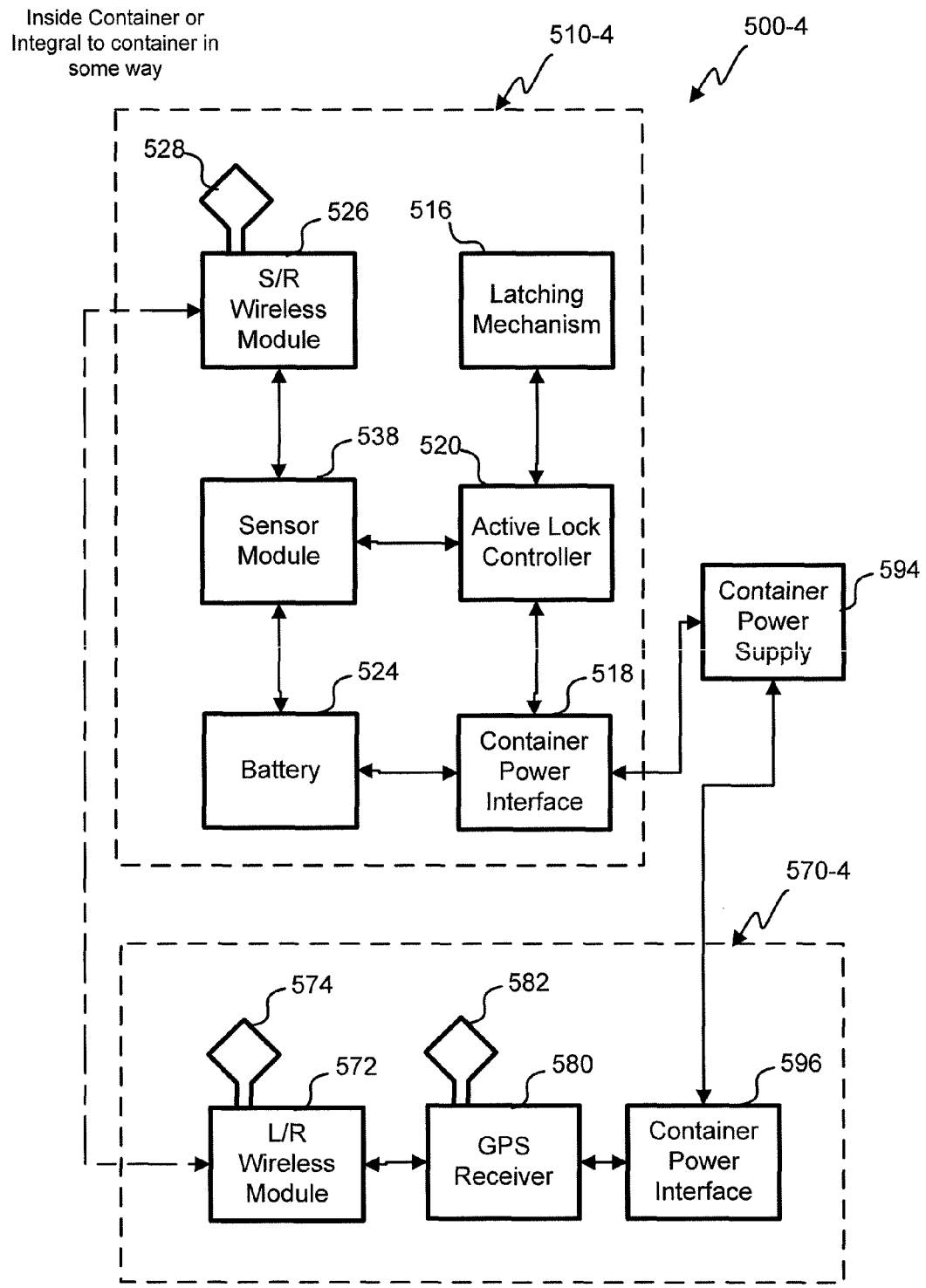

Referring next to FIG. 5D, yet another container management system 500-4 includes a lock subsystem 510-4 and a communications subsystem 570-4, but does not include a sensor subsystem. Instead of communicating wirelessly with a sensor subsystem in or on the container, the lock subsystem 510-4 includes a sensor module 538. The sensor module 538 can contain sensors to detect tampering, environmental conditions, etc.

The lock subsystem 510-4 also includes a container power interface 518 that is coupled directly to a container power supply 594. The container power supply 594 can be a light circuit, a refrigeration system or a generator. The container power interface is coupled to the battery 524 to maintain a charge level. The battery 524 can be used for backup purposes when the container power supply fails or is not available for any reason.

The communications subsystem 570-4 includes another container power interface 596 coupled to the container power supply 594. The container power interface 596 can be coupled to the same container power supply 594 as the lock subsystem 510-4 or a different one.

The container management systems 500 shown in FIGS. 5A-D are exemplary only and are not limiting. The components shown in the lock subsystems 510, the sensor subsystems 540 and the communications subsystems 570 can be rearranged or omitted. Other components can also be added. For example, other sensor modules (e.g., tamper modules) can be located in or on the container and can be powered by and communicate sensor data with any of the subsystems.

Figure 6A:
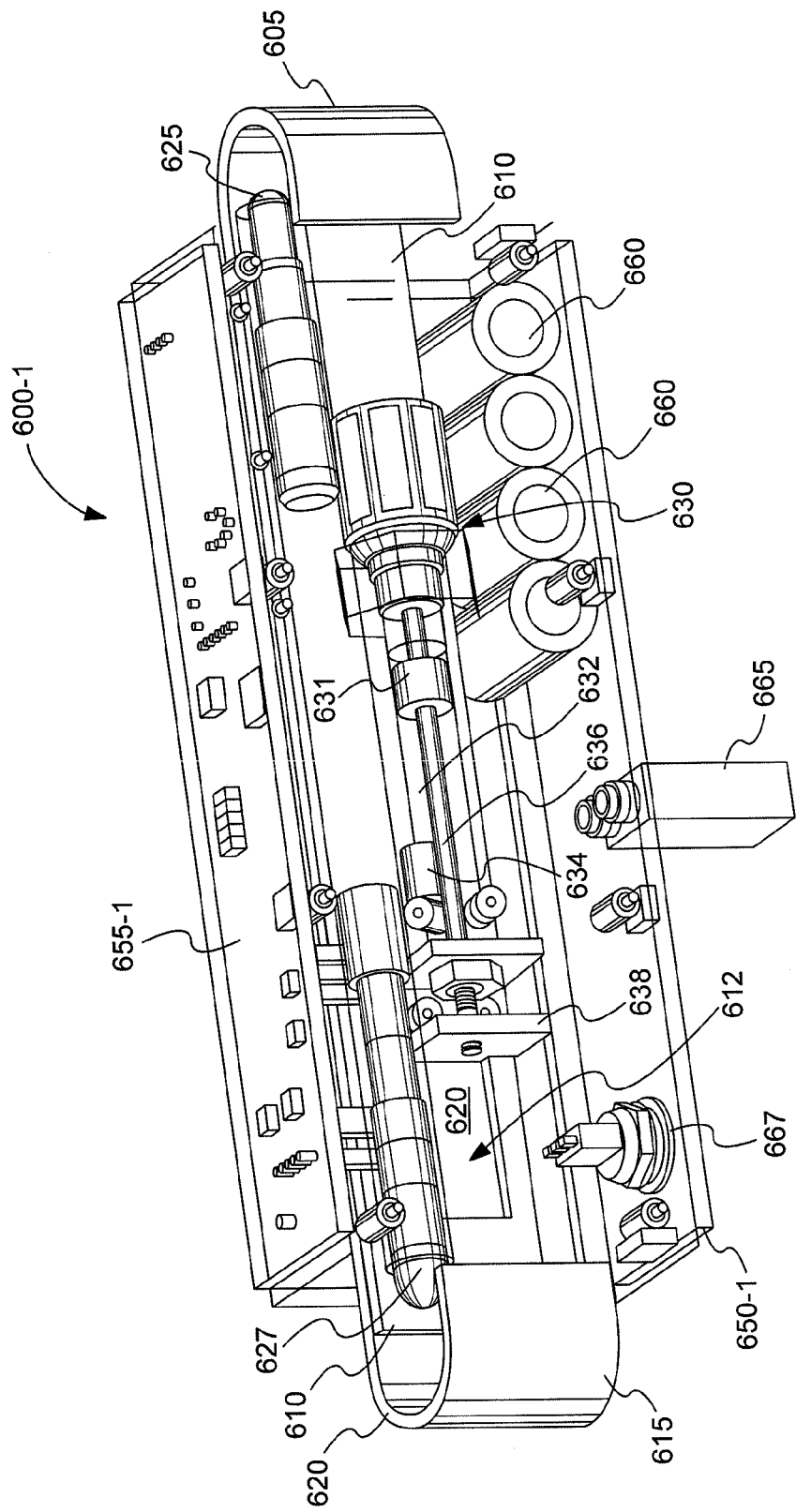
FIGS. 6A, 6B and 6C are perspective views of embodiments of lock mechanisms in accordance with the disclosure.
Figure 6B:
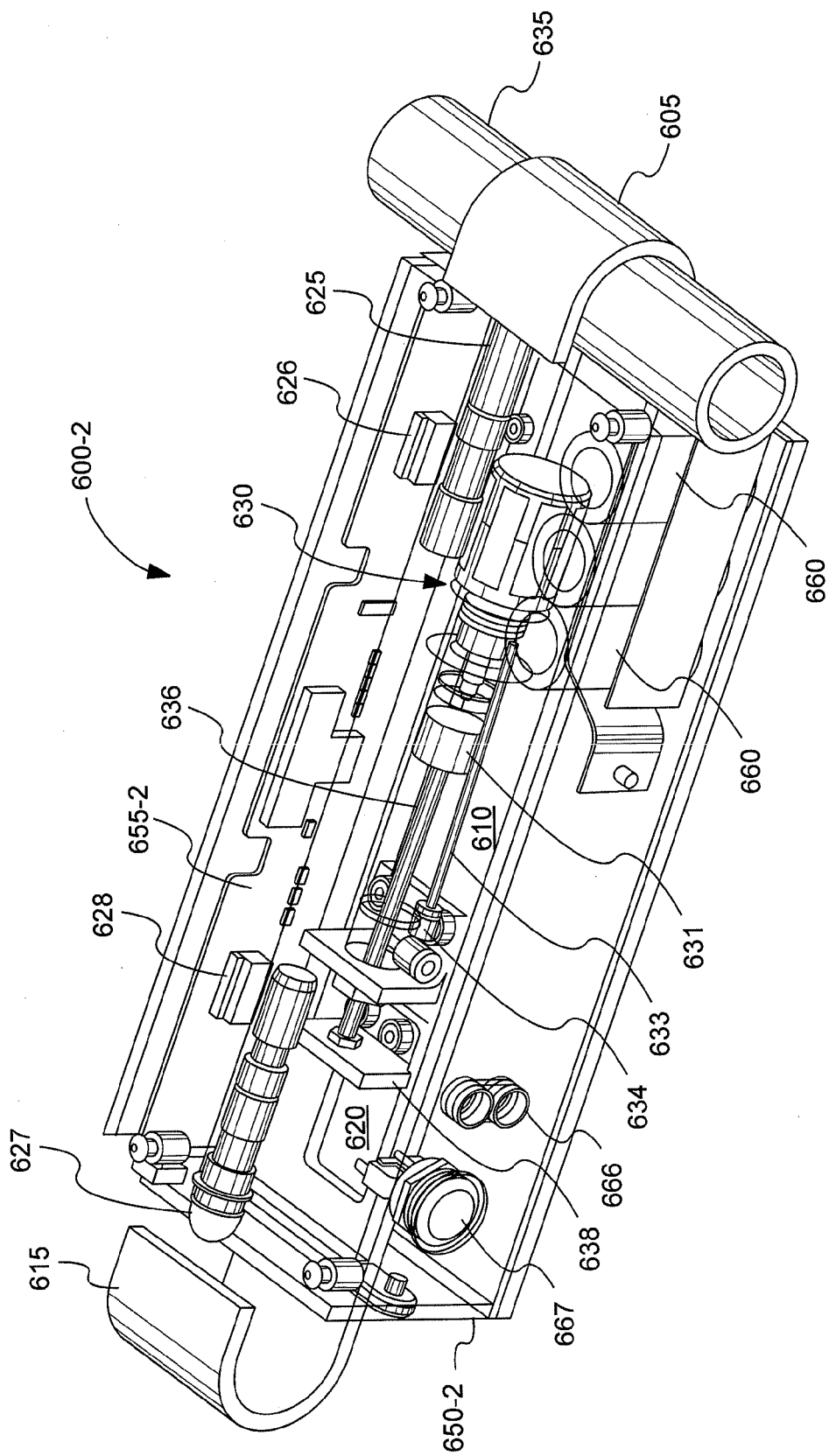
Figure 6C:
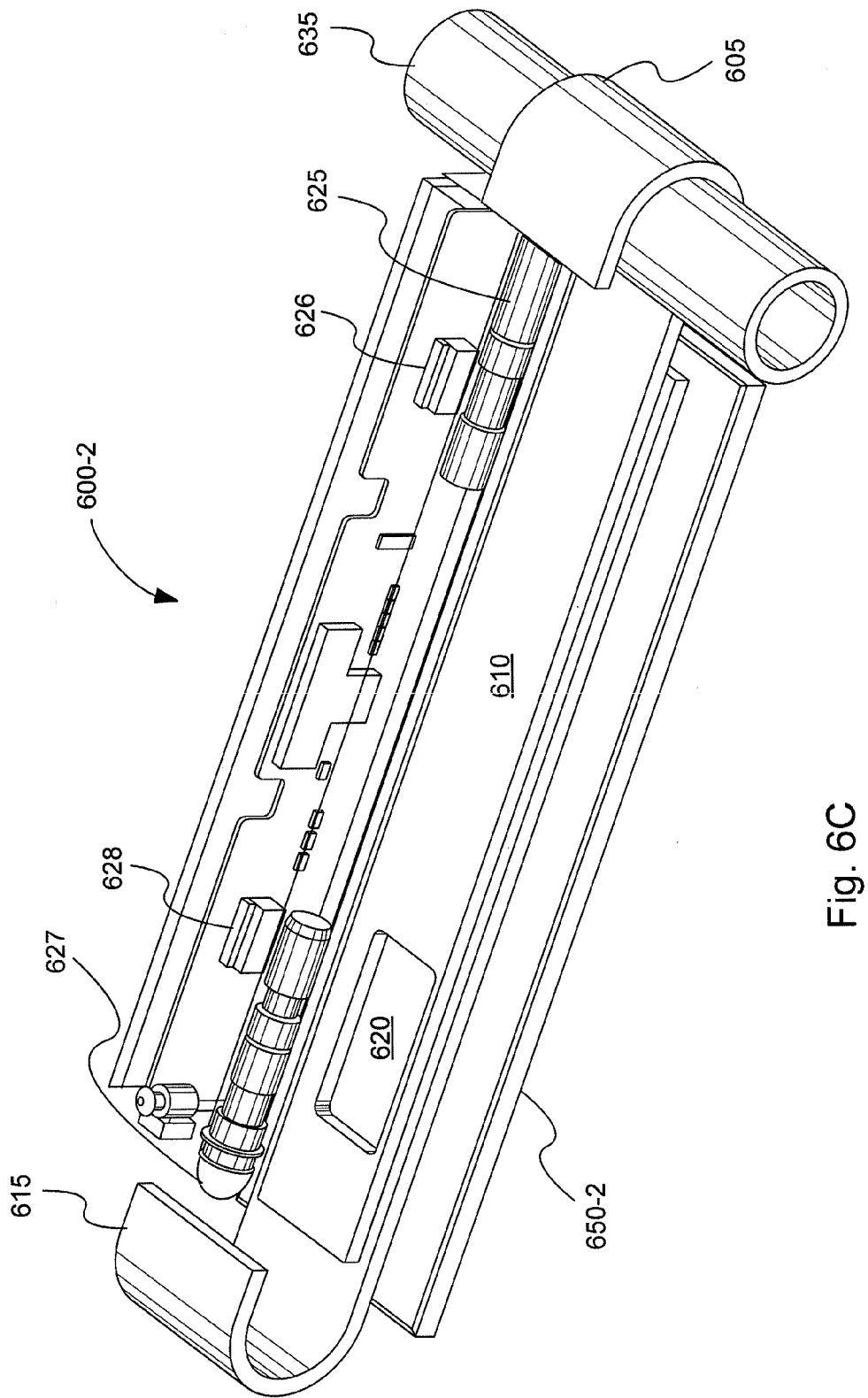

Referring next to FIGS. 6A, 6B and 6C, lock mechanisms 600-1 and 600-2 are shown. The lock mechanisms 600-1 and 600-2 differ mainly in the way printed circuit boards 655-1 and 655-2 are oriented relative to housings 650-1 and 650-2, respectively. The lock mechanisms 600 includes a clamp hook 605, a clamp bar 610, a latch hook 615, a latch bar 620, a clamp probe 625, a latch probe 627, and a latching mechanism 630. Housings 550-1 and 550-2 enclose the latching mechanism 630 and at least portions of the clamp bar 610, the latch bar 620 and the clamp and latch probes 625 and 627.

Latching mechanism 630 is a passive latching mechanism. When using a passive latching mechanism, the clamp bar 610 and the latch bar 620 can be manually moved into position and then the passive latching mechanism can be activated. Such manual movement of the clamp bar 610 and the latch bar 620 can conserve power and prevent injury (e.g., losing a finger) that could result from hydraulic actuation or other powered actuation.

The latching mechanism 630 includes a piston 631, a fluid chamber 632, a feed line 633 (shown in FIG. 6B), a valve 634 and a piston rod 636. The latching mechanism 630 is attached to the clamp bar 610 at one end of the latching mechanism 630, the end nearest the clamp hook 605, and is attached to the latch bar 620 via a connector 638 attached to the end of the piston rod 636. An aperture 612 is formed in the clamp bar 610 such that the connector 638 passes through the aperture 612 and is attached to the latch bar 620.

With the clamp and latch bars 610 and 620 each being attached to the latching mechanism 630 at one point, they are basically floating in the housing 650, having a tendency to rotate about the point where each is connected to the latching mechanism 630. To add stability to this configuration, the clamp and latch bars 610 and 620 pass through apertures (not shown) formed in the housing 650. The apertures can be sized to not allow the clamp and latch bars 610 and 620 to translate up and down significantly. Optionally, the apertures can be fitted with bushings to avoid metal contacting metal (in cases where the housing 650 and the clamp and latch bars 610 and 620 are all made of a metal) and to provide smooth low-friction motion.

The fluid chamber 632 contains a fluid such as a liquid or a gas. Liquids can include an oil (e.g., organic vegetable oil). The feed line 633 connects the fluid chamber 632 on opposite sides of the piston 631. As an alternative to the feed line 633, a channel, or other fluid coupling, could be formed in a body of an alternative latch mechanism, where the channel connects two portions of a fluid chamber also defined by the body of the latch mechanism. When the valve 634 is activated to be in a closed position, the fluid cannot flow through the feed line 633 and the locking mechanisms 600 is engaged in a locked state. When the valve 633 is deactivated (opened), the fluid in the chamber 633 can freely flow through the feed line 633 allowing the clamp bar 610 and the latch bar 620 to be moved relative to each other. In one embodiment, the latching mechanism 630 is capable of resisting a force of about five tons when the valve 634 is activated.

In one embodiment, the valve 634 is a one-way valve. When the one-way valve is activated, the fluid in the fluid chamber 632 can flow through the feed line 633 in one direction to allow the clamp bar 610 and the latch bar 620 to be pushed together, but not to be pulled apart (or vice-versa).

Such a one-way valve allows the locking mechanism 600-1 to be more securely tightened to container bars in the locked state, but not to be removed.

As illustrated in FIG. 6B, the clamp hook 605 is disposed to be partially wrapped around a door latch assembly bar 635 of a shipping container door. With the latch assembly bar 535 positioned within the clamp hook 605, the clamp probe 625 is pushed inward such that a clamp bar sensor (e.g., a mechanical switch 626 connected to the printed circuit board 655-2) is tripped to complete a circuit such that the lock controller 408 senses that a bar is positioned within the clamp hook 605. When the bar sensor 625 indicates that the latch assembly bar is present, the lock controller 408 activates the valve 634 to prevent the clamp bar 610 and the latch bar 620 from being moved relative to each other. When attached to a single bar, e.g., the latch assembly bar 635, with the valve 634 in the activated state, the lock mechanism 600-2 is in the idle lock state. In the idle lock state, the lock mechanism 600-2 cannot be removed from the latch assembly bar 635 during normal operation. In other embodiments, latching mechanism 630 can be an active latching mechanism such as a ratchet drive, a screw drive, a solenoid, etc.

The latch probe 627 is used to detect when another container bar is positioned within the latch hook 615. As with the clamp probe 625, when the latch probe 627 is pushed inward such that a latch bar sensor (e.g., a mechanical switch 628 connected to the printed circuit board 655-2) is allowed to complete a circuit, the lock controller 408 senses that a bar is positioned within the latch hook 615. When the clamp and latch bar sensors associated with the clamp probe 625 and the latch probe 627, respectively, both indicate that bars are present in the clamp hook 605 and the latch hook 615, the lock controller 408 can permit the lock mechanism 600 to enter into a secure lock state and activate the valve 634. In some embodiments, a third sensor (see mechanical switch 685 in FIGS. 6D and 6F) can be activated when both the clamp hook 605 and the latch hook 615 are pushed together a certain distance. A valley can be formed in each of the clamp bar 610 and in the latch bar 620 such that the third sensor (e.g., the mechanical switch 685) is tripped when the valleys formed in the clamp bar 610 and the latch bar 620 allow the third sensor to be tripped. In this embodiment, the secure lock state can be entered when all three sensors are tripped.

In one embodiment, all the sensors are mechanical switches and require no power. In this embodiment, only a processor (or micro-controller), a clock and the valve 634 require power to operate the lock mechanism 600.

The dimensions of the housing 650, the clamp hook 605, the latch hook 615, the lengths of the clamp bar 610 and the latch bar 620, and the locations of the switches are designed and sized for a standardized container bar assembly. The lock mechanism 600 is sized for standard 14.5 in. nominal bars used on ISO standard sea shipping containers. The housing 650 is about 11.375 in. in length, about 4.375 in. high and about 2.5 in. deep. The clamp hook 605 protrudes out about 2.5 in. from the housing, when fully extended, and the latch hook 615 protrudes about 3 inches from the housing when fully extended. Truck trailers and cargo containers have different standardized dimensions. The dimensions of the lock mechanism 600 can be adjusted to fit these and other container configurations.

The PCB's 655-1 and 655-2 include components of a lock circuit, such as the lock circuit 400 of FIG. 4. The components formed on the PCBs 655 can include the processor 404, the memory 424, at least a portion of the sensor module 428, the active lock controller 408, the GPS receiver 432, the wireless module 440, the persistent storage 444 and the inductive power supply 448. Other components can also be formed on the PCBs 655.

The lock mechanisms 600-1 and 600-2 include four and three batteries 660, respectively. A backup battery 665 is illustrated attached to battery terminals 666 that are external to the housing 650-1. The batteries 660 can include the main batteries 416 and one or more backup batteries 420. The external battery terminals 666 can connect the external battery 665 to the active lock controller 408 in order to provide failsafe power to unlock the lock mechanism in case the batteries 660 fail or run low on power. In addition, the external battery 665 can be connected to the persistent storage 444 to retrieve previously stored sensor or lock data. Circuitry (not shown) attached to the external battery terminals 666 can be configured to withstand large voltages to avoid an attempt by a perpetrator to damage the lock mechanism 600. Voltages in a range from about 200 volts up to about 450 volts and higher can be received without damaging the lock circuitry.

A power switch 667 is located on a bottom surface of the housings 650. The power switch 667 is pushed by a user to wake up the lock mechanism 600.

The clamp hooks and latch hooks 605 and 615 shown in FIGS. 6A, 6B and 6C are one example of lock members that can be used to engage portions of a container door, a latch assembly bar in this example. Lock members can take other forms besides the flat bar-hooks shown in FIGS. 6A, 6B and 6C. For example, a lock member could comprise a rod with a circular, elliptical, or other shaped cross section formed into a C-shape, a J-shape, a U-shape, a question mark shape, or other shape.

Figure 6D:
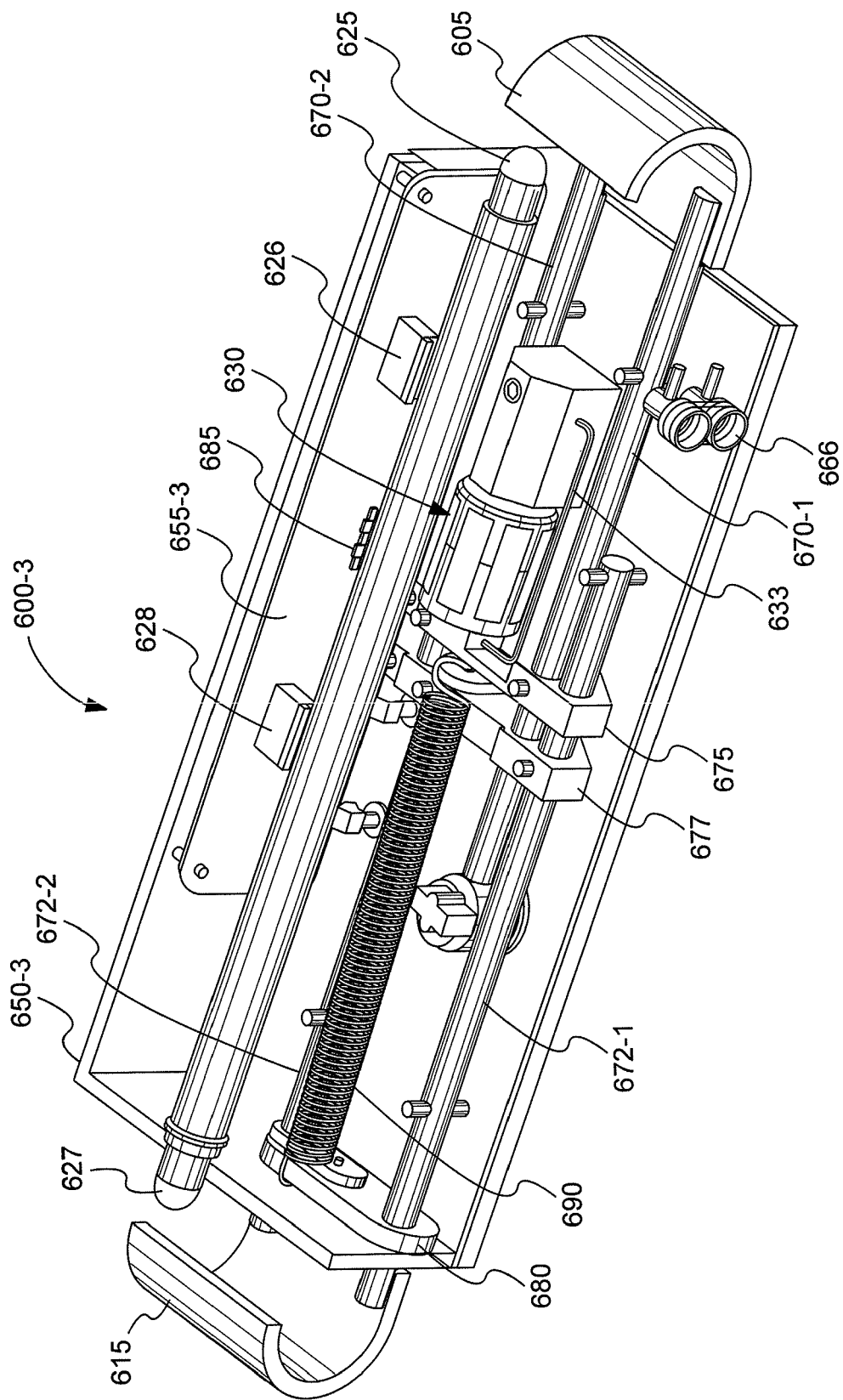
FIGS. 6D, 6E and 6F are perspective views of other embodiments of lock mechanisms in accordance with the disclosure.
Figure 6E:
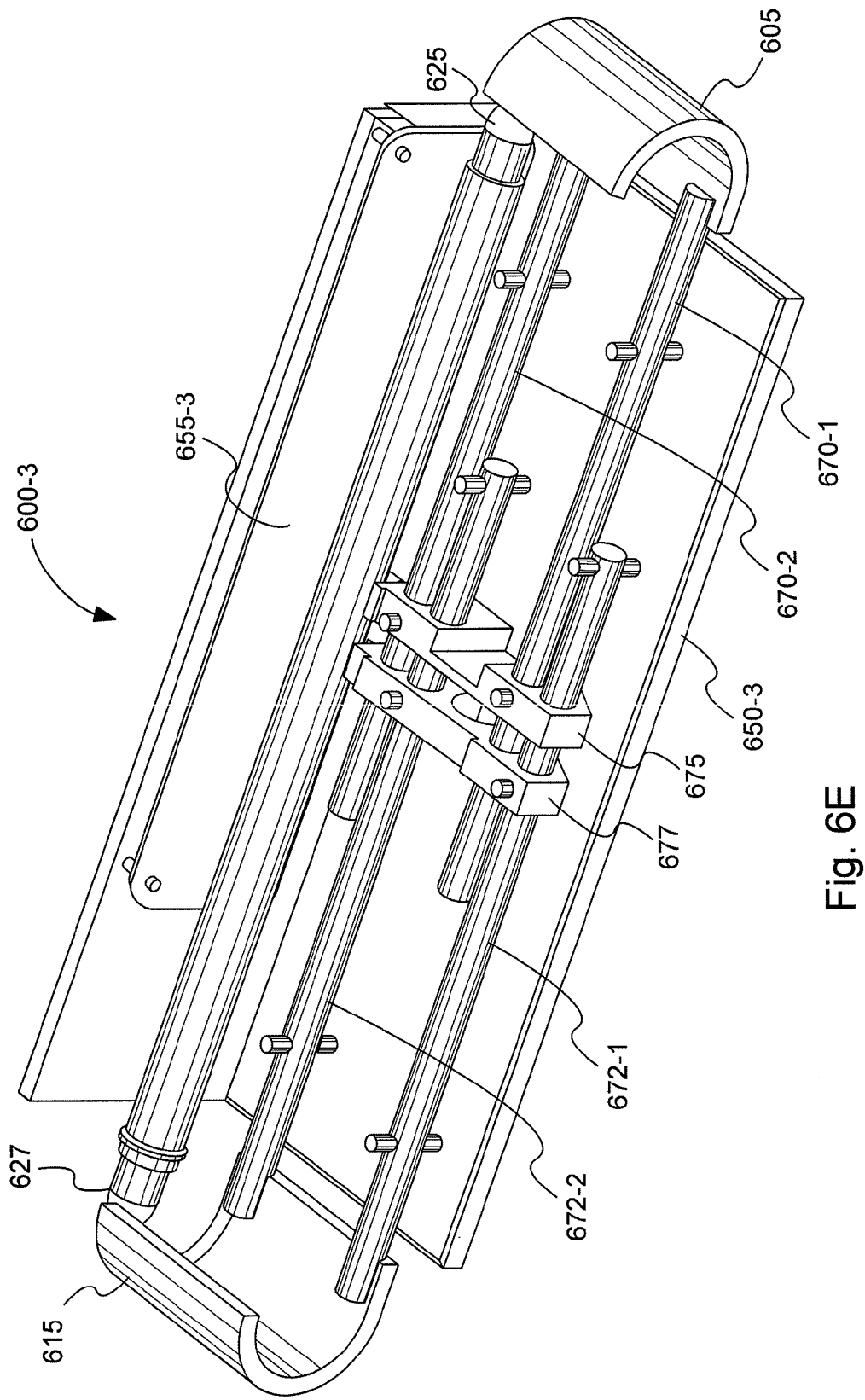

Referring next to FIGS. 6D and 6E, another lock mechanism 600-3 is illustrated. The lock mechanism 600-3 is another embodiment sized for an ISO standard sea shipping container as were the lock mechanisms 600-1 and 600-2. However, the lock mechanism 600-3 includes two clamp rods 670-1 and 670-2 connected to a stand alone clamp hook 605, and two latch rods 672-1 and 672-2 attached to a stand alone latch hook 615. The clamp rods 670 and the latch rods 672 are stabilized within the housing of the lock mechanism 600-3 by a first bulkhead 675 and a second bulkhead 677. The first bulkhead 675 is rigidly attached to the clamp rods 670 and the second bulkhead is rigidly attached to the latch rods 672.

The first bulkhead moves within the housing 650-3 along with the clamp rods 670 when the clamp hook 605 is moved. The second bulkhead 677 moves along with the latch rods 672 when the latch hook 615 is moved. The latch rods 672 are further stabilized by a bushing 680 at the end of the housing 650-3 near the latch hook 615 and the clamp rods are further stabilized by another bushing (not shown) at the end of the housing 650-3 nearest the clamp hook 605.

A spring 690 is attached to the bushing 680 and the first bulkhead 675. In one embodiment, the spring 690 is compressed with the clamp and latch hooks 605 and 615 in the inner most position, as shown. In this embodiment, the spring expands and pushes the clamp hook 605 away from the housing 650-3 when the latch mechanism 630 is not locked. In another embodiment, the spring is in a stretched state and pulls the clamp bar 605 toward the housing 650-3.

Using two rods to support each of the clamp and latch hooks 605 and 615 can allow for a thinner housing 650-3 compared to having the clamp and latch bars 610 and 620 positioned back to back in the housing 650-1 or 650-2.

Figure 6F:
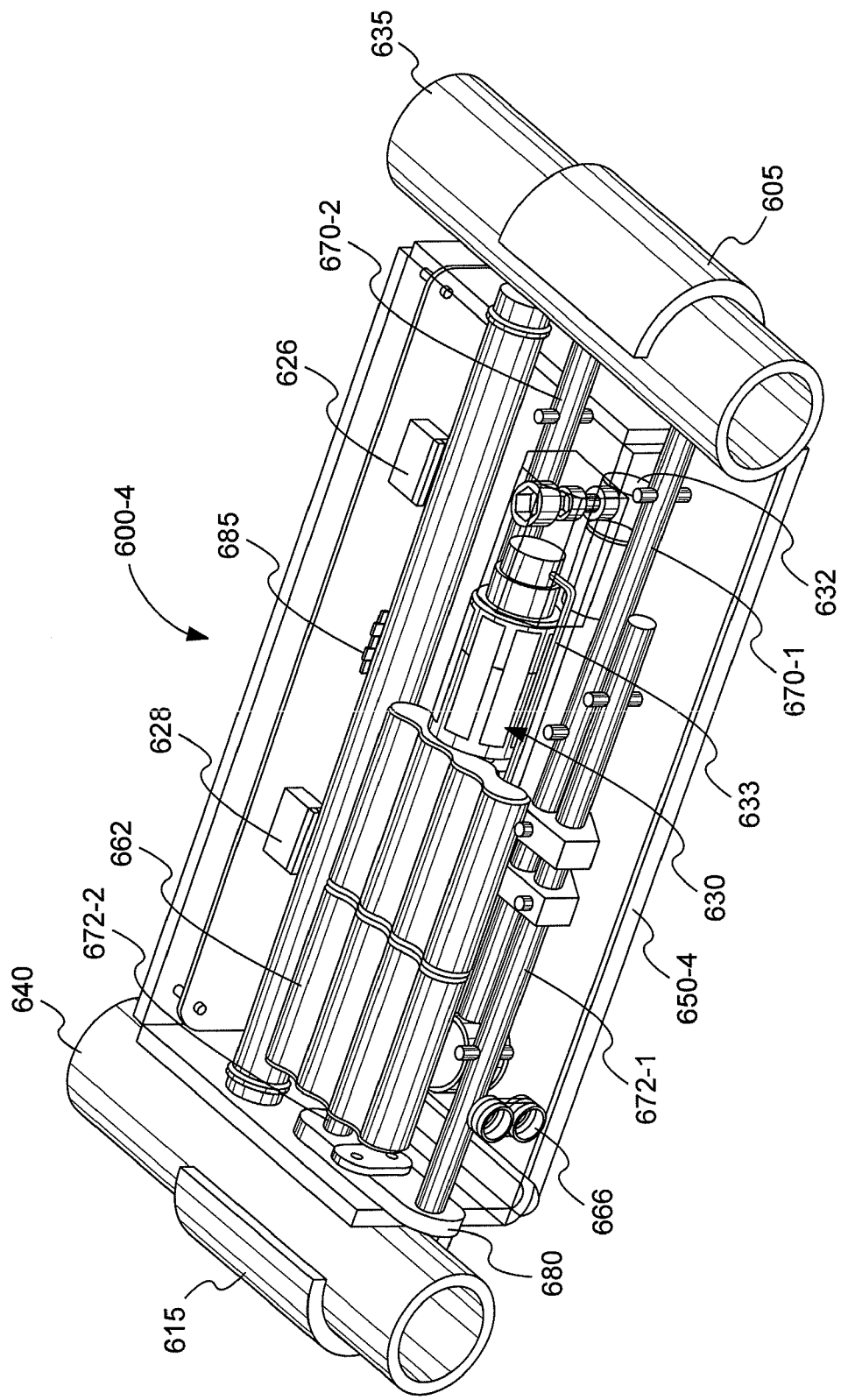

Referring next to FIG. 6F, yet another lock mechanism 600-4 is shown. The lock mechanism 600-4 is similar to the lock mechanism 600-3 except for being sized for a truck (or trailer-tractor) container instead of a sea container. The latch assembly bars of truck containers are closer together than those of sea containers. The housing 650-4 can be sized to fit within the latch assembly bars of truck containers (or cargo containers).

Many of the components used for the lock mechanism 600-3 can be reused for the lock mechanism 600-4. For example, the PCB board 655-3 is the same size as the PCB board 655-4. The same latch mechanism 630 can be used for both the 600-3 and 600-4 lock mechanisms.

FIG. 6F shows a fluid chamber 632 that is part of the latching mechanism 630. The fluid chamber is hidden by the latching mechanism 630 in FIG. 6D. The fluid chamber 632 is the same as the fluid chamber 632 illustrated in FIGS. 6A and 6B. The fluid chamber 632 is attached to the first bulkhead 675 and moves along with the clamp hook 605 and the clamp rods 670. The piston rod 636 of the fluid chamber 632 in FIGS. 6D and 6F are attached to the second bulkhead 677 and is actuated by movement of the latch hook 615. The valve 634 is hidden by the other components in the lock mechanisms 600-3 and 600-4. A second latch assembly bar 640 is engaged by the latch hook 615 in FIG. 6F.

The lock mechanism 600-4 (and 600-3) includes a battery pack 662 (not shown in FIG. 6D) that includes 8 batteries. Some of the batteries in the battery pack 662 can be main batteries while others can be backup batteries.

Attaching the lock mechanism to latch assembly bars, as shown in FIGS. 6A-6F, is only one exemplary embodiment. Alternatively, lock members could be configured to be secured to other portions of a container. For example, lock members could be configured to be secured to door handles, latches, recesses formed in the doors or container walls, holes formed in the doors or container walls, rings, etc. The housing of the lock mechanism could be permanently attached to one of the doors or another portion of the container and a single lock member could be configured to attached to the latch assembly bar of the other door of the container. In some embodiments, the lock mechanism could be mounted inside the container or integral with one of the container doors.

FIGS. 7-10 show flow diagrams of four exemplary processes for operating the lock circuit 400 of FIG. 4. Each of the processes are performed in part by an external device such as a mobile device (e.g., the portable wireless devices 120 and 320) operated by a certified user (e.g., a customs agent, dock inspector, etc.).

The processes include methods for locking the lock mechanism to a shipping container in the idle lock state, locking the lock mechanism to a shipping container in a secure lock state, communicating data between the lock mechanism and the mobile device upon request by the mobile device, and unlocking the lock mechanism from the shipping container.

Figure 7:
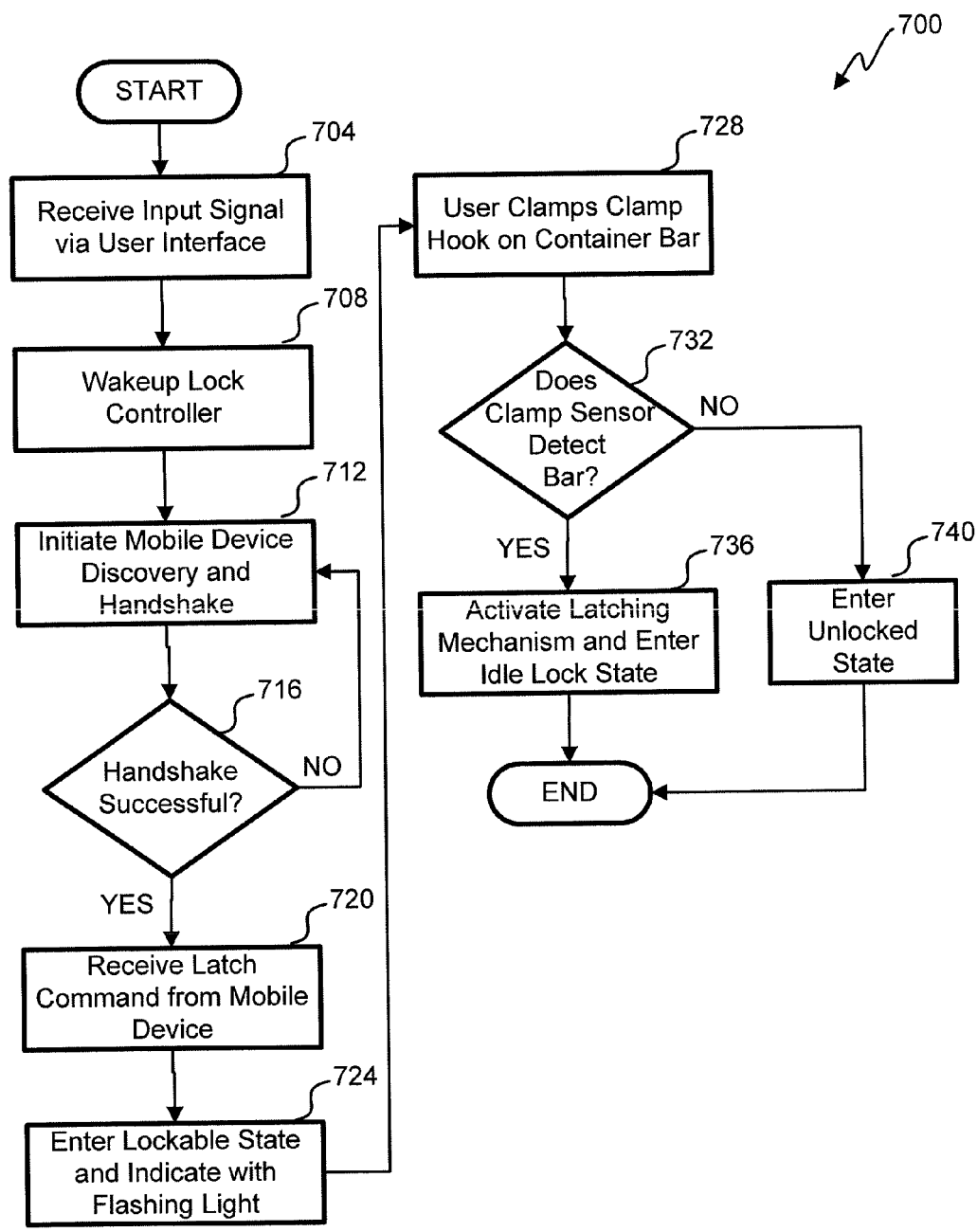
FIG. 7 is a flow diagram of an embodiment of a process for locking a lock mechanism to a shipping container in an idle lock state.

Referring next to FIG. 7, a flow diagram of an embodiment of a process 700 for locking a lock mechanism to a shipping container in the idle lock state is shown. In reference to FIGS. 4 and 7, at block 704, the lock controller 408 receives an input signal via the user interface 426. The input signal can be the result of the user activating a button, a switch, a dial or other input device of the user interface 426. In one embodiment, the inductive power supply 448 receives an RF power signal and forwards an indication of the power signal to the processor 404, and optionally provides power to the processor 404.

Upon receiving the input signal, the process 700 continues at block 708 where the processor 404 issues a wakeup command to the lock controller 408. Block 708 can be omitted if the lock controller 408 is already awake.

Continuing to block 712, the lock controller 408 initiates a mobile device discovery and handshake protocol. The details of the protocol vary depending on the type of communication system that is being used. In this embodiment, the lock controller 408 acts as the master in the discovery and handshake protocol with the mobile device of the user being the slave. Alternatively, the mobile device of the user could be the master device and the lock controller 408 could be the slave.

At block 712, the lock controller 408 establishes a communication link with the mobile device. The lock controller 408 transmits a signal to the mobile device requesting a PIN. The lock controller 408 is pre-programmed with the PIN that must be provided by a mobile device in order to be paired with the lock controller 408. The user enters the PIN into the mobile device and the mobile device transmits the PIN to the lock controller 408 via the wireless module 440.

The discovery and handshake performed at block 712 can also include a synchronization portion. Each lock mechanism has a serial number and each container has a serial number. In addition, the sensors to be associated with the lock mechanism and the container have serial numbers (or any other type of authentication code such as cryptographic keys). The lock serial number, the container serial number and any sensor serial numbers can all be synchronized at block 712 to allow for supply chain management. In one embodiment, the user enters a container number in order to lock the lock. The user of the mobile device can provide the container serial number and/or any sensor serial numbers during the handshake routine. In some embodiment, the mobile device is used to enroll sensors and other communication devices (e.g., the communications package 130) with the lock mechanism using private/public key methods.

In one embodiment, a lock mechanism contains software stored in memory to provide a website interface that can communicate with the mobile device at the block 712. The website can allow the user to log into using a private key (e.g., the PIN). The user can perform the discovery and handshake routines at the block 712 by using existing software on the mobile device (e.g., a web browser or similar software).

At block 716, the lock controller 408 verifies a successful handshake if the PIN (or other authentication code such as a digital signature) received from the mobile device matches the pre-programmed PIN. If the handshake was not successful, the process returns to block 712. Upon successful completion of the handshake, the process continues to block 720.

At block 720, the lock controller 408 receives a latch command from the mobile device. The latch command is a request to lock the lock mechanism to one of the latch assembly bars of the shipping container. The latch command can be received via the wireless module 440. Alternatively, the user could use one or more input devices on the user interface 426 to issue the latch command.

At block 724, the lock controller 408 exits an unlocked state and enters a lockable state which can be indicated by a flashing light on the user interface 426. At block 728, the user, in response to seeing the flashing light, manually clamps the clamp hook on one of the latch assembly bars. In embodiments with an active latching mechanism (e.g., a hydraulic, magnetic or screw type drive), the active latching mechanism could perform the clamping at the block 728.

At block 732, the lock controller 408 queries the sensor module 428 to determine if one of the sensors (e.g., the clamp sensor associated with the clamp probe 625 illustrated in FIG. 6) has detected presence of the first latch assembly bar in the clamp hook. If the first latch assembly bar 635 is not detected (e.g., within a predetermined time limit), the lock controller 408 enters the unlocked state at block 740 and the flashing light of the user interface 426 is deactivated. Subsequent to entering the unlocked state at block 740, the process 700 can return to block 704 or block 720 to re-establish the discovery/handshake, or to receive another latch command, respectively.

Upon successful detection of the first latch assembly bar in the clamp hook at block 732, the lock controller 408 activates the latching mechanism (e.g., activates the valve 534 shown in FIG. 6), at block 736, to lock the lock mechanism to the first latch assembly bar and the lock controller 408 enters the idle locked state. Upon the lock controller 408 entering the idle locked state, the process 700 terminates and other commands can be processed if needed.

Figure 8:
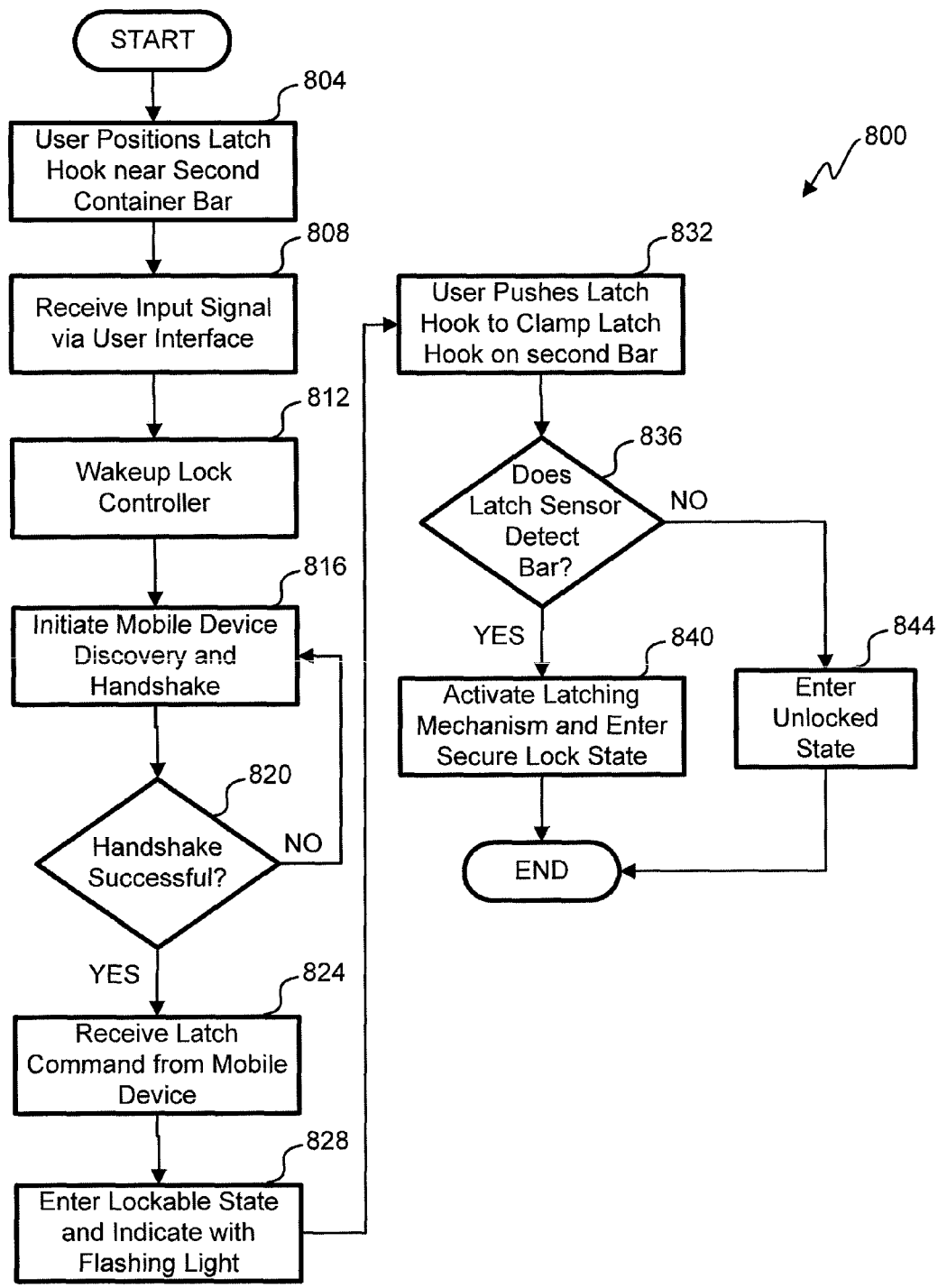
FIG. 8 is a flow diagram of an embodiment of a process for locking a lock mechanism to a shipping container in a secure lock state.

Referring next to FIG. 8, a flow diagram of an embodiment of a process 800 for locking a lock mechanism to a shipping container in the secure lock state is shown. In reference to FIGS. 4 and 8, at block 804, the user positions the latch hook near/around a second latch assembly bar of the shipping container. If the lock mechanism is already locked to the first latch assembly bar (in the idle lock state), the user can simply rotate the lock mechanism toward the second bar. If the lock mechanism is not attached to either bar and is in the unlocked state, the user can position the clamp hook and latch hook around both bars.

At block 808, the processor 404 receives an input signal via the user interface 426. The input signal can be the result of the user activating a button, a switch, a dial or other input device of the user interface 426.

Upon receiving the input signal, the process 800 continues at block 812 where the processor 404 issues a wakeup command to the lock controller 408. Block 812 can be omitted if the lock controller 408 is already awake.

At blocks 816 and 820, the discovery and handshake protocol can be performed in the same way as described above in reference to blocks 712 and 716, respectively.

At block 824, upon successful completion of the handshake, the lock controller 408 receives a latch command from the user. The latch command received at block 824 can be the same latch command as received at block 720. Here, container bar sensors associated with the latch hook and the clamp hook (e.g., the clamp probe switch 626 and the latch probe switch 628 shown in FIGS. 6D and 6F) can be used to detect that bars are contacting both the latch hook and the clamp hook in order to identify that this is a request for attaching the mechanism in the secure lock state as opposed to the idle lock state.

Alternatively, the latch command received at block 824 can be a secure latch command that is distinguishable from the latch command received in the process 700.

The latch command can be received via the wireless module 440. Alternatively, the user could use one or more input devices on the user interface 426 to issue the latch command that is received at block 824.

At block 828, the lock controller 408 leaves a current state, e.g., the unlocked state or the idle locked state, and enters the lockable state which can be indicated by a flashing light on the user interface 426. At block 832, the user, in response to seeing the flashing light, manually clamps the clamp hook and the latch hook to both of the latch assembly bars. This can be done by the user pushing on both hooks causing the hooks to contact both latch assembly bars.

At block 836 and in further reference to FIGS. 6D and 6F, the lock controller 408 queries the sensor module 428 to determine if both the latch hook switch 628 associated with the latch probe 627 and the clamp hook switch 626 associated with the clamp probe 625 (and optionally a third switch 685 associated with both the clamp and latch bars 610 and 620 or both rods 670 and 672, as discussed above) have been tripped, thereby indicating the presence of both of the latch assembly bars. In addition, the lock controller 408 could query if a door sensor of the sensor module 428 detects the presence of one or both doors of the container. If the bars and/or the door(s) are not detected (e.g., within a predetermined time limit), the lock controller 408 enters the unlocked state, at block 844, and the flashing light of the user interface 426 is deactivated. Subsequent to entering the unlocked state, the process 800 can return to block 804 or block 824 to re-establish the discovery/handshake, or to receive another latch command, respectively.

Upon successful detection of the bars and/or the door(s), at block 836, the lock controller 408 activates a latching mechanism (e.g., the valve 634 of FIG. 6), at block 840, to lock the lock mechanism to the bars and the lock controller enters the secure lock state. Upon entering the secure lock state, the process 800 terminates and other commands can be processed if needed.

Figure 9:
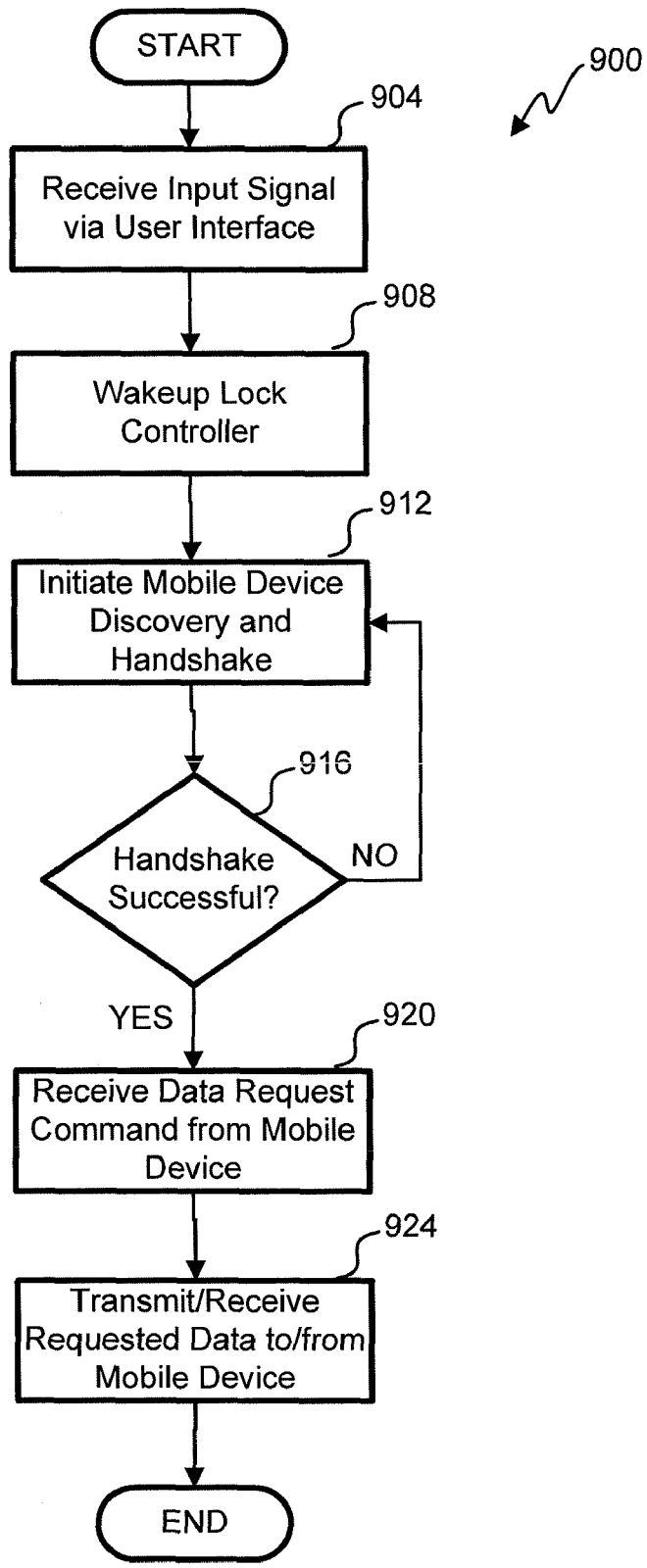
FIG. 9 is a flow diagram of an embodiment of a process for communicating data between a lock mechanism and a mobile device, in response to a request by the mobile device.

Referring next to FIG. 9, a flow diagram of an embodiment of a process 900 for communicating data between the lock mechanism and the mobile device, in response to a request by the mobile device, is shown. Blocks 904 to 916 are performed to establish a secure communication link between the user's mobile device and the lock controller 408. The blocks 904-916 are similar to the blocks 704-716, respectively, discussed above in reference to FIG. 7. In one embodiment, a website stored in memory of the lock mechanism is used to establish the secure communication link between a web browser of the mobile device and the lock controller 408. The blocks 904-916 can be omitted if a secure communication link has already been established (e.g., during execution of any of the processes 700 and/or 800).

Upon successful completion of the handshake, the lock controller 408 receives a data request command from the mobile device at block 920. The data request command can be a request to transfer data from the mobile device to the lock circuit 400, or a request to receive data from the lock circuit 400.

At block 924, the active lock controller 408, transmits and/or receives the requested data to and/or from the mobile device via the wireless module 440. Multiple pieces of data can be communicated in either direction at block 924.

The data request command can be a request to communicate lock mechanism status information. Such status information can include changes in state of the lock mechanism including, for example, activations (user initiated power-up), unlock events, removal of lock mechanism from one or both latch assembly bars (based on container bar sensors), irregular de-engagement of lock mechanism (non-user initiated), and locking events (both idle lock and secure lock events). Each manifest entry is stored with a time stamp (e.g., Greenwich Mean Time).

The data request command can be a request to communicate a container manifest listing the contents of the shipping container. This can be a request to communicate the manifest list to the lock circuit 400, e.g., when the container is first loaded, or when the contents of the container have changed. The request for the manifest could also be a request to receive an already stored manifest from the lock circuit 400 (e.g., when the container arrives at a destination). Manifest information can include serial numbers, or other authentication codes (e.g., a cryptographic key or keys), for devices associated with the lock mechanism. Serial numbers can include lock serial numbers, container serial number, sensor serial number and communication subsystem serial numbers. Additional manifest information can include lock maintenance details including maintenance history, maintenance location identifiers and maintenance technician identifiers.

The data request command received at block 920 could also be a request to receive sensor data that the lock circuit 400 has received from sensor modules associated with the container, or from sensors in the sensor module 428. Such a request could be made by tracking personnel at various points during transport. The request for sensor data could be related to all sensors, or the request could specify which sensor(s) the requested data is related to.

The requested data could also be associated with a location log for the system. In this case, location data that was calculated by the GPS receiver 432 and stored in the memory 424 or the persistent storage 444 is communicated to the mobile device.

The requested sensor data could be sensor data the has been stored previously in the memory 424 or the persistent storage 444. Alternatively, the request for sensor data could be a request for a current sensor reading, in which case, the lock circuit 400 would retrieve current sensor states from the requested sensors.

Figure 10:
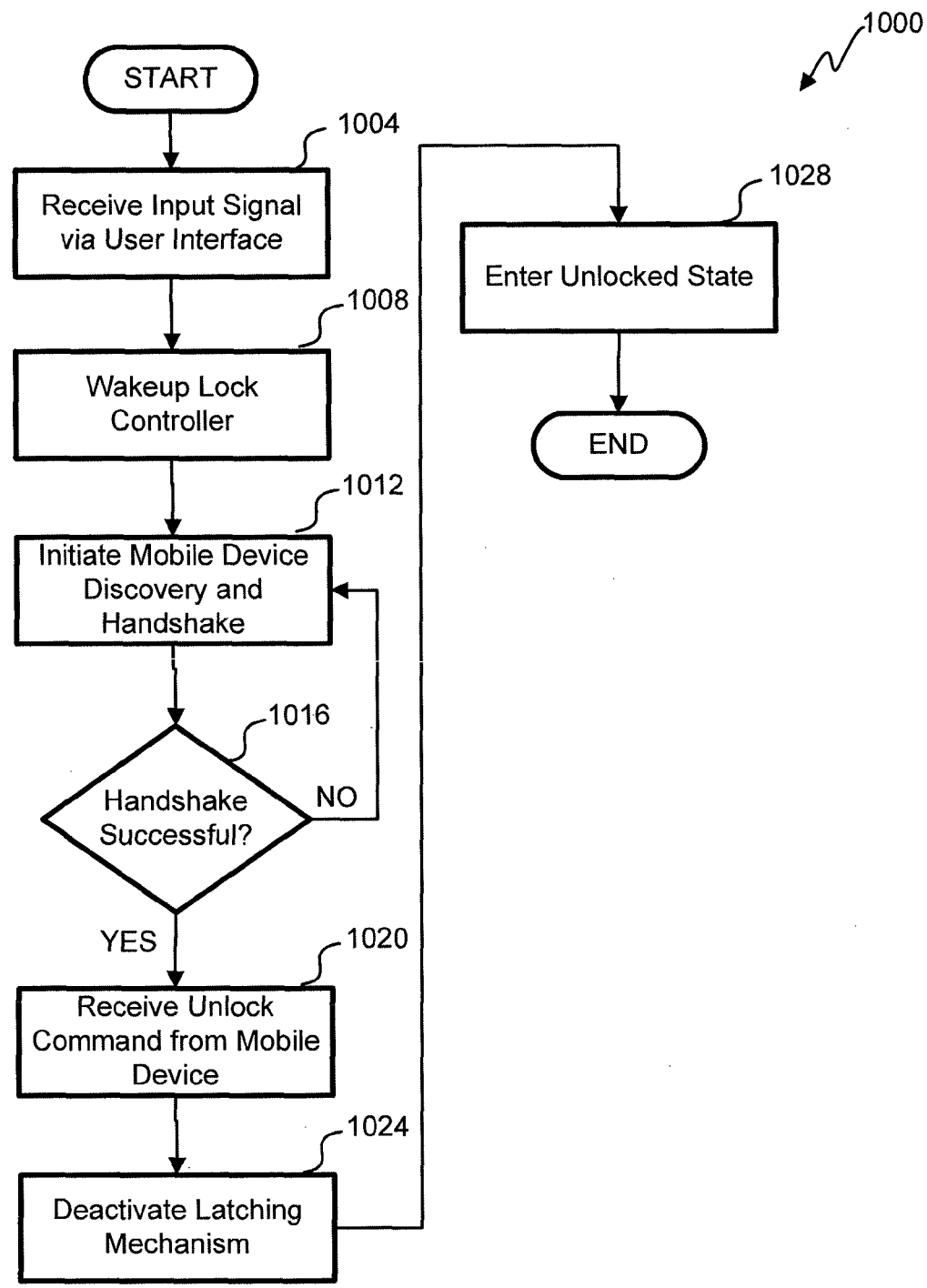
FIG. 10 is a flow diagram of an embodiment of a process for unlocking a lock mechanism from a shipping container.

Referring next to FIG. 10, a flow diagram of an embodiment of a process 1000 for unlocking the lock mechanism from the shipping container is shown. Blocks 1004 to 1016 are performed to establish a secure communication link between the user's mobile device and the lock controller 408. The blocks 1004-1016 are similar to the blocks 704-716, respectively, discussed above in reference to FIG. 7. The blocks 1004-1016 can be omitted if a secure communication link has already been established (e.g., during execution of any of the processes 700-900).

Upon successful completion of the handshake, the lock controller 408 receives an unlock command from the mobile device via the wireless module 440 (or from the user via the user interface 426) at block 1020.

Upon receipt of the unlock command, the process continues to block 1024 and the lock controller 408 deactivates the latching mechanism (e.g., a passive latching mechanism such as the valve 634 of FIG. 6, or an active latching mechanism such as a solenoid, hydraulic cylinder, screw device, etc.) to allow the latch and clamp bars to be moved into, or to move the latch and claim bars into the unlocked position. The process 1000 continues at block 1028, where the lock controller 408 enters the unlocked state. The lock controller 408 can deactivate any lights or other indicators on the user interface 426

Figure 11A:
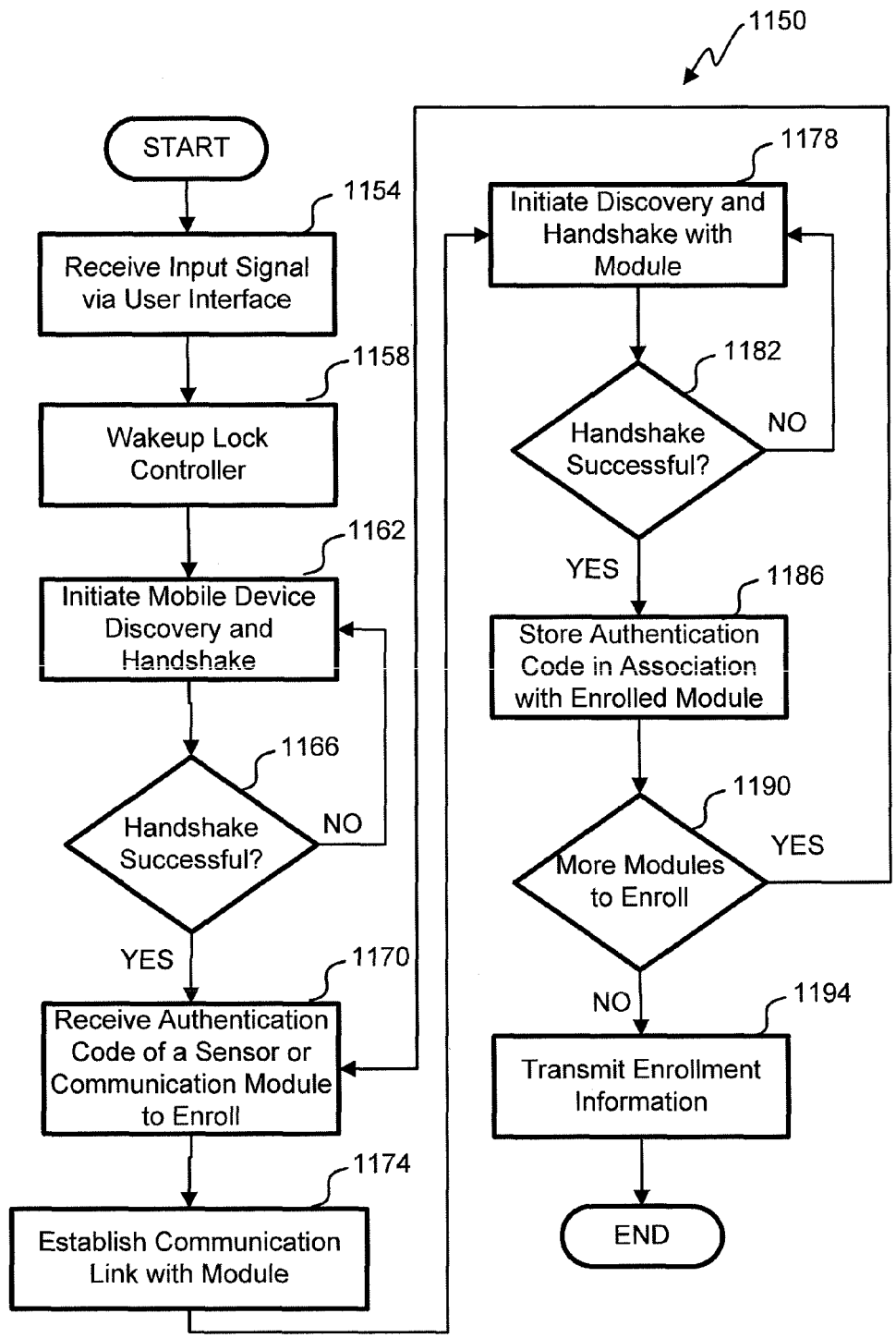
FIG. 11A is a flow diagram of an embodiment of a process for enrolling devices to communicate in a secure group of devices including a lock mechanism.

Referring next to FIG. 11A, a flow diagram of a process 1150 for enrolling other devices to communicate in a secure group of devices including a lock mechanism is shown. Blocks 1154, 1158, 1162 and 1166 are performed to establish a secure communication link between the user's mobile device and the lock controller 408. The blocks 1154, 1158, 1162 and 1166 are similar to the blocks 704-716, respectively, discussed above in reference to FIG. 7. The blocks 1154, 1158, 1162 and 1166 can be omitted if a secure communication link has already been established (e.g., during execution of any of the processes 700-900).

Upon successful completion of the handshake, the lock controller 408 receives an authentication code of a sensor or communication module to enroll in a group of devices that the lock controller 408 will be permitted to communicate with at block 1170. The communication at block 1170 can be received via the wireless module 440 from a mobile device or from a remote data center. A sensor or communication module that is being enrolled can be associated with a sensor subsystem of the container that the lock mechanism is securing or a sensor subsystem associated with another container. The sensor or communication module that is being enrolled can also be associated with the lock mechanism (e.g., the wireless module 440, the GPS receiver 432 or the sensor module 428) or can be associated with a communications subsystem associated with the container. The authentication code can be a serial number or a cryptographic key such as a public key of a public/private key pair.

Upon receiving the authentication code at the block 1170, the process 1150 continues to block 1174 where the lock controller 408 establishes a communication link with the sensor or communication module which the authentication code is associated with. The communication link can be a wireless link established via the wireless module 440, or a wired link (e.g., established via the processor 404 to another component of the lock mechanism or any component wired to the lock mechanism).

Upon establishing the communication link at the block 1174, the process 1150 continues to block 1178 where the lock controller 408 and the module being enrolled initiate a discovery and handshake procedure. If the discovery and handshake procedure is determined to be successful at block 1182, the process 1150 proceeds to block 1186 where the lock controller 408 stores the authentication code in association with the enrolled module into the memory 424 or the persistent storage 444. If the handshake procedure was unsuccessful, the discovery and handshake procedure is repeated at block 1178.

The handshake procedure performed at block 1178 can take various forms. The lock controller 408 could receive the authentication code from the module being enrolled, where the authentication code could be encrypted or not. In embodiments where the authentication code of the module being enrolled is a cryptographic key(s), the lock controller 408 and the module being enrolled could exchange authentication messages using the cryptographic key(s). For example, if the authentication code received by the lock controller 408 at block 1170 is a public key of a public/private key pair, the authenticity of a message could be verified by the sensor module creating a digital signature of a message using the sensor module's private key, and the lock controller 408 could verify the authenticity of the message using the public key.

In some embodiments, the handshake process at block 1178 is a bidirectional process where the lock controller 408 authenticates the sensor or communication module and the sensor or communication module authenticates the lock controller 408. The bidirectional type of authentication allows secure verifiable communication in both directions. Similar methods can be used by the sensor or communication module to authenticate the lock mechanism.

At block 1190, it is determined if more modules need to be enrolled. A user could be queried by the user interface 426 as to whether or not more modules need to be enrolled. If it is determined that no more modules are to be enrolled, the process 1150 proceeds to block 1194, where the lock controller 408 transmits enrollment information via the wireless module 440 to the mobile device or a remote data center, whichever is performing the enrollment process 1150. If more modules are to be enrolled, the process 1150 continues back to block 1170 to repeat the procedures in blocks 1170, 1174, 1178, 1182, 1186 and 1190.

Sensors or communication modules can also be de-enrolled from a lock mechanism using a process similar to the process 1150. The functions at block 1154, 1158, 1162 and 1166 can be performed as described above, but the lock controller 408 receives an authentication code of a sensor or communication module to de-enroll. The lock controller then deletes from the memory 424 or the persistent storage 444 any information related to the sensor or communication module associated with the received authentication code.

Figure 11B:
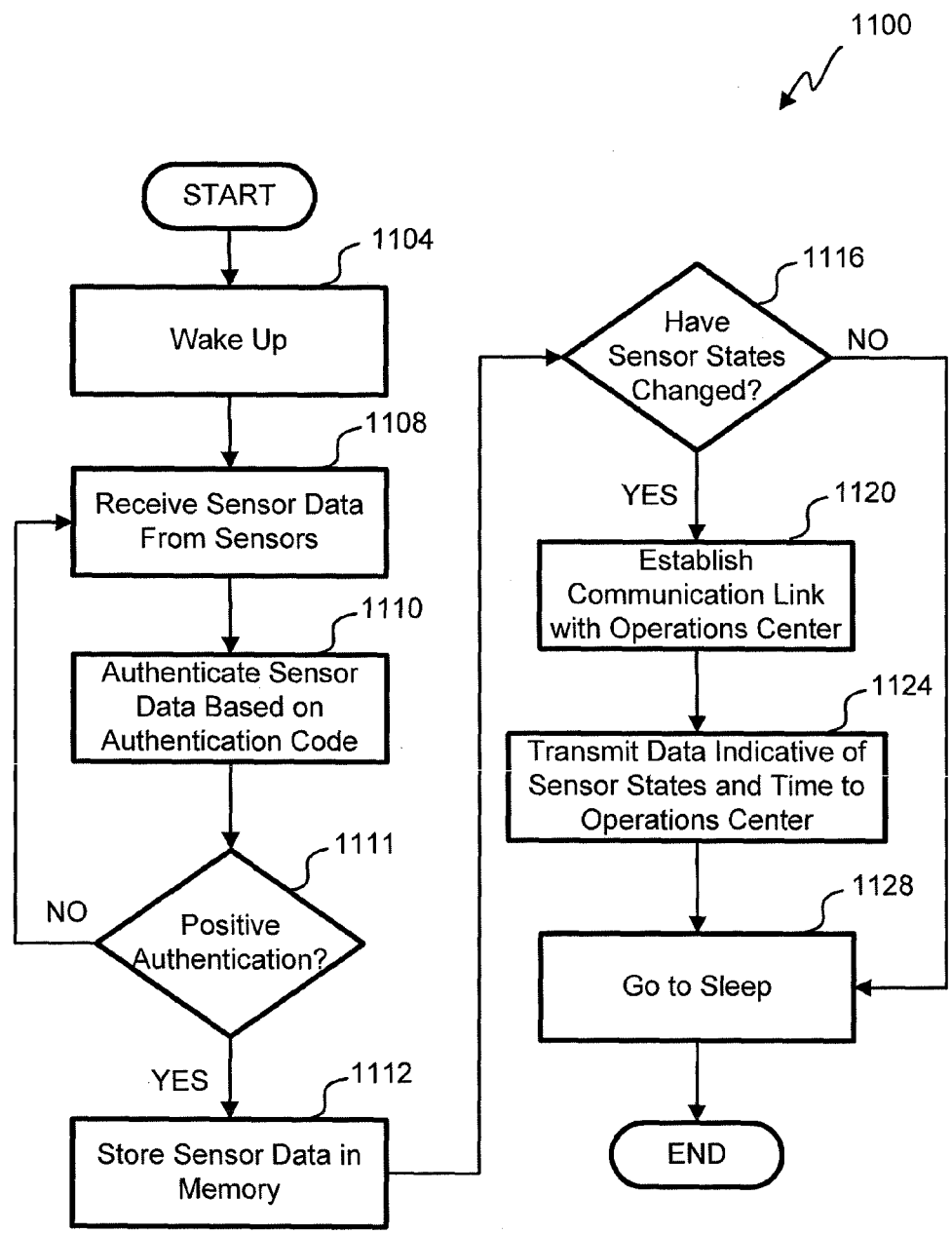
FIG. 11B is a flow diagram of an embodiment of a process for operating a lock mechanism to report sensor data, location data, and/or other information in association with a group of devices.

With reference to FIG. 11B, a flow diagram of an embodiment of a process 1100 for operating a lock circuit to report sensor data, location data, and/or other information is shown. The process 1100 can be performed after the sensors and communication modules associate with the lock mechanism have been enrolled with the lock mechanism using the process 1150. At stage 1104, the processor 404 wakes up the lock controller 408. The wakeup can be a periodically schedule wakeup (e.g., once a day), a wakeup triggered by one of the sensors of the sensor module 428, or a wakeup triggered by one of the sensor modules associated with the shipping container. Other wakeup triggers can also be provided.

In one embodiment, a sensor module located in/on the shipping container wakes up the lock circuit 400 via a RFID power signal received by the inductive power supply 448. For example, the sensor module 128-4 attached to the door of the shipping container 104 in FIG. 1 could be able to provide such a power signal. RFID power signals (e.g. ISO/IEC 1443/RFID standard power signals) can penetrate walls. The RFID signal could be a vicinity signal (having a range of about one meter) or a proximity signal (having a range of about one cm to about ten cm).

At block 1108, the lock controller 408 receives sensor data from the sensor modules that it has been paired with (using the process 1150). The received data can include a timestamp to be stored with the sensor data.

The lock controller 408 receives the sensor data by establishing communication links with the sensor modules using protocols similar to the discovery and handshake protocol discussed above. The communication links can be encrypted for privacy.

At block 1110, the lock controller authenticates the sensor data based on the authentication code that the sensor was enrolled with during the process 1150 discussed above. The authentication at block 1110 can comprise verification of a digital signature, verification of an encrypted serial number, or other form of authentication. At block 1111, the lock controller 408 determines, based on the authentication code, whether the sensor data received at block 1110 is authentic. If the authentication check is positive, the process 1100 continues to block 1112, otherwise, the process 1100 returns to blocks 1108 and 1110 to re-receive the sensor data and perform another authentication check.

If the sensor data is authentic, the lock controller 408 stores the sensor data into the memory 424 or the persistent storage 444. The sensor data is stored in association with a time stamp, which can be provided by the sensor module and/or the lock controller 408. The sensor data can also be cross referenced with location data (e.g., from the GPS receiver 432). This will provide a complete log of sensor data for later transmittal to an external device or operations center.

At block 1116, the lock controller 408 determines if any of the sensors that were polled at block 1108 have changed to a state that triggers a report sequence. A change in state that triggers a report sequence could be a change from a non-alarm state to an alarm state, such as with CBRNE type sensors. A change in location greater than a specified distance could also trigger a report. An accelerometer, or strain gauge sensor in the sensor module 428 could also trigger an alert, e.g., in response to someone attempting to forcibly remove the lock mechanism from the container doors. Other sensor-based triggers could also be envisioned.

In some embodiments, the lock controller 408 can be configured to consider the states, and/or change of states, of multiple sensors in making the determination at block 1116. The lock controller can use previously stored sensor data, location data, lock and unlock states of the lock, collectively, in making a determination at block 1116 if a change of state of the sensors, and/or the lock, is actually a change of state deemed worthy of reporting. The lock controller can create a cumulative signature of the states of all sensors associated with the lock in combination with the lock condition and determine, based on the cumulative signature, the new state of the combined sensor/lock/container system. For example, the cumulative signature could indicate that the lock is no longer attached to the container (indication of a real intrusion), or that the lock is secured to the container but the sensors indicate a possible intrusion (e.g., the lock sensors indicate that the lock is locked, but the container sensors indicate excessive heat, acceleration, motion, etc.). The type of cumulative signature state that is determined at block 1116 is used, in some embodiments, by the lock controller 408 to identify what kind of data is provided from the lock controller to a remote data center at block 1124, discussed below.

If none of the sensors have changed states and/or no alerts have been triggered, the process 1100 continues to block 1128 where the lock circuit 400 returns to the sleep mode. If a sensor has changed state and/or an alert has been triggered, the process 1100 continues to block 1120, where the lock controller 408 establishes a communication link with an operations center such as the operations center 112 of FIGS. 1-3.

The communication link can be established using one or more of the wireless technologies included in the wireless module 440 discussed above. The communication link established at block 1120 can be with a local network (Bluetooth, Zigbee, WiFi), a cellular network (WiMax, CDMA, GSM), a satellite network, or any other available network. The choice of which communications link to use could be based on a predetermined choice starting with a lowest power option and proceeding to higher power options when lower power options are not available.

At block 1124, the lock controller 408 provides the wireless module 440 with data which the wireless module 440 transmits to the operations center. The data can include data indicative of the change of state of the sensor, data indicative of the status of all the sensors and/or data indicative of the alert that triggered the transmission.

In addition to transmitting the sensor data at the block 1124, the lock controller 408 can also provide the wireless module with time and location data to be transmitted to the operations center. In one embodiment, chain of custody data such as a serial number associated with a sensor and/or a serial number associated with the lock mechanism can also be provided to the wireless module to be transmitted to the operations center.

In some embodiments, the communication link used in blocks 1120 and 1124 is a two way communication link. In these embodiments, the operations center can request additional data from the lock mechanism.

Upon finishing the transmission of data at the block 1124, the lock circuit 400 returns to the sleep mode at block 1128.

In one embodiment, sensors/switches associated with the clamp probe 625, the latch probe 627 and the clamp and latch bars 610 and 620, as discussed above, can be used to wake up the processor 404 and/or the lock controller 408 at block 1104. If any one of the sensors/switches changes state (e.g., from a closed state to an open state), the processor 404 and/or lock controller 408 is awakened. When the lock is in a sleep mode (any lower power mode) and one of the sensors/switches of the lock changes state, the sensor/switch activates wake-up-logic in the processor 404 and/or the lock controller 408 at the block 1104. The processor 404 and/or the lock controller 408 then receives the change of state indication at block 1108 and stores the change of state and a representation of the time at the block 1112. The representative time may not be a very accurate indication of the time that the change of state actually occurred, due to the time required to wakeup the processor 404 and/or the lock controller 408, but it can be accurate within about 40 seconds.

Shipping containers can be on route to a destination for weeks or even months at a time. Therefore, a power supply, such as the main battery 416 of FIG. 4, could run low on power. In this embodiment, a backup power supply, such as the backup battery 420 can be used as a failsafe power supply in situations where the main battery 416 runs low on power.

Figure 12:
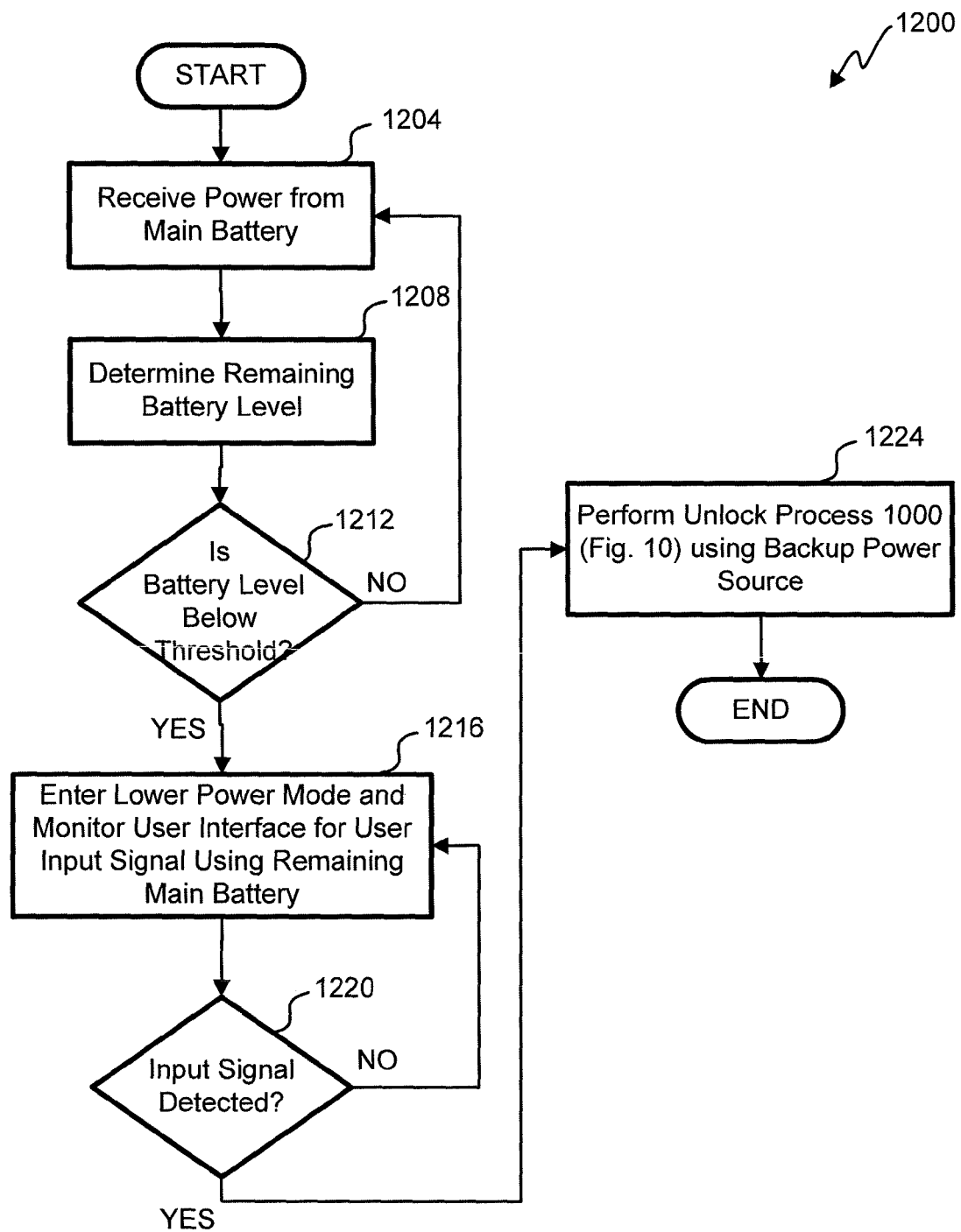
FIG. 12 is a flow diagram of an embodiment of a process for providing a failsafe power supply for unlocking a lock mechanism in accordance with the disclosure.

Referring next to FIG. 12, a flow diagram of an embodiment of a process 1200 for providing a failsafe power supply for unlocking the lock mechanism is shown. At block 1204, the lock mechanism receive power from the main batter 416 and the power is provided to the various components and subsystems of the lock circuit 400 as needed.

At block 1208, the lock controller 408 determines a remaining battery life of the main battery 416. The determination at block 1208 can be based on an accumulation of data indicative of current draw and/or voltage of the main battery 416. The processor 404 can receive the current draw and or voltage data an provide this data to the lock controller 408 for processing or the lock controller 408 can receive the data directly. Alternatively, one or more algorithms can be used to predict the remaining battery life. The algorithms can be dependent on various conditions. The conditions on which the algorithm depends can include time, a number and type of functions performed (e.g., function types including transmitting or receiving data, querying sensor modules, locking and unlocking, etc.), environmental conditions (e.g., temperature, humidity, pressure, altitude, etc.), or a combination of any of these and other conditions.

At block 1212, the lock controller 408 determines if the battery level remaining is below a threshold value (e.g., a percentage such as, for example, five, six, seven, eight, nine, ten, eleven, twelve, thirteen, fourteen or fifteen percent). If the remaining battery level is not below the threshold value, the process 1200 returns to perform the functions at blocks 1204 and 1208.

If the remaining battery level is determined to be below the threshold value at block 1212, then the process 1200 continues to block 1216, where the active lock controller 408 automatically issues a command to the processor 404 to put the lock circuit 400 into a lower power mode.

While in the lower power mode at block 1216, fewer components or subsystems are powered by the remaining battery life of the main battery 416. For example, substantially all subsystems of the lock circuit 400 except the processor 404 (or a portion of the processor 404), and/or the active lock controller 408 may not be powered and the processor 404 and/or the lock controller 408 can receive enough power from the main battery 416 during lower power mode to detect an input signal (e.g., a button being pushed by a user of the portable wireless device 120 or 320) from the user interface 426. In addition, the lock controller 408 can increase the time period between periodic power ups of subsystems of the lock mechanism that are normally powered up periodically when the lock mechanism is in the lower power mode.

At block 1220, the processor 404 and/or the lock controller 408 monitors the user interface or the wireless module 440 for an input signal indicating to unlock the lock mechanism. The process 1200 continues to loop between blocks 1216 and 1220 until the input signal to unlock the lock mechanism is detected. The input signal could be a button that is dedicated to unlocking the lock mechanism when the main battery has fallen below the threshold level. The input signal could also be received wirelessly via the inductive power supply 448 or the wireless module 440. In one embodiment, the input signal is generated by processor 404 and/or the lock controller 408 when it has been determined that the main battery 416 has nearly zero charge and a backup battery 420 becomes nearly discharged. The charge of the backup battery 420 can be determined as discussed above in reference to the main battery 416. In this embodiment, the unlock process could be granted by the lock controller 408 without operator intervention.

Upon detecting, at block 1220, that the input signal to unlock the lock mechanism has been received, the process 1200 continues to block 1224, where the processor 404 and/or the lock controller 408 are awakened and the lock controller 408 issues a failsafe mode command to receive power from the backup power source.

At block 1224, the lock controller 408 performs the unlocking process 1000 of FIG. 10 including the authorization (e.g., the discovery and handshaking) with a wireless device in order to receive a security code (e.g., a PIN or other authentication code). If the proper security code is received, then the lock controller 408 commands the latching mechanism 412 to unlock the lock mechanism by performing the unlock process 1000 of FIG. 10 using the backup power supply. If the proper security code is not receive, the lock circuit is put back into lower power mode.

In one embodiment, the lock controller 408 is pre-programmed with a default failsafe security code that is used in a failsafe unlock scenario. In this embodiment, the user can contact the operations center to get the default security code. Encryption and authentication could be used to communicate the default security code.

The default security code could be a one time only security code where the lock controller 408 is configured to zero out a security code memory subsequent to unlocking the lock mechanism. This could prevent future unauthorized use of the lock mechanism.

The backup power supply used for the failsafe unlocking in the process 1200 could be the backup battery 420. The backup battery 420 has at least enough power to be able to unlock the lock mechanism at least one time. In this way, the backup battery allows the lock circuit 400 to be able to unlock the shipping container even if the main battery 416 is at a level that is not sufficient to unlock the locking mechanism.

The processor 404 or the lock controller 408 can couple power from the main battery 416 to the backup battery 420 upon initial wakeup and periodically to ensure that the backup battery 420 has sufficient power for a last one-shot unlock event. Like all batteries, the backup battery 420 can experience self discharging (e.g., due to leakage) even when it is not being used. In one embodiment, the processor 404 or the lock controller 408 monitors the voltage of the backup battery 420 to identify when the backup battery 420 has self discharged beyond a threshold level. When the backup battery 420 has discharged beyond the threshold level, the processor 404 or the lock controller 408 couples the main battery 416 to the backup battery 420 to charge the backup battery 416 to a fully charged, or nearly fully charged, state.

As an alternative to monitoring the voltage of the backup battery, which can in itself waste energy in the backup battery 416, an algorithm can be used to estimate battery life. The algorithm can depend on various conditions including time, temperature, pressure, humidity, altitude, etc.

The backup power supply could also be an external battery such as the external battery 665 shown in FIG. 6. Alternatively, the backup power supply could be the inductive power supply 448.

In addition to providing power for a failsafe unlocking scenario, the backup battery 420 could be used to report detection of the lock mechanism being tampered with. During the lower power mode at block 1216, the processor 404 or the lock controller 408 could use power received from the main battery 416 (the remaining ten percent) to monitor accelerometers and/or strain gauges in the sensor module 428. If these sensors indicate that the lock mechanism is being tampered with or was tampered with, the backup battery 420 could be used to report the tampering to the operations center. Other sensors associated with the lock mechanism or other sensor subsystems associated with the container could also be monitored.

The processes 700, 800, 900, 1000, 1100, 1150, and 1200 shown in FIGS. 7, 8, 9, 10, 11A, 11B and 12 are exemplary only and not limiting. The processes 700, 800, 900, 1000, 1100, 1150, and 1200 may be altered, e.g., by having blocks added, removed, or rearranged.

Figure 13A:
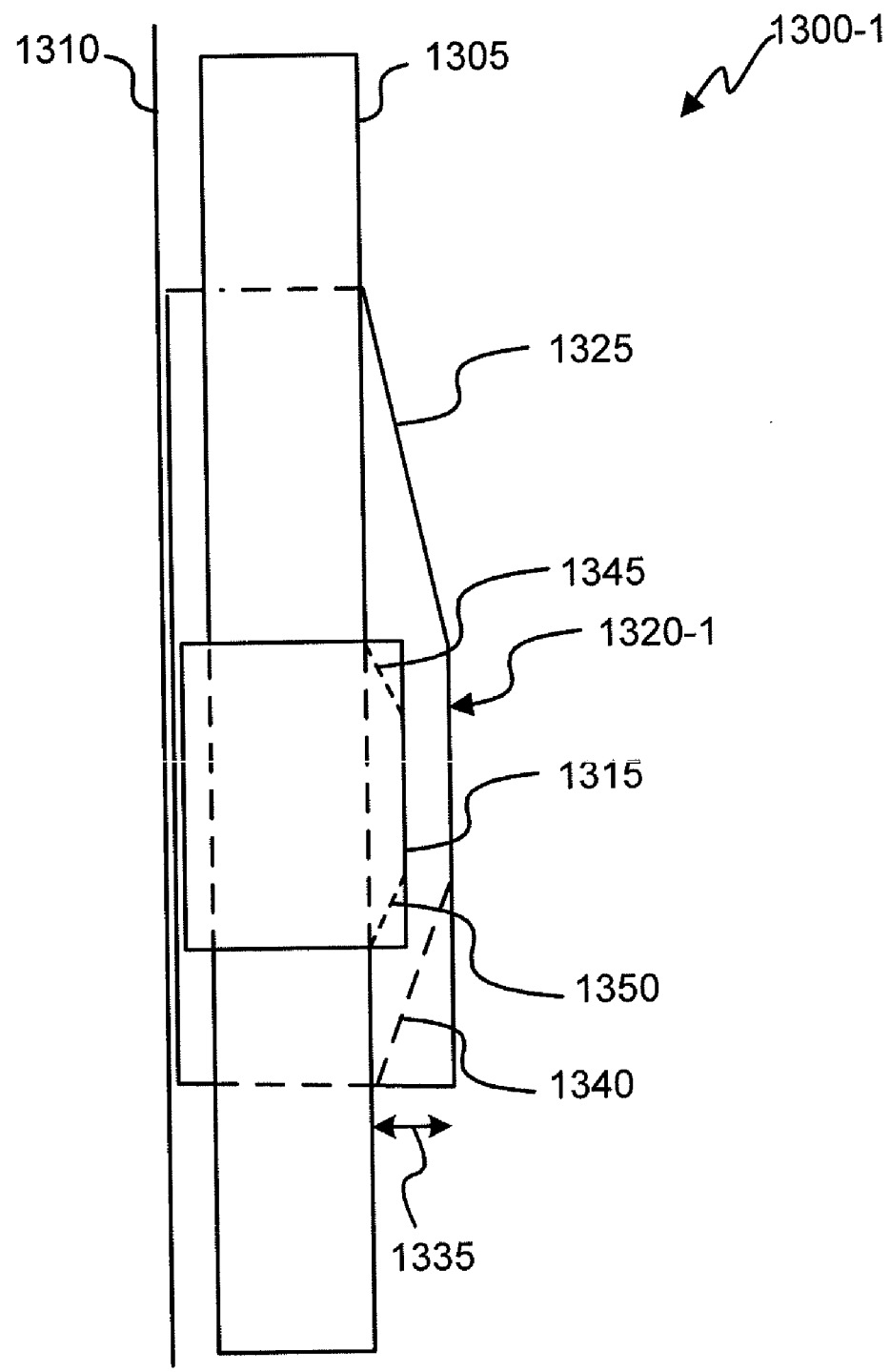
FIGS. 13A and 13B are side views showing profiles of two embodiments of a lock mechanism in accordance with the disclosure.

Referring next to FIG. 13A, a side view of a lock mechanism 1300-1 latched to a latch assembly bar 1305 on a container door 1310 is shown. The lock mechanism 1300-1 is attached to the container bar 1305 with a clamp hook 1315. The lock mechanism 1300-1 includes a body (e.g., a housing) 1320-1. The body 1320-1 includes a sloped or beveled front surface 1325. The front surface 1325 is sloped such that if another container is lowered into position in front of the container 1310, a back surface of the other container will not catch on the body 1320-1 when the other container is lowered into position. The sloped surface 1325 prevents the other container from catching on the body 1320-1 and damaging the lock mechanism 1300. The sloped front surface 1325 can be straight, rounded, elliptical or another shape that avoids catching while pushing the other container away from a profile of the clamp hook 1315.

The lock mechanism 1300-1 extends out from the latch assembly bar 1305 by a distance 1335. In some embodiments, the distance 1335 is less than about half an inch and/or less than about fifty percent of a thickness of the body 1320-1. A width of the lock mechanism measured parallel to the container doors an perpendicular to the latch assembly bar 1305 less than the distance between the two latch assembly bars (latch assembly bar 1305 and another latch assembly bar not shown). The height of the body 1320-1 can be increased in order to fit all the equipment within the body 1320-1. The housing 1320-1 could also include a sloped surface at the bottom as illustrated by the dashed line 1340. The clamp hook 1315 and the latch hook (not shown) can include sloped upper and lower edges, as indicated by the dashed lines 1345 and 1350.

Figure 13B:
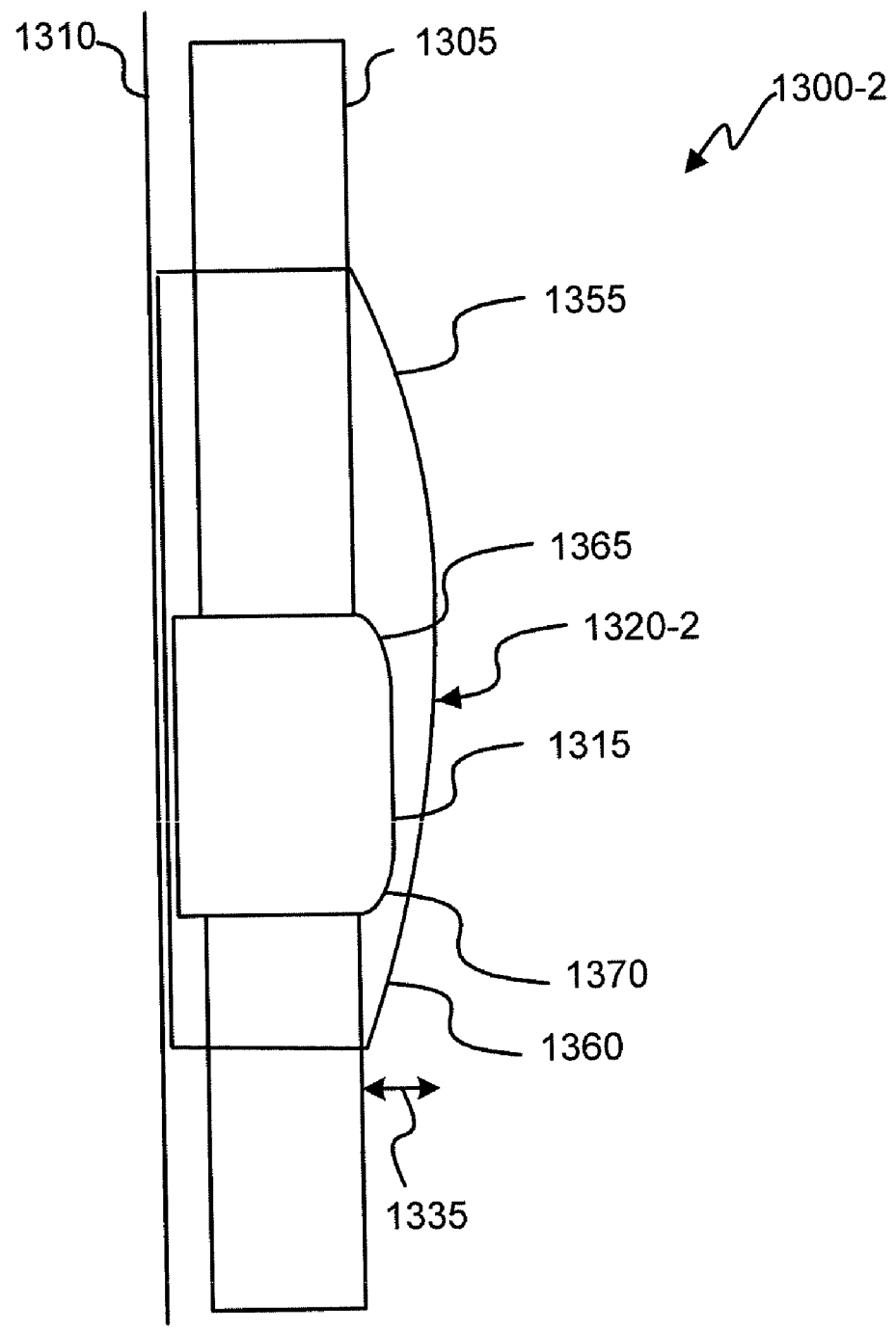

Referring next to FIG. 13B, a side view of another lock mechanism 1300-2 is shown. The lock mechanism 1300-2 is similar to the lock mechanism 1300-1 except that body 1320-2 includes curved surfaces 1355, 1360, 1365 and 1370 instead of the sloped surfaces 1325, 1340, 1345 and 1350 of the lock mechanism 1300-1. The curved surfaces 1355, 1360, 1365 and 1370 can also prevent other containers and/or lock mechanisms from catching on the lock mechanism 1300-2.

Preferably, the lock mechanisms 1300 weighs less than about 10, 15, 20, or 25 pounds. The housings 1320 can be formed of a plastic, fiberglass, composite, or metal shell in various embodiments.

Figure 14:
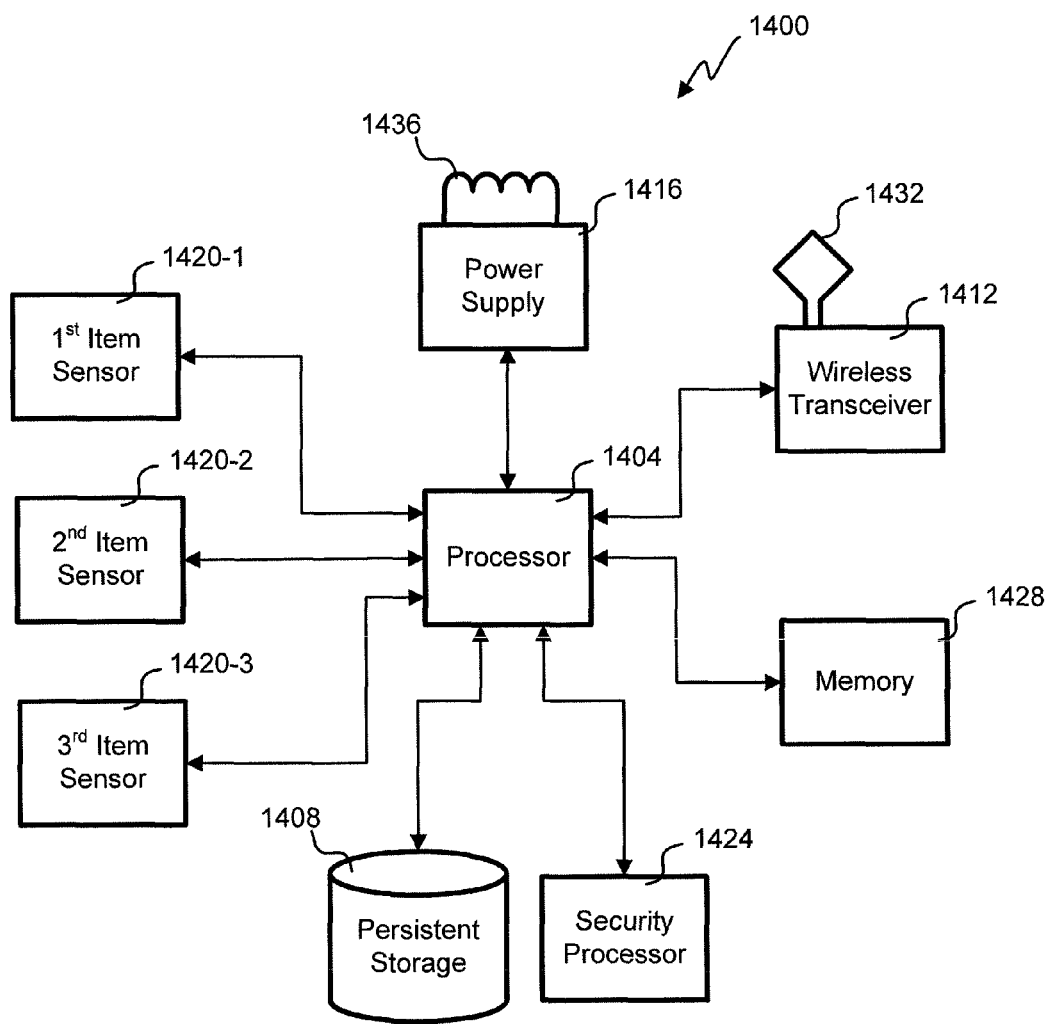
FIG. 14 is a block diagram of an embodiment of a wireless sensor module circuit used in a lock mechanism in accordance with the disclosure.

Referring next to FIG. 14, a block diagram of an embodiment of a wireless sensor module circuit 1400-1 is shown. The wireless sensor module circuit 1400-1 is embedded in a sensing module 128 in this embodiment, but could be embedded into anything. A processor 1404 or microcontroller runs software using the memory 1428. The software can be held in the persistent storage 1408 such as flash, ROM or some other non-volatile memory. The persistent storage 1408 can be used to store identifiers for the wireless sensor module circuit 1400-1 and sensor readings. Various amounts of historical sensor readings can also be stored in the persistent storage 1408.

This embodiment of the sensor module circuit 1400 is used as a smartcard. A security processor 1424 can be used for authentication, authorization or secure storage of information. Other embodiments could be used for no more than sensing items of interest without the other smartcard functionality. Some embodiments could have a separate wired or wireless smartcard circuit completely separate from the sensor module circuitry rather than integrating the two functions as in this embodiment.

A wireless transceiver 1412 allows bi-directional communication with the wireless sensing circuit 1400. The antenna 1432 is used for this communication. Other embodiments could have multiple transceivers and antenna tuned to other frequencies and/or configured to work with other standards. Some embodiments could have only transmission capability in the wireless sensor module circuit 1400.

A power supply 1416 allows intermittent energy supply to the wireless sensing module circuit 1400. When in range with a reader (e.g., an RFID reader), energy is coupled to the coil 1436 and converted into appropriate voltages by the power supply 1416. The wireless sensor module circuit 1400 becomes fully functional when properly energized by the reader.

This embodiment has passive sensors 1420 that do not require power to record exposure to items of interest. For example, fluorescent quenching polymers or molecularly imprinted polymer (MIP) technology can report detection of a substance that has come in contact with the item sensor 1420 when the wireless sensor module circuit 1400 is in an powered or non-powered state. The item sensor 1420 can read a chemical, physical, or electronic change in the MIP. The change signifies that a detection of a target substance or substances has occurred. Each item sensor 1420 can be configured to be sensitive to one or more compounds or conditions.

When the wireless sensor module circuit 1400 is next powered, the exposure of the detection polymer can be recorded in the persistent storage 1408 as exposure information. The value of the exposure information can be a value indicative of the amount of exposure experienced. The characteristics of the detection polymer can be such that the resistance (or some other electrically readable characteristic) changes as a function of exposure.

Figure 15:
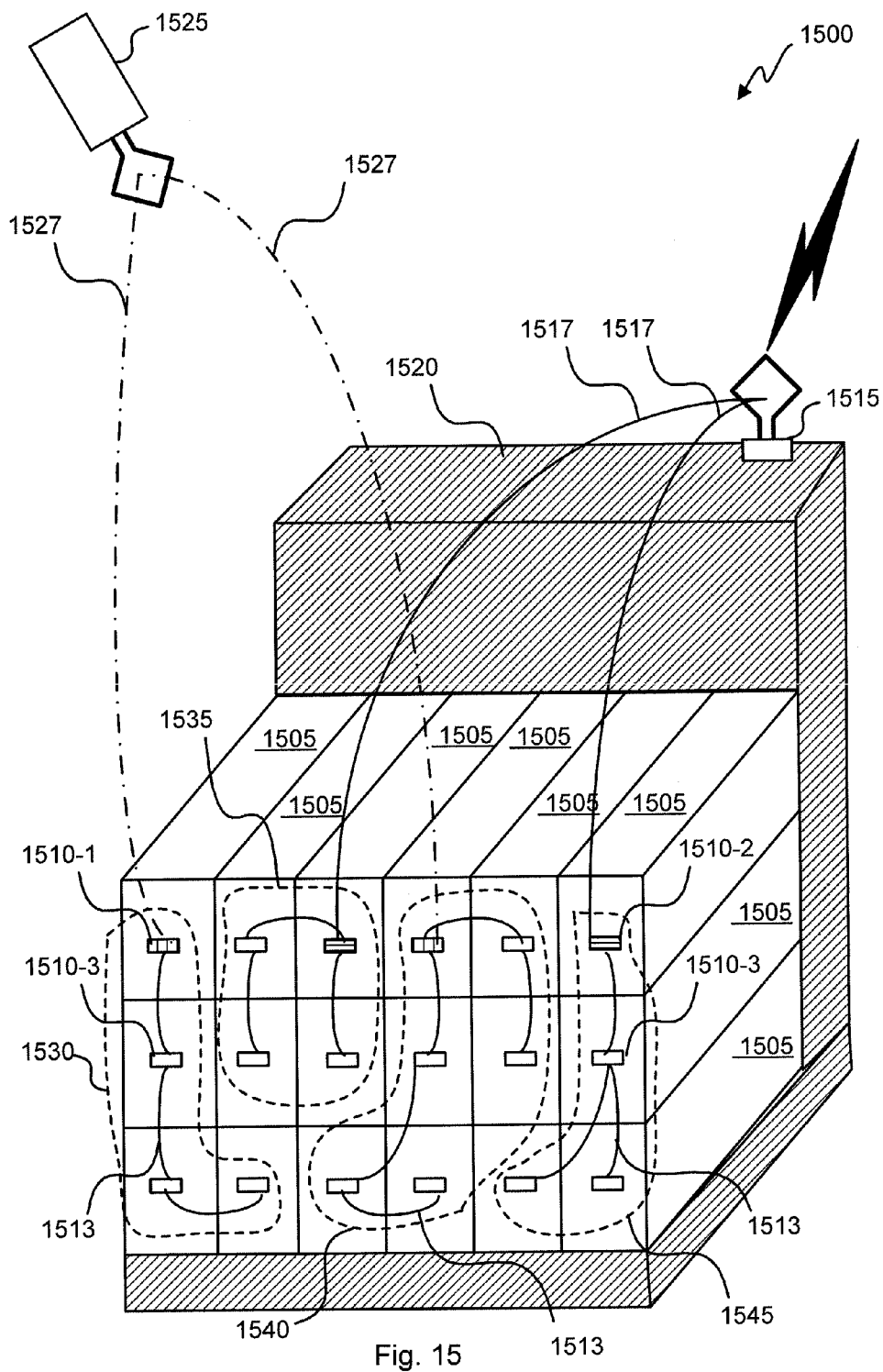
FIG. 15 illustrates a communication system including multiple containers and multiple locking mechanisms in accordance with the disclosure.

Referring next to FIG. 15, a communication system 1500 includes multiple containers 1505, multiple locking mechanisms 1510 securing doors of the containers 1505, a terrestrial communication device or cell 1515 (referred to hereafter as terrestrial cell 1515), a platform 1520, and a satellite communication device or cell 1525 (referred to hereafter as satellite cell 1520). The platform 1520 represents any location where multiple containers 1505 could be collocated. For example, the platform 1520 could be a mobile vehicle such as a ship, a train, a truck, an aircraft, etc. The platform 1520 could also be a depot, a warehouse, a train yard, a shipyard, etc.

The terrestrial cell 1515 and the satellite cell 1525 are communication links to communication networks such as the communication networks 110, 210 or 310, or the local communication network 118 described above in reference to FIGS. 1-3. The terrestrial cell 1515 and the satellite cell 1525 are examples of systems that the lock mechanisms 1510 can use to communicate with remote locations such as the operations center 112, the government interface 124 or the commercial interface 134 of FIGS. 1-3. Other types of links to communication networks/systems can also be included in the communication system 1500.

The lock mechanisms 1510 include circuitry including one or more wireless communication modules such as illustrated and described above in reference to the active lock circuit 400 of FIG. 4. The lock mechanisms 1510 communicate with each other by forming an adhoc or mesh network. Three types of lock mechanisms are illustrated. The first type of lock mechanism is a satellite master lock 1510-1. The satellite master lock 1510-1 is equipped with a satellite communication network (e.g., Satcom) that is configured to communicate with the satellite cell 1525 vie a satellite signal 1527. The second type of lock mechanism is a terrestrial master lock 1510-2. The terrestrial master lock 1510-2 is equipped with a terrestrial communication network (e.g., CDMA, TDMA, GSM, etc.) that is configured to communicate with the terrestrial cell 1515 via a terrestrial signal 1517.

The satellite master lock 1510-1 and the terrestrial master lock 1510-2 are also equipped with one or more short range wireless communication networks (e.g., Bluetooth, WiFi, Zigbee (802.15.4), etc.) to communicate with other lock mechanisms 1510 in the mesh network via a short range signal 1513. Because the satellite master lock 1510-1 and the terrestrial master lock 1510-2 can communicate with lock mechanisms 1510 as well as external satellite or cellular communication networks, they are also called cells and can be referred to as satellite master cell 1510-1 and terrestrial master cell 1510-2.

The third type of lock mechanism 1510 is a sub-cell 1510-3. The sub-cells 1510-3 are not able to communicate to any external networks, but only can communicate with other sub-cells 1510-3 or one of the satellite cells 1510-1 or terrestrial cells 1510-2, via the short range wireless links 1513. The reason for this inability to communicate to external networks can be because: 1) the particular subcell 1510-3 is not equipped with a proper communication subsystem (e.g., wireless or satellite) to communicate with external networks; or 2) the particular subcell 1510-3 is located in a position on the platform 1520 such that it is unable to communicate (e.g., due to a portion of the platform 1520 or one or more containers 1505 blocking the signal).

The lock mechanisms 1510 are powered internally (e.g., with batteries). For this reason, the lifetime of the batteries can be extended if the power consumption of the lock mechanisms 1510 is reduced. One method of controlling power consumption is by waking up the processors and communication subsystems of the lock mechanisms on a synchronized periodic basis to report changes is states of sensors and or lock states. This can be accomplished by using a synchronized time reference such as used by GPS and some cellular networks. The clocks of the lock mechanisms can also be synchronized periodically even if they do not have access to an external clock in order to wake up at the same periodic report time. This can be accomplished using one of several know clock synchronization algorithms.

The frequency of the wakeup/reporting periods will determine the power consumption rate of the lock mechanisms. A lock mechanism 1510 can be grouped into different mesh groups according to which communication technology a lock mechanism 1510 has. Mesh groups can include Bluetooth groups, WiFi groups and/or Zigbee (802.15.4) groups. For example, the mesh network of FIG. 15 includes four mesh groups 1530, 1535, 1540 and 1545. In this example each mesh group 1530-1545 has only one master cell, either a satellite master cell 1510-1 or a terrestrial master cell 1510-2. However, a mesh group could have multiple masters. Different mesh groups can have different periodic cycles depending on the power requirements of the communication technology being used by the group. The lock mechanisms 1510 in a mesh group can be enrolled with each other using the process 1150 discussed above in reference to FIG. 11A.

The frequency of the wakeup/reporting periods of a lock mechanism 1510 or group of lock mechanisms 1510 can be varied by 1) decreasing the frequency of the reporting periods proportionately to the number of hops or links in the mesh needed to reach a master cell (this conserves power for all locks in the mesh network), 2) increasing the frequency of the reporting period due to changes in state of a lock mechanism 1510 or changes is state of neighbor lock mechanisms 1510, 3) basing the frequency on geographic location (e.g., decreasing the frequency when the lock mechanisms are located in the middle of the ocean or increasing the frequency when they are located at port), 4) basing the frequency on deviations from the stored manifest of lock mechanisms 1510, and/or 5) increasing the frequency if a previous report is not acknowledged from a remote operations center within a certain time frame.

A particular lock mechanism 1510 can monitor neighbor lock mechanisms 1510 that it is able to communicate with during the periodic wakeup/reporting periods. If one or more of the neighbor lock mechanisms 1510 that the particular lock mechanism 1510 previously communicated with are no longer available, then the particular lock mechanism 1510 can report the change in neighbor lock mechanisms 1510. This can alert the operations center to a neighbor container being moved. The frequency of the periodic report period can be increased if the number of neighbors changes (e.g., one is missing).

In one embodiment, master cells (1510-1 and 1510-2) can share responsibility for reporting changes to the outside (e.g., the operations center 112, the government interface 124 or the commercial interface 134). This will spread out the power demands and lessen the likelihood that a master cell will run low on power. For example, the transmit power needed by a particular master cell 1510-1 or 1510-2 to communicate to the external networks can be used to load share proportionately among the master cells 1510-1 and 1510-2.

The operations center 112, the government interface 124 or the commercial interface 134 can attempt to ping a particular lock mechanism through the mesh network in order to initiate a report. This can be accomplished by pinging for a specific lock mechanism in a certain geographic area, via satellite or cellular communications networks, where the geographic location can be determined by the manifest of the particular lock mechanism 1510. Alternatively a terrestrial cell 1515 of a certain ship/train/truck or depot where the particular lock mechanism 1510 is supposed to be located could be pinged with the identification number of the lock mechanism in order to initiate the report. The pings could be synchronized with the locks to be in a certain window in a similar fashion to the periodic wakeup/reporting times discussed above.

In some embodiments, a lock mechanism can be configured to detect if a container or the lock mechanism itself has been breached. If a lock mechanism detects the container or the lock mechanism itself being breached, the lock mechanism can report the detection along with timestamp and lock/sensor/container identification/authentication information to an operations center as described above in reference to FIG. 11B. Examples of breach detection methods and apparatus will now be described.

One method of detecting a breach utilizes one or more radiation sensors. In one aspect, the radiation sensor is a light sensor that detects light in one or more wave lengths. A light sensor inside the container or inside the lock housing could detect the container being breached (e.g., removing a door or cutting a hole in one of the walls) or could detect the lock housing being breached (opened, cut or broken), respectively. If the light sensor detects a change in the ambient light of the container or the lock housing, the sensor will wake up the processor 404 and/or the lock controller 408 of the lock mechanism (or an inductive power supply circuit) and will transmit information regarding the light readings, time stamp and sensor identification to the lock mechanism. Alternatively, the sensor could wait until the lock mechanism wakes up and then transmit the information.

The radiation sensor could also comprise RF sensors (e.g., AM transceivers) located in the lock and in the container. The RF sensor in the lock mechanism could periodically monitor the RF sensor in the container. If the signal strength of the signal received by RF sensor in the lock mechanism increases above a threshold level, this could be an indication that the container has been breached (e.g., a door removed or a hole cut in the container.

Another method of detecting a breach of the container utilizes one or more motion sensors such as an accelerometer or rate gyro in the lock mechanism or attached to a door of the container, for example. If the motion sensor detects a rotational rate (angular velocity) greater than a threshold rate, then this could be indicative of the doors being opened or at least that the lock mechanism is not secured to both bars of the container. Alternatively, if the motion sensor detects an angle of rotation greater than a threshold angle, then this could also indicate that the door or doors have been opened or that the lock mechanism is not secured to both bars of the container.

Figure 16:
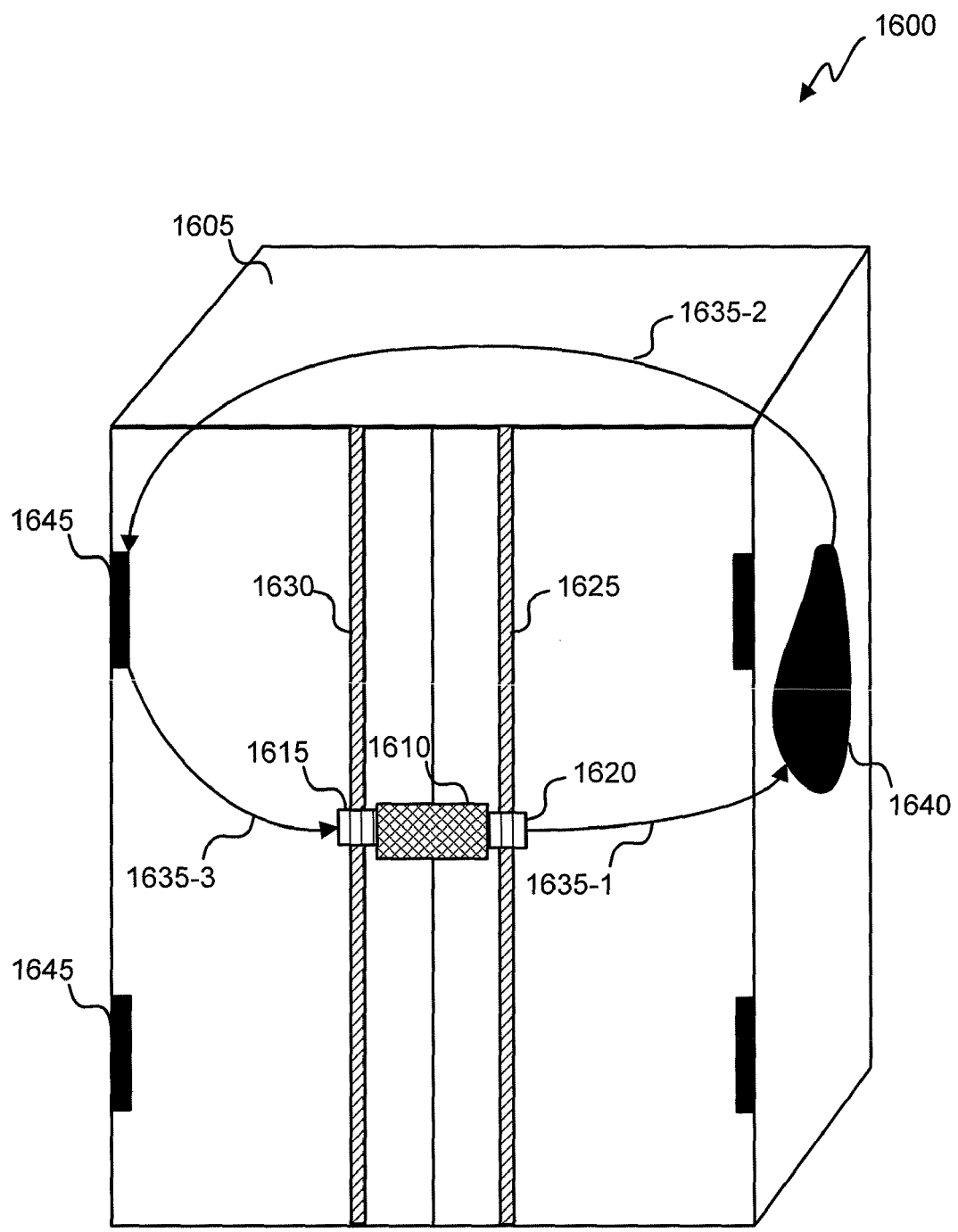
FIG. 16 illustrates a system for detecting tampering with a shipping container using an embodiment of a lock mechanism in accordance with the disclosure.

Referring next to FIG. 16, a shipping container system 1600 includes a shipping container 1605 and a lock mechanism 1610 secured to two latch assembly bars 1625 and 1630. A clamp bar 1615 is cinched to the left latch assembly bar 1630 and a latch bar 1620 is cinched to the right latch assembly bar 1625. In this embodiment, the latch assembly bars 1625 and 1630 and the clamp and latch bars 1615 and 1620 are electrically conductive.

The lock mechanism 1610 includes an electronic signal generator (not shown) coupled to latch bar 1620 (or coupled to the clamp bar 1615) and an electrical signal detector (not shown) coupled to the clamp bar 1615 (or coupled to the latch bar 1620). The electrical signal generator transmits a signal of a known shape (e.g., a modulated signal including a known code, e.g., a serial number, modulated on a carrier wave) and strength into the right latch assembly bar 1625. The transmitted signal travels through the bar 1625 and through the container, as illustrated by the electrical signal lines 1635-1, 1635-2 and 1635-3. As the electrical signal travels through the right latch assembly bar 1625, through various portions of the container 1605 and through the left latch assembly bar 1630, it will be attenuated, delayed and/or shaped, thereby affecting the profile of the signal that is received by the electrical detector coupled to the clamp bar 1615. The path of the pulse illustrated by the lines 1635 is completely arbitrary for illustrative purposes only.

An initial signal calibration can be made when the lock mechanism 1615 is first secured to the latch assembly bars 1625 and 1630. The calibration can involve receiving an initial signal or signals and analyzing the profiles (e.g. generating time histories or frequency responses). The calibration signal profiles can be averaged and stored to memory. This stored signal profile can be use to compare to pulse profiles received in the future in order to detect changes in the container or parts of the container. Alternatively, a statistical analysis of the signal profiles collected during calibration can be determined and used to be able to identify signal profiles that are not statistically likely to occur when the container is not breached.

An example breach that could be detected by this methodology is a hole 1640 that is cut into a side of the container 1605. Without the hole 1640 formed in the container 1605, the electrical signal could travel along lines 1635-1, 1635-2 and 1635-3 as in the calibration measurements. However, after the hole 1640 is formed, the signal will travel around the hole 1640, or at least be affected in some way by the hole 1640, and the pulse received at the electrical detector will be affected in one-way or another. The difference between the received signal profile compared to the stored calibration signal profile, or the statistical parameters, can be determined by the processor of the lock mechanism 1610. If the difference is greater than a threshold level, then the breach of hole 1640 can detected.

Another example of a breach that could be detected by this methodology is removal of one or more hinges 1645 from the container 1605. Removal of the hinges 1645 could allow one of the doors to be opened and the contents of the container 1605 could be removed. The lock mechanism 1610 would still be connected to the latch assembly bars 1625 and 1630, so any sensors configured to detect the presence of the latch assembly bars 1625 and 1630 would be of no use. However the electrical signal received by the lock mechanism 1610, as illustrated by the electrical pulse lines 1635-2 and 1635-3, could be affected by the removal of the hinges 1645. Other types of breaches could also affect the path of the electrical pulse(s) and the received pulse profile and could be detected by the lock mechanism 1610.

Instead of an electrical detector coupled to the clamp bar 1615, some systems utilize an electrical signal detector located in another subsystem of the container. For example, the electrical signal detector could be located in a sensor subsystem inside the container or in a communication package attached to the container. In these embodiments, the sensor subsystem or the communication subsystem could make the comparison with the calibration signal and detect whether the relationship between the lock and the container has changed. Alternatively, the sensor subsystem or the communication subsystem could transmit information indicative of the received signal back to the lock mechanism 1610 and the lock mechanism 1610 could perform the comparison.

As an alternative to electrical pulses, a vibration or mechanical pulse(s) could also be transmitted to one of the latch assembly bars 1625 or 1630 and received from the other latch assembly bar 1630 or 1625, respectively, via an accelerometer or some other sensor. The mechanical pulse could be generated by a solenoid or some other known vibrator means. Another alternative system could use an ultrasound transmitter and an ultrasound detector (e.g., a microphone). The ultrasound signal will be affected by the relationship between the lock and the container. In some embodiments, the detected ultrasound signal could be processed to isolate a direct signal from the ultrasound transmitter to the ultrasound detector from the echo signals such that only the echo signals are analyzed.

Regardless what type of transmitted signal (electrical, mechanical, ultrasound or other) is used, the lock mechanism can perform the breach detection process after receiving a trigger indicator. The trigger indicator could be a period of time elapsing. The trigger indicator could be a change of state of a sensor associated with the lock, the container or another container or lock. The trigger could be a sound captured by a microphone associated with the lock mechanism where sound recognition is used to identify sounds made by a hammer, a torch, a jack hammer, a metal saw, or other device commonly used to breach a container. The trigger could be a camera in the lock mechanism capturing a picture of the door relative to the lock changing from a secured position to another position. Other trigger indicators could also be used.

In addition to being able to detect a breach of the container 1605 after being secured, the electrical pulse (or mechanical pulse) methodology could also be used to detect when the lock is being secured to a bar that is not part of the container (e.g., a person could insert another pole sized similarly to the latch assembly bars 1625 and 1630 into the latch bar 1620 when the lock is supposedly be secured to the latch assembly bars 1625 and 1630. Since the pole would not be connected to the container 1605, at least not in the same way as the latch assembly bar 1625, the pulse received by the electrical detector or the accelerometer would be non-existent or at least not within an expected profile range (the lock mechanism 1610 could store an expected profile range in memory).

When there are multiple containers located in the same location, signal detectors of one lock mechanism could mistakenly receive a signal from another lock mechanism and erroneously determine that a breach has occurred. As discussed above, a code such as a serial number could be modulated on the signal, this code could be used to distinguish one lock from another. Alternatively, the signal transmitter and signal detectors could be synchronized to perform the tests on a time randomized basis and/or at random frequencies. Such randomization (or pseudo-random) can also reduce the risk of detection of a signal from another lock mechanism.

Figure 17A:
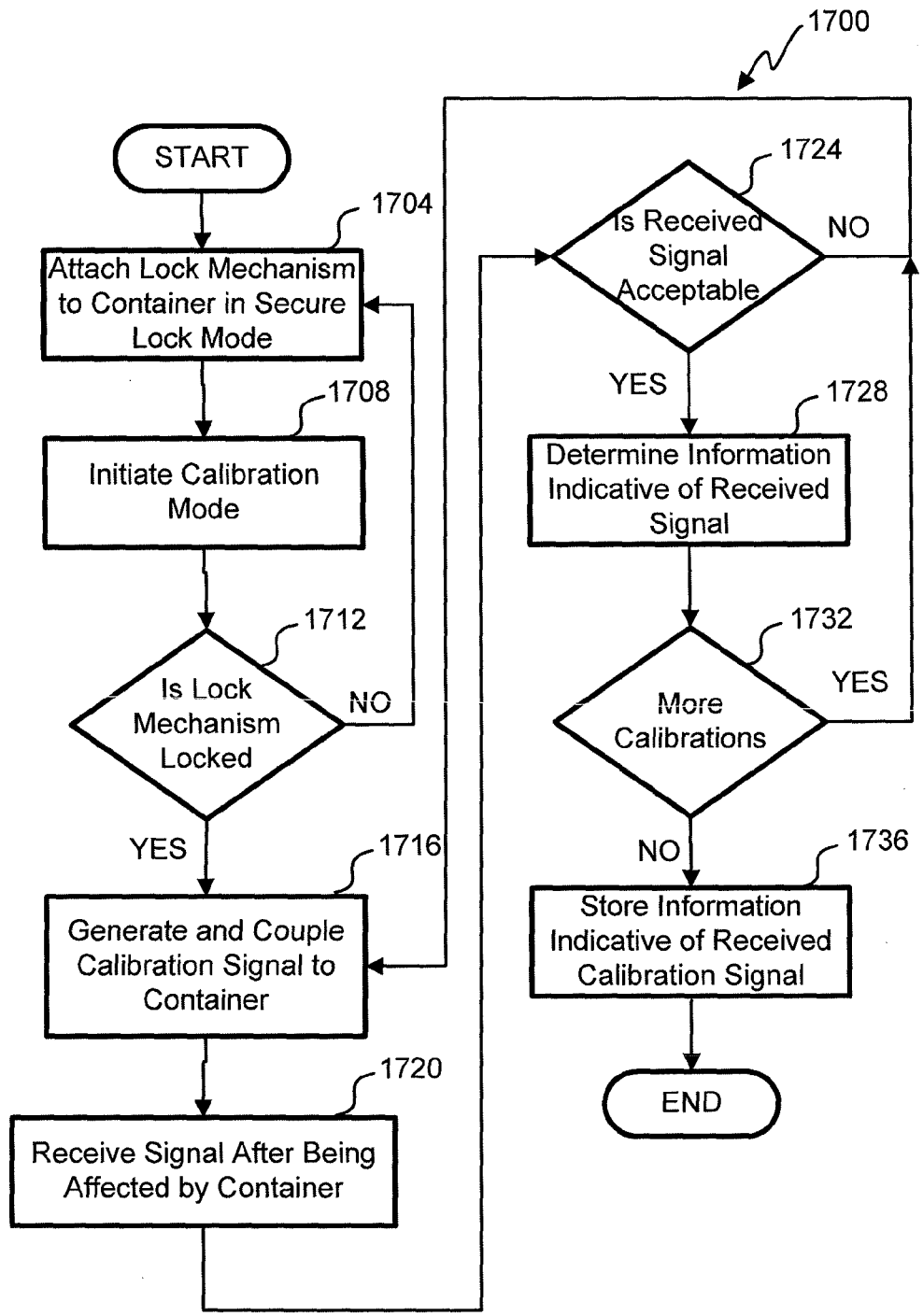
FIG. 17A is a flow diagram of an embodiment of a process for calibrating a lock mechanism to perform a process for detecting tampering with a shipping container with the system of FIG. 16.

Referring next to FIG. 17A, a process 1700 a flow diagram of an embodiment of a process 1700 for calibrating a lock mechanism to perform a process for detecting tampering with a shipping container is shown. With reference to FIGS. 16 and 17A, the process 1700 starts at block 1704 where a user attaches the lock mechanism 1610 to the container 1605 in a secure manner. In the embodiment shown, the clamp bar 1615 and the latch bar 1620 are cinched to the latch assembly bars 1630 and 1625. The user can put the lock mechanism 1610 into the secure lock mode using the process 800 discussed above in reference to FIG. 8.

Upon the lock mechanism 1610 being secured to the latch assembly bars 1625 and 1630, the user initiates a calibration mode. The user can initiate the calibration mode using a user interface such as the user interface 426 of FIG. 4. At block 1712, the lock controller determines if the lock mechanism 1610 is properly locked to the latch assembly bars 1625 and 1630 (e.g., using the clamp and latch probe switches 626 and 628 discussed above). If the lock is not properly locked, the process returns to block 1704 and the user re-attaches the lock mechanism 1610. If the lock mechanism 1610 is properly secured to the latch assembly bars 1625 and 1630, the process 1700 continues to block 1716.

At block 1716, the signal generator (e.g., an electrical signal generator, a mechanical pulse generator, an ultrasound transmitter or other signal generator) generates a calibration signal and couples the signal to the container 1605. At block 1720, the signal detector, located in the lock mechanism 1610 or a sensor subsystem or communication subsystem associated with the lock 1610, receives the signal after being affected by the container 1605. At block 1724, the received signal is analyzed to determine if it is acceptable. Acceptability can be based on a received signal to noise ratio of a code that is modulated on the signal. If it is determined that the received signal is not acceptable, blocks 1716 and 1720 are repeated. If it is determined at block 1724 that the received signal is acceptable, the process 1700 continues to block 1728.

At block 1728, the lock controller, or another processor or microprocessor associated with a sensor subsystem or communication subsystem receiving the signal at block 1720, analyzes the received signal to determine information indicative of characteristics of the received signal. The indicative information can be an average signal profile or statistical measurements of multiple received signal profiles. Depending on the number of calibrations that have been made, or based on the confidence level of the statistical measurements determined at block 1728, it can be determined at block 1732 if more calibrations are necessary. If more calibrations are necessary, the process returns to block 1716. If no more calibrations are necessary, the process proceeds to block 1736.

At block 1736, the lock controller stores the information indicative of the received signal into non-volatile memory. The process 1700 then ends. The stored information is used to detect changes in the relationship between the lock mechanism 1610 and the container 1605, as will now be discussed.

Figure 17B:
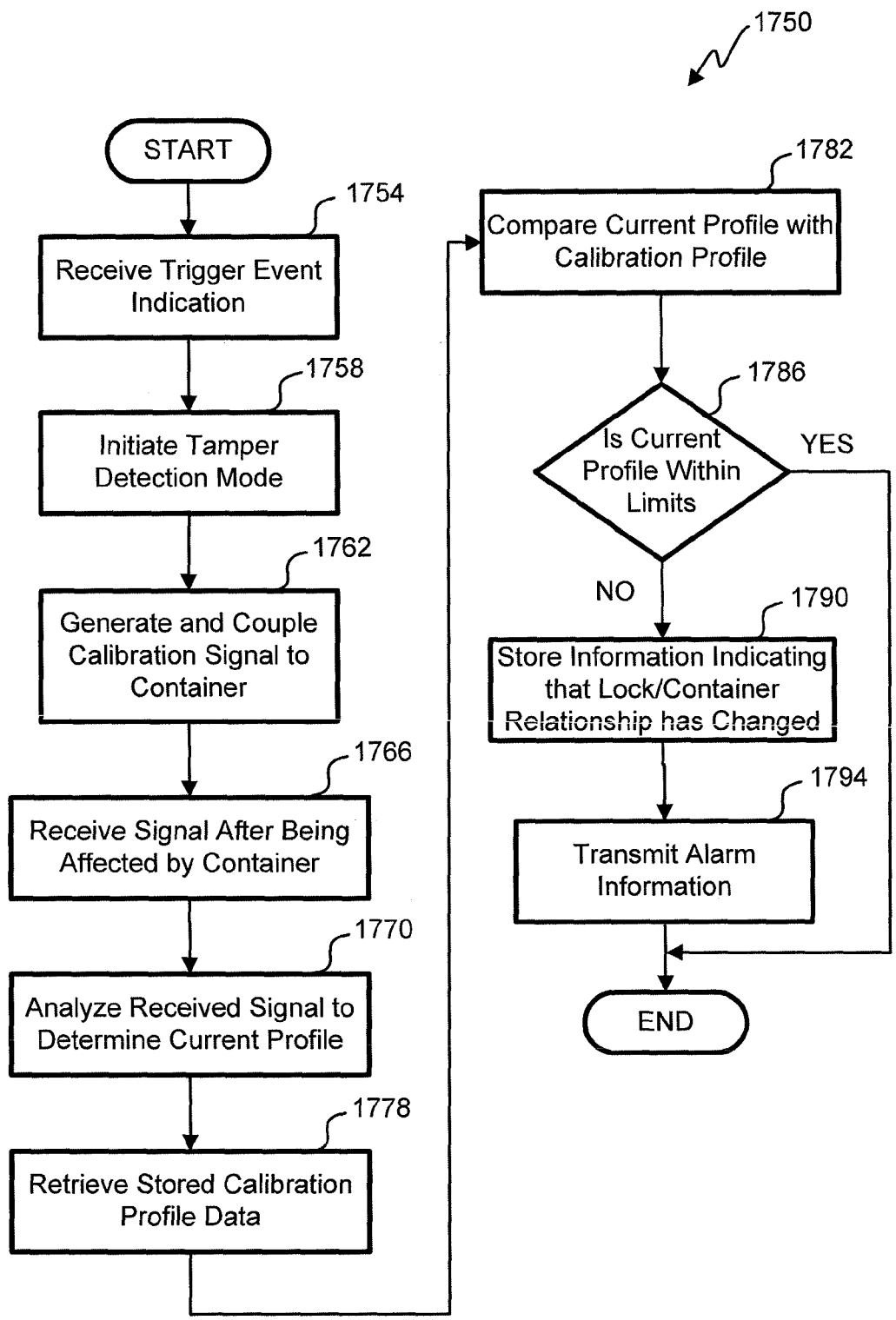
FIG. 17B is a flow diagram of an embodiment of a process for detecting tampering with a shipping container with the system of FIG. 16.

Referring next to FIG. 17B, a process 1750 for detecting tampering with a shipping container is shown. With reference to FIGS. 16 and 17B, the process 1750 starts at block 1754 where the lock controller receives a trigger event indication. As discussed above, the trigger event indication can be a period of time elapsing, a change of state of a sensor associated with the lock, the container or another container or lock, a sound captured by a microphone, a picture captured by a camera, or other type of trigger event indication. Upon receiving the trigger event indication, the lock controller initiates a tamper detection mode.

At block 1762, the lock controller causes the signal generator (e.g., an electrical signal generator, a mechanical pulse generator, an ultrasound transmitter or other signal generator) to generate the tamper test signal and, in some embodiments, couple the tamper test signal to the container via one of the clamp hook 1615 or the latch hook 1620. The tamper test signal is similar in profile to the calibration signals used to calibrate the lock mechanism 1610 using the process 1700 discussed above.

At block 1766, the transmitted tamper signal is received at the signal detector after being affected by the container, as discusses above. At block 1770, the lock controller, or a processor or microprocessor associated with a sensor subsystem or communication subsystem that receives the signal, analyzes the received signal to determine a current profile of the received signal.

At block 1778, the stored calibration signal profile information is retrieved. The retrieved profile information is compared, at block 1782, to the current information determined at block 1770. The comparison can be a correlation of a signal profile or a comparison of measured characteristics of the current received signal to statistical parameters.

At block 1786, the lock controller determines if the comparison performed at block 1782 indicates that the current received signal is within the statistical or threshold limits of the stored calibration information. If it is determined that the current profile is within the calibration profile limits, then the process 1750 terminates. If it is determined that the current profile is not within the calibration limits, then the lock controller determines that the relationship between the container 1605 and the lock mechanism 1610 has changed and the process 1750 continues at block 1790.

At block 1790, the lock controller stores information indicating that the relationship between the lock mechanism 1610 and the container 1605 has changed. At block 1794, an alarm signal is transmitted to a remote location such as the remote data center 112, the government interface 124 or the commercial interface 134 shown in FIGS. 1-3. The alarm indication can include information identifying the trigger event and the characteristics of the current signal profile that was received and analyzed.

The processes 1700 and 1750 shown in FIGS. 17A and 17B are exemplary only and not limiting. The processes 1700 and 1750 may be altered, e.g., by having blocks added, removed, or rearranged.

As discussed above, some embodiments of latching mechanisms in accordance with the disclosure utilize a one-way valve to inhibit motion of a hydraulic piston of the latching mechanism in one direction while permitting motion of the piston in another direction. FIGS. 18A, 18B, 18C and 18D are embodiments of latching mechanisms utilizing one-way valves to inhibit motion of a piston.

Figure 18A:
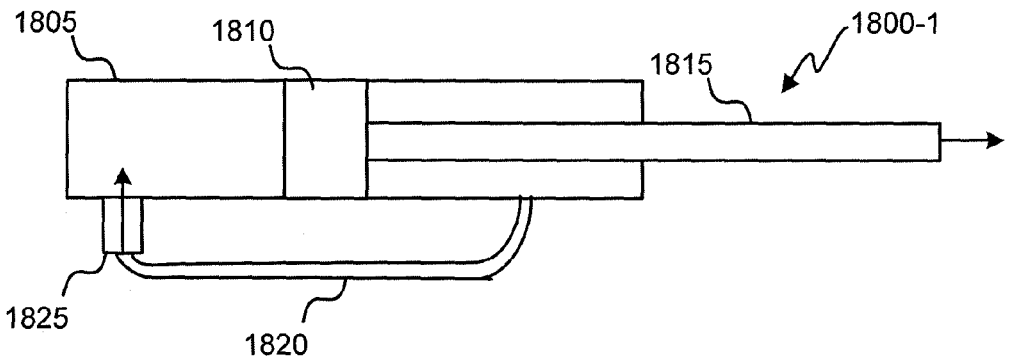
FIGS. 18A, 18B, 18C and 18D are embodiments of latching mechanisms utilizing one-way valves to inhibit motion of a piston in one direction in accordance with the disclosure.

Referring to FIG. 18A, an embodiment of a latching mechanism 1800-1 includes a fluid chamber 1805, a piston 1810 and a piston rod 1815. The latching mechanism 1800-1 also includes a one-way intake valve 1825 coupled to a rear portion of the fluid chamber behind the piston 1810. A fluid coupling 1820 (e.g., a feed line) couples the one-way intake valve 1825 to a forward portion of the fluid chamber 1805. When the one-way intake valve 1825 is controlled to be in the open state, fluid (e.g., a gas or a liquid) can freely flow in both directions and the piston rod 1815 and the piston 1805 can move in two directions. When the one-way intake valve 1825 is controlled to be in the closed state, fluid (e.g., a gas or a liquid) can freely flow in only one direction and the piston rod 1815 and the piston 1805 can move only move forward.

Figure 18B:
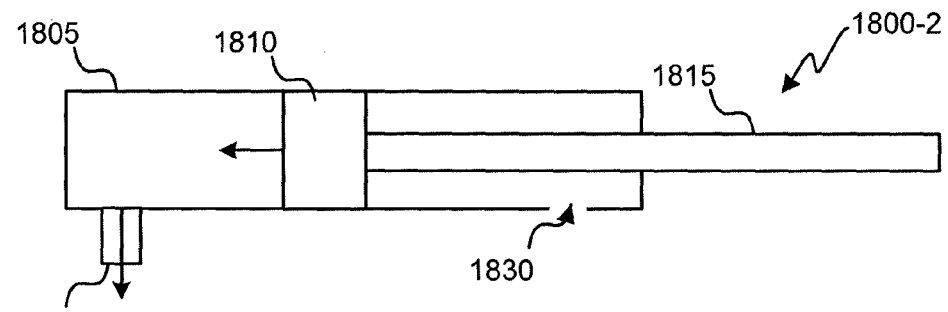

Referring next to FIG. 18B, another embodiment of a latching mechanism 1800-2 includes a one-way outtake valve 1830 coupled to a rear portion of the fluid chamber behind the piston 1810 and an aperture formed in the forward portion of the fluid chamber 1805. There is no fluid coupling in this embodiment, and this embodiment uses gas in the fluid chamber but does not use liquid. When the one-way outtake valve 1830 is controlled to be in the open state, gas can freely flow in both directions and the piston rod 1815 and the piston 1805 can move in two directions. When the one-way intake valve 1825 is controlled to be in the closed state, the gas can freely flow in only one direction and the piston rod 1815 and the piston 1805 can move only move backwards.

Figure 18C:
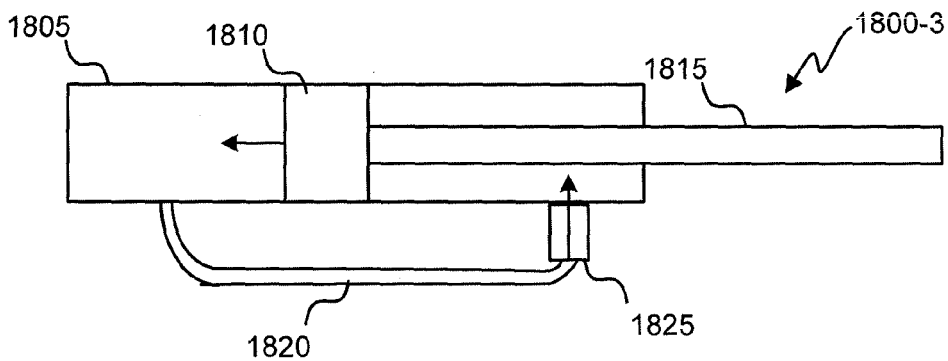

Referring next to FIG. 18C, another embodiment of a latching mechanism 1800-3 a one-way intake valve 1825 coupled to the forward portion of the fluid chamber. A fluid coupling 1820 (e.g., a feed line) couples the one-way intake valve 1825 to the rear portion of the fluid chamber 1805. When the one-way intake valve 1825 is controlled to be in the open state, fluid (e.g., a gas or a liquid) can freely flow in both directions and the piston rod 1815 and the piston 1805 can move in two directions. When the one-way intake valve 1825 is controlled to be in the closed state, fluid (e.g., a gas or a liquid) can freely flow in only one direction and the piston rod 1815 and the piston 1805 can move only move backward.

Figure 18D:
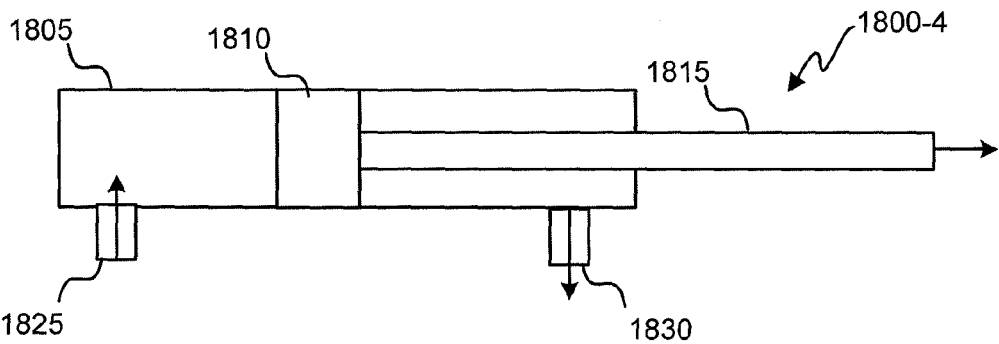

Referring next to FIG. 18D, another embodiment of a latching mechanism 1800-4 includes a one-way intake valve 1825 coupled to a rear portion of the fluid chamber and a one-way outtake valve 1830 coupled to the forward portion of the fluid chamber 1805. There is no fluid coupling in this embodiment, and this embodiment uses gas in the fluid chamber but does not use liquid. When the one-way intake valve 1825 and the one-way outtake valve 1830 are both controlled to be in the open state, gas can freely flow in both directions and the piston rod 1815 and the piston 1805 can move in two directions. When either the one-way intake valve 1825 or the one-way outtake valve 1830 is controlled to be in the closed state, the gas can freely flow in only one direction and the piston rod 1815 and the piston 1805 can move only move forwards. In an alternative embodiment, either the one-way intake valve 1825 could be replaced by an outtake valve 1830, or the outtake valve 1830 could be replaced by a one-way intake valve 1825. In these alternative embodiments, one of the two one-way intake or outtake valves 1825 or 1830 could be selectively controlled to be in the closed state to permit the piston rod 1815 and the piston 1810 to move either forward or backward.

The latching mechanisms 1800-1, 1800-2, 1800-3 and 1800-4 are exemplary only and are not limiting. Other combinations of one-way intake valves 1825, one-way outtake valves 1830, apertures 1830 and fluid couplings 1820 can be used.

The locking mechanisms discussed above included two locking members coupled to portions of hydraulic latching mechanisms, and the locking members were hooks configured to engage latch assembly bars to lock container doors in the closed position. However, embodiments in accordance with the disclosure can have different configurations.

Figure 19A:
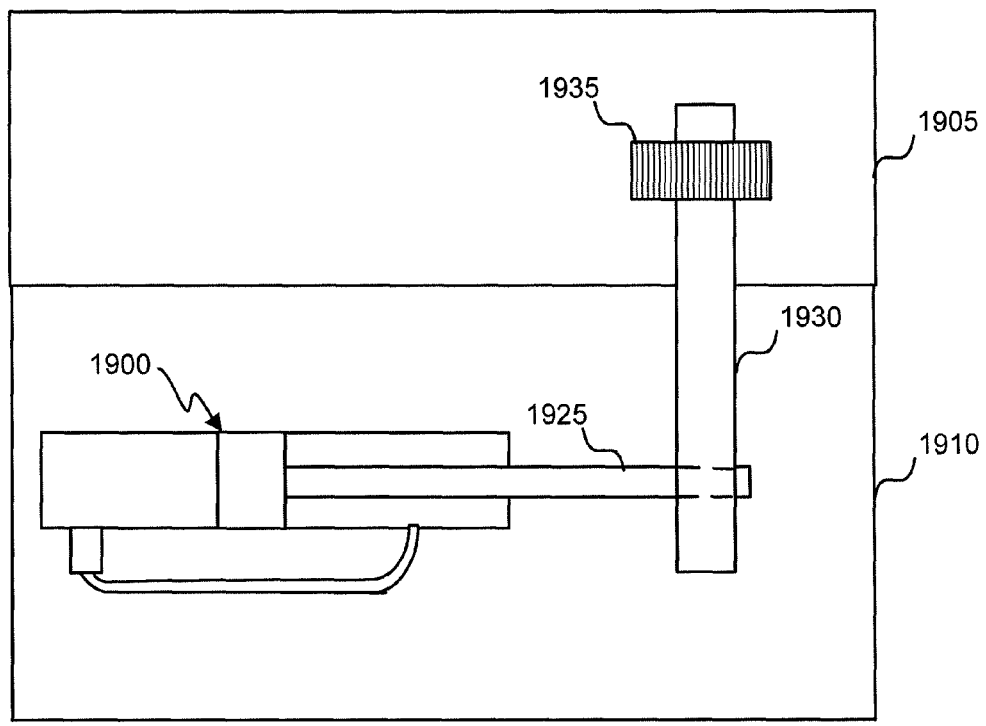
FIGS. 19A and 19B are embodiments of latching mechanism configurations in accordance with the disclosure.

Referring next to FIG. 19A, an embodiment of a locking mechanism includes a latching mechanism 1900 fixedly attached to a first container door 1910 is configured to lock container a second container door 1905 and the first container door 1910 in a closed position using a single lock member 1930. In this embodiment, a piston rode 1925 of the latching mechanism 1900 is configured to engage a portion of the locking member 1930 when the locking member 1930 is engaged to a lock ring 1935 attached to the second door 1905. The locking member 1930 is slidably attached to the first door 1910. The locking member 1930 is formed with at least one aperture that the piston rod 1925 can engage with to lock the locking member 1930 in place when the locking member 1930 is engaged with the lock ring 1935. The latching mechanism 1900 can be configured with one of the one-way valve systems illustrated in FIGS. 18A-18D that permits the piston rod 1925 to be moved toward the locking member 1930 when the one-way valve is in the closed state.

Figure 19B:
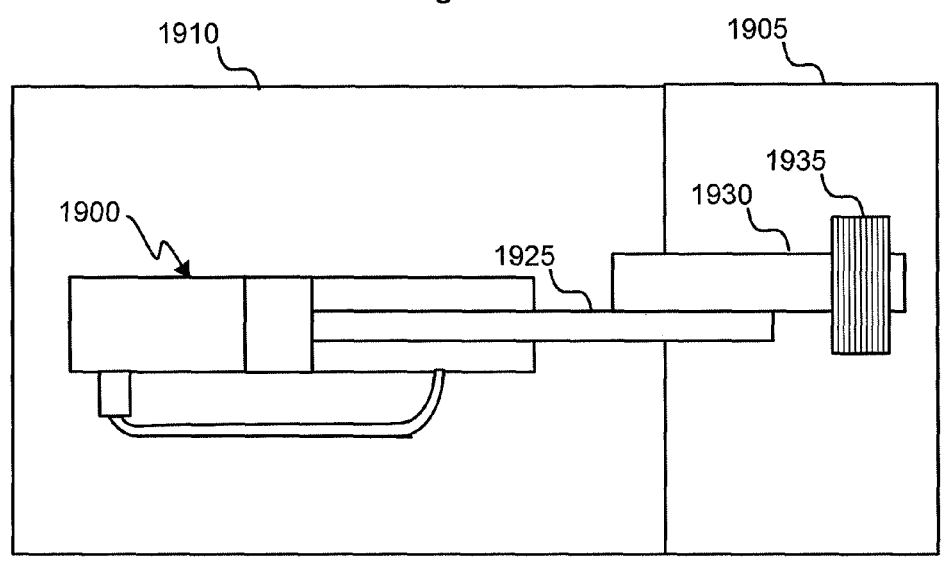

Referring next to FIG. 19B, another configuration of a lock mechanism includes the latching mechanism 1900 fixedly attached to the first door 1910 and configured to lock the container doors 1905 and 1910 in a closed position using a single lock member 1930. In this embodiment, the piston rode 1925 of the latching mechanism 1900 is coupled to the locking member 1930 and the locking member 1930 is configured to engage to the lock ring 1935 attached to the second door 1905. The latching mechanism 1900 can be configured with one of the one-way valve systems illustrated in FIGS. 18A-18D that permits the piston rod 1925 and the locking member 1930 to be moved toward the lock ring 1925 when the one-way valve is in the closed state.

Figure 20A:
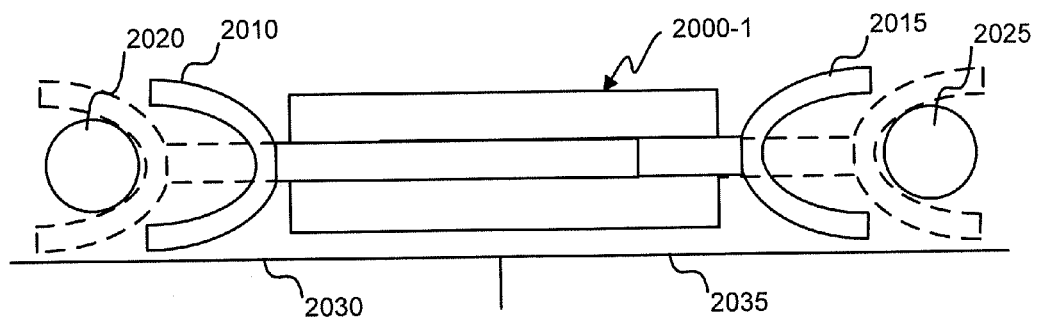
FIGS. 20A, 20B and 20C are embodiments of alternative locking members that can be used with latching mechanisms in accordance with the disclosure.

The locking mechanisms illustrated in FIG. 16 included locking members with J-hooks configured to engage latch assembly bars. Alternative embodiments of locking mechanisms with different shape end portions will now be discussed. Referring next to FIG. 20A, a locking mechanism 2000-1 includes two locking members with U-hook end portions 2010 and 2015 configured to engage first and second latch assembly bars 2020 and 2025, respectively to lock first and second doors 2030 and 2035 in a closed position. The lock members are configured to be extended outward to engage the latch assembly bars 2020 and 2025 with the U-hooks 2010 and 2015 as represented by the dashed lines.

Figure 20B:
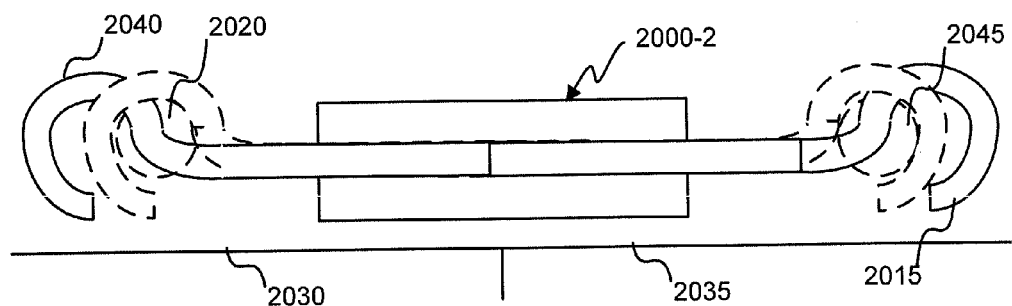

Referring next to FIG. 20B, a locking mechanism 2000-2 includes two locking members with question-mark end portions 2040 and 2045 configured to engage the first and second latch assembly bars 2020 and 2025, respectively to lock the first and second doors 2030 and 2035 in a closed position. The lock members are configured to be pushed inwards to engage the latch assembly bars 2020 and 2025 with the question-mark portions 2040 and 2045 as represented by the dashed lines.

Figure 20C:
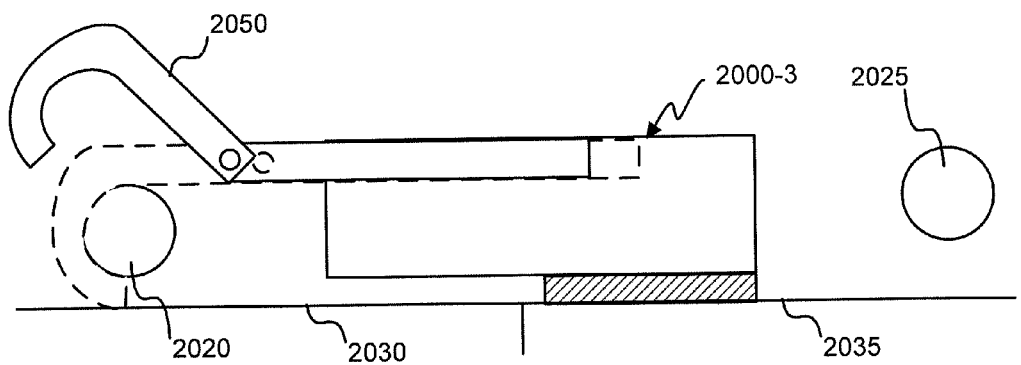

Referring next to FIG. 20C, a locking mechanism 2000-3 is fixedly attached to the second door 2035 and includes one locking member with a rotatable J-hook end portion 2050 configured to engage the first latch assembly bar 2020 to lock first and second doors 2030 and 2035 in a closed position. The single lock member is configured to be pushed inward while the rotatable J-hook 2050 is rotated down to engage the latch assembly bar 2020 as represented by the dashed lines.

The embodiments of the lock mechanisms discussed above are described in reference to shipping containers. However, those skilled in the art will recognize other implementations where other types of devices can be locked and/or monitored with similar locking mechanisms, latching mechanisms and using similar methods as discussed above. For example, doors to homes, garages, bank vaults, and other devices can be locked and monitored with other embodiments in accordance with the disclosure.

While the principles of the disclosure have been described above in connection with specific apparatuses and methods, it is to be clearly understood that this description is made only by way of example and not as limitation on the scope of the disclosure.

What is claimed is:

1. A lock mechanism for locking at least one door of a container in a closed position, the lock mechanism comprising:
   a housing;
   at least one lock member at least partially enclosed within the housing, the at least one lock member comprising a first latch hook configured to engage a latch assembly bar on an exterior of the at least one door to lock the at least one door of the container in a closed position, wherein the lock member is removable from the at least one door;
   a latching mechanism coupled to the at least one lock member, the latching mechanism comprising:
      a fluid chamber configured to hold a fluid,
      a piston slidably housed within the fluid chamber, and
      a valve coupled to the fluid chamber and configured to be in one of two states, the two states including an open state where fluid can flow through the valve in two directions to allow the piston to be moved in two directions, and a closed state where fluid is inhibited from flowing through the valve in at least one direction to prevent the piston from moving in at least one direction; and
   a lock circuit at least partially enclosed within the housing, the lock circuit comprising:
      memory, and
      a lock controller coupled to the memory and the latching mechanism and configured to receive commands related to the operation of the lock mechanism, wherein the lock controller is configured to cause the latching mechanism to be in one of the two states in response to the received commands.

2. The lock mechanism of claim 1, wherein the valve is a one-way valve configured to allow fluid to flow in only one direction when the valve is in the closed state.

3. The lock mechanism of claim 2, wherein the one-way valve is configured to allow the at least one lock member to be moved in a direction to lock the container door when the valve is in the closed state.

4. The lock mechanism of claim 1, further comprising a fluid coupling coupled to the valve and the fluid chamber and configured to allow fluid to flow between two portions of the fluid chamber on opposite sides of the piston.

5. The lock mechanism of claim 1, further comprising a second lock member, wherein the second lock member is coupled to the piston and the second lock member is configured to engage the first lock member when the first lock member is engaged to the first portion of the container to lock the container door in the closed position.

6. The lock mechanism of claim 1, further comprising a second lock member configured to engage a second portion of the container, the latching mechanism being coupled to the second lock member and the valve being configured to resist having the first and second lock members move apart from each other when the valve is in the closed state.

7. The lock mechanism of claim 6, wherein the lock controller is configured to cause the latching mechanism to resist having the first lock member be disengaged from the first portion of the container when the first lock members is engaged to the first portion of the container to secure the lock mechanism to the first portion of the container in response to the received commands.

8. The lock mechanism of claim 7, wherein the lock controller causes the latching mechanism to actuate the first one of the lock members to secure the lock mechanism to the latch assembly bar with the hook member in response to a first received command.

9. The lock mechanism of claim 7, wherein the lock controller causes the latching mechanism to resist having the first and second lock members be disengaged from the first and second portions of the container when the two lock members are engaged to the first and second bars of the container to secure the lock mechanism to the first and second portions of the container in response to a second received command, wherein the container doors are locked when both of the lock members are secured.

10. The lock mechanism of claim 6, further comprising a drive mechanism configured to cause the two lock members to engage the portions of the container.

11. The lock mechanism of claim 1, wherein the housing is user detachable from the container.

12. A lock mechanism for locking at least one door of a container in a closed position, the lock mechanism comprising:
   lock member means comprising at least one hook member configured to removably engage a latch assembly bar attached to an exterior of a container door in a closed position;
   means for slidably coupling the at least one lock member of the lock member means to a portion of the lock mechanism;
   latching means coupled to the slidably coupling means and configured to be in one of two states, the two states including an open state and a closed state, the latching means for allowing the at least one lock member of the lock member means to be moved in two directions when in the open state, and for preventing the at least one lock member of the lock member means from moving in at least one direction when in the closed state, wherein the latching means comprises a one-way valve configured to allow fluid to flow in only one direction when the valve is in the closed state;

means for receiving commands related to the operation of the lock mechanism; and means for controlling the latching means to be in one of the two states in response to the received commands.

13. The lock mechanism of claim 12, wherein the one-way valve is configured to allow the at least one lock member to be moved in a direction to lock the container door when the valve is in the closed state.

14. The lock mechanism of claim 12, wherein the lock member means further comprises another lock member, wherein the another lock member is coupled to the piston and the another lock member is configured to engage the one lock member when the one lock member is engaged to the first portion of the container to lock the container door in the closed position.

15. The lock mechanism of claim 12, wherein the lock member means further comprising another lock member configured to engage a second portion of the container, the latching mechanism being coupled to the another lock member and the latching means being configured to resist having the at least one lock member and the another lock member move apart from each other when the latching means is in the closed state.

16. The lock mechanism of claim 15, wherein the controlling means is for causing the latching means to resist having the at least one lock member be disengaged from the first portion of the container when the at least one lock member is engaged to the first portion of the container to secure the lock mechanism to the first portion of the container in response to the received commands.

17. The lock mechanism of claim 16, wherein the controlling means is for causing the latching means to actuate the at least one lock member to secure the lock mechanism to the latch assembly bar with the hook member in response to a first received command.

18. The lock mechanism of claim 16, wherein the controlling means is for causing the latching means to resist having the at least one lock member and the another lock member be disengaged from the first and second portions of the container when the two lock members are engaged to the first and second bars of the container to secure the lock mechanism to the first and second portions of the container in response to a second received command, wherein the container doors are locked when both of the lock members are secured.

19. The lock mechanism of claim 12, wherein the lock mechanism is user detachable from the container.

\* \* \* \* \*